US012410029B2

(12) United States Patent
Takahashi et al.

(10) Patent No.: US 12,410,029 B2
(45) Date of Patent: Sep. 9, 2025

(54) SHEET PAPER PROCESSING DEVICE

(71) Applicants: LAUREL BANK MACHINES CO., LTD., Tokyo (JP); LAUREL MACHINERY CO., LTD., Osaka (JP); LAUREL PRECISION MACHINES CO., LTD., Osaka (JP)

(72) Inventors: Hitoshi Takahashi, Tokyo (JP); Toru Inake, Tokyo (JP)

(73) Assignees: LAUREL BANK MACHINES CO., LTD., Tokyo (JP); LAUREL PRECISION CO., LTD., Osaka (JP)

( * ) Notice: Subject to any disclaimer, the term of this patent is extended or adjusted under 35 U.S.C. 154(b) by 185 days.

(21) Appl. No.: 18/259,196

(22) PCT Filed: Dec. 25, 2020

(86) PCT No.: PCT/JP2020/048843
§ 371 (c)(1),
(2) Date: Jun. 23, 2023

(87) PCT Pub. No.: WO2022/137540
PCT Pub. Date: Jun. 30, 2022

(65) Prior Publication Data
US 2024/0043232 A1 Feb. 8, 2024

(51) Int. Cl.
*B65H 29/62* (2006.01)
*B65H 29/60* (2006.01)
(Continued)

(52) U.S. Cl.
CPC ............. *B65H 29/62* (2013.01); *B65H 29/60* (2013.01); *B65H 31/24* (2013.01); *B65H 43/02* (2013.01);
(Continued)

(58) Field of Classification Search
CPC ...... B65H 43/04; B65H 7/06; B65H 2511/24; B65H 2511/52; B65H 29/60; B65H 31/24; B65H 29/62; G07D 11/18; G07D 11/237
See application file for complete search history.

(56) References Cited

U.S. PATENT DOCUMENTS

| | | | | |
|---|---|---|---|---|
| 7,017,902 | B2 * | 3/2006 | Kuru | G03G 15/6529 271/258.02 |
| 2014/0216888 | A1 | 8/2014 | Horigome | |
| 2020/0020191 | A1 | 1/2020 | Takahashi et al. | |

FOREIGN PATENT DOCUMENTS

| | | | |
|---|---|---|---|
| CN | 102013124 | A | 4/2011 |
| EP | 1445660 | A2 | 8/2004 |

(Continued)

OTHER PUBLICATIONS

Extended European Search Report mailed Sep. 13, 2024 in European Application No. 20967026.4, 9 pages.

(Continued)

*Primary Examiner* — Jeremy R Severson
(74) *Attorney, Agent, or Firm* — Nixon & Vanderhye P.C.

(57) ABSTRACT

There is provided a base machine including a base machine feed path that conveys a paper sheet, and a validator identifying the paper sheet conveyed by the base machine feed path; an expansion unit including an extension feed path extending from the base machine feed path, a branching feed path branching from the extension feed path, and a plurality of stacking portions that are connected to the branching feed path and stack the paper sheet identified by the validator; and a control portion that, when a conveyance abnormality occur, continues conveyance operation of at least one of the extension feed path and the branching feed path without immediately stopping the conveyance operation and conveys the paper sheet to a predetermined stacking (Continued)

portion that is any of the plurality of stacking portions, in accordance with a location where the conveyance abnormality occurred and a type of the conveyance abnormality.

8 Claims, 8 Drawing Sheets

(51) Int. Cl.

| | |
|---|---|
| ***B65H 31/24*** | (2006.01) |
| ***B65H 43/02*** | (2006.01) |
| ***B65H 43/04*** | (2006.01) |
| ***B65H 43/06*** | (2006.01) |
| ***G07D 11/16*** | (2019.01) |
| ***G07D 11/237*** | (2019.01) |
| ***G07D 11/40*** | (2019.01) |
| *G07D 11/50* | (2019.01) |

(52) U.S. Cl.

CPC ............. *B65H 43/04* (2013.01); *B65H 43/06* (2013.01); *G07D 11/16* (2019.01); *G07D 11/237* (2019.01); *G07D 11/40* (2019.01); *B65H 2511/24* (2013.01); *B65H 2511/515* (2013.01); *B65H 2511/52* (2013.01); *B65H 2511/524* (2013.01); *B65H 2511/528* (2013.01); *B65H 2513/10* (2013.01); *B65H 2701/1912* (2013.01); *G07D 11/50* (2019.01); *G07D 2211/00* (2013.01)

(56) References Cited

FOREIGN PATENT DOCUMENTS

| | | | |
|---|---|---|---|
| JP | 6-295369 | A | 10/1994 |
| JP | 2012068820 | A | 4/2012 |
| JP | 5068989 | B2 | 8/2012 |
| JP | 2017178509 | A | 10/2017 |
| JP | 2018169853 | A | 11/2018 |
| WO | WO 2013/080656 | A1 | 6/2013 |

OTHER PUBLICATIONS

International Search Report for PCT/JP2020/048843 mailed Mar. 23, 2021, 4 pages.

Written Opinion of the ISA for PCT.JP2020/048843, mailed Mar. 23, 2021, 5 pages.

* cited by examiner

SHEET PAPER PROCESSING DEVICE

This application is the U.S. national phase of International Application No. PCT/JP2020/048843, filed Dec. 25, 2020, which designated the U.S., the entire contents of which is hereby incorporated by reference.

TECHNICAL FIELD

The present invention relates to a paper sheet processing device.

BACKGROUND ART

Some paper sheet processing devices count and classify a paper sheet according to type, and accumulate them in a plurality of accumulation units (see, for example, Patent Document 1).

PRIOR ART DOCUMENTS

Patent Documents

Patent Document 1: Japanese Unexamined Patent Application, First Publication No. 2017-178509

SUMMARY OF THE INVENTION

Problems to be Solved by the Invention

In such a paper sheet processing device, for example, when a paper sheet conveyance abnormality such as a jam occurs on the feed path, the conveyance operation of all the feed paths is temporarily stopped at that point. In this state, the operator removes all the paper sheets that have become stuck on the feed path and all the undetermined paper sheets in the plurality of accumulation units, and sets them back in the loading unit of the paper sheet processing device. Therefore, there is a problem that the amount of paper sheets to be removed is large and the removal work becomes complicated.

An object of the present invention is to provide a paper sheet processing device that facilitates paper sheet removal work when a conveyance abnormality occurs.

Means for Solving the Problem

According to the first aspect of the present invention there is provided a base machine including a base machine feed path that conveys a paper sheet, and a validator that identifies the paper sheet conveyed by the base machine feed path. There is provided an expansion unit including an extension feed path that extends from the base machine feed path, a branching feed path that branches from the extension feed path, and a plurality of stacking portions that are connected to the branching feed path and stack the paper sheet identified by the validator. There is provided a control portion that, when a conveyance abnormality occur, continues conveyance operation of at least one of the extension feed path and the branching feed path without immediately stopping the conveyance operation and conveys the paper sheet to a predetermined stacking portion that is any of the plurality of stacking portions, in accordance with a location where the conveyance abnormality occurred and a type of the conveyance abnormality.

According to the second aspect of the present invention, in the first aspect, the control portion, when the conveyance abnormality occurs, may switch a conveyance destination so as to convey the paper sheet being conveyed on the extension feed path or the paper sheet being conveyed on the branching feed path to the empty stacking portion where no paper sheet is stacked.

According to the third aspect of the present invention, in the second aspect, the control portion, when the conveyance abnormality occurs, may switch the conveyance destination so as to convey the paper sheet being conveyed on the extension feed path or the paper sheet being conveyed on the branching feed path to the stacking portion with a lowest number of stacked sheets among the stacking portions, when there is no empty stacking portion where no paper sheet is stacked.

According to a fourth aspect of the present invention, in the first aspect, the predetermined stacking portion may be set in advance. In this case, the control portion, when the conveyance abnormality occurs, may switch a conveyance destination so as to convey the paper sheet being conveyed on the extension feed path or the paper sheet being conveyed on the branching feed path to the predetermined stacking portion.

According to the fifth aspect of the present invention, in the first aspect, the expansion unit may include a plurality of expansion units. In this case, the control portion, in accordance with the location where the conveyance abnormality occurred and the type of the conveyance abnormality, may individually switch a conveyance destination of a paper sheet being conveyed downstream of the location where the conveyance abnormality occurred and a paper sheet being conveyed on an upstream side of the location where the conveyance abnormality occurred so that each paper sheet is conveyed to the predetermined stacking portion or to another stacking portion.

According to the sixth aspect of the present invention, any one of the first to fifth aspects may further include a terminal stacking portion that receives a paper sheet from an opening portion at the terminal end of the extension feed path and stacks it. In this case, the control portion, when the location where the conveyance abnormality occurred is not the extension feed path, may switch a conveyance destination so as to convey the paper sheet being conveyed on the extension feed path to the terminal stacking portion.

According to the seventh aspect of the present invention, in any one of the first to sixth aspects, the control portion may switch a conveyance speed of at least any one of the extension feed path and the branching feed path to a lower speed than a conveyance speed during normal counting except when a conveyance abnormality occurs, in accordance with the location where the conveyance abnormality occurred and the type of the conveyance abnormality.

According to the eighth aspect of the present invention, in any one of the first to seventh aspects, the control portion, after having completed conveyance of the paper sheet being conveyed on the extension feed path or the paper sheet being conveyed on the branching feed path to the predetermined stacking portion, may finalize counting of a paper sheet normally conveyed to the stacking portion other than the predetermined stacking portion.

According to the ninth aspect of the present invention, in any one of the first to eighth aspects, the control portion, after having completed conveying paper sheet being conveyed on the extension feed path or paper sheet being conveyed on the branching feed path to the predetermined stacking portion, may finalize the counting of the paper sheet normally conveyed to the stacking portion other than the predetermined stacking portion.

Effect of Invention

The present invention can facilitate paper sheet removal work.

EMBODIMENTS FOR CARRYING OUT THE INVENTION

A paper sheet processing device according to an embodiment of the present invention will be described below with reference to the drawings.

Figure 1:
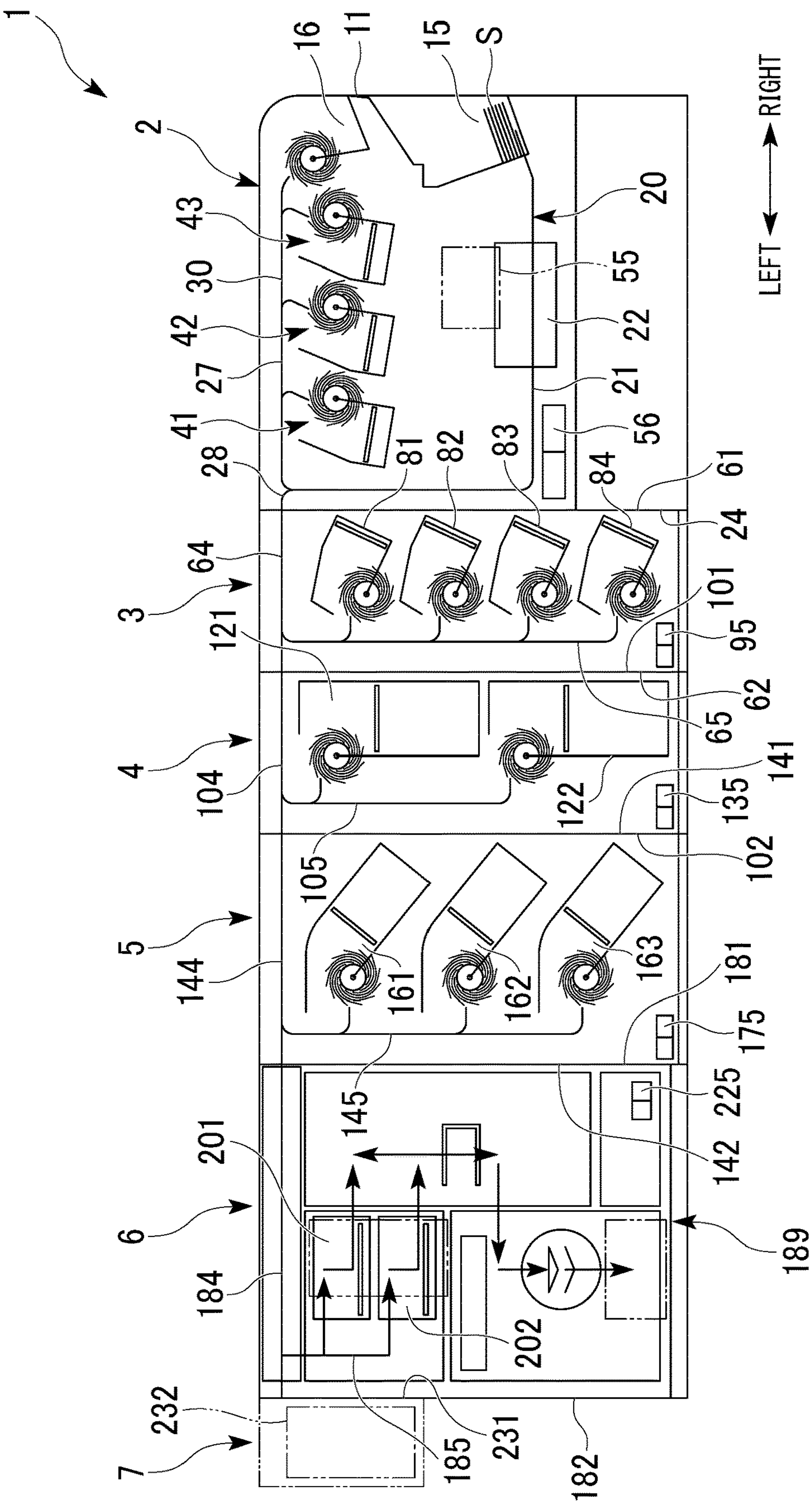
FIG. 1 A schematic block diagram showing a configuration example of a paper sheet processing device according to an embodiment of the present invention.

As shown in FIG. 1, a paper sheet processing device 1 according to the embodiment includes a combination of a base machine 2, a first expansion unit 3 (expansion unit) to a fourth expansion unit 6 (expansion unit) of a plurality of types, and a terminal pocket 7 (stacking portion, terminal stacking portion). Here, the paper sheet processing device 1 is manufactured by selectively setting at least either of the number and type of the first expansion unit 3 to the fourth expansion unit 6 of a plurality of types for combining with the base machine 2 and the terminal pocket 7. The paper sheet processing device 1 is, for example, a banknote processing device that processes banknotes among various types of paper sheets. The paper sheet processing device 1 is constituted by one being appropriately selected by user operation or the like from the first expansion unit 3 to the fourth expansion unit 6 being connected to the base machine 2 serving as a main body, and the terminal pocket 7 being connected to the position most distant from the base machine 2. Of course, it is also possible to have a configuration in which the terminal pocket 7 itself is not connected regardless of the position farthest from the base machine 2 or the like.

<Base Machine 2>

Figure 2:
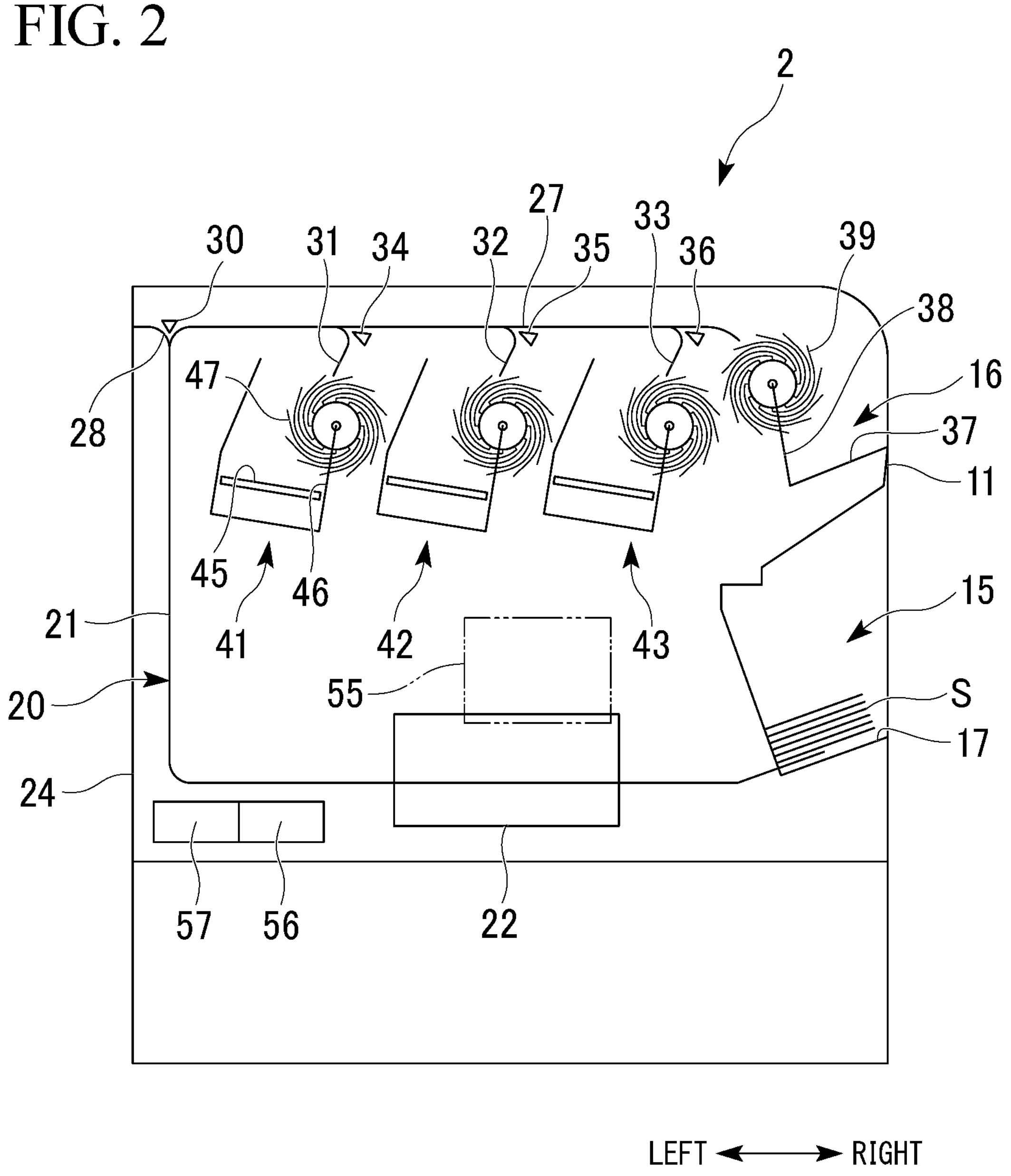
FIG. 2 A front view schematically showing a base machine that constitutes the paper sheet processing device according to the embodiment of the present invention.

As shown in FIG. 2, the base machine 2 is a paper sheet sorting machine that sorts the paper sheet S, and performs a predetermined classification process on the paper sheet S loaded from outside the machine by the operator. For example, a classification process of identifying the paper sheet S loaded from outside the machine by an operator, counting the paper sheet S by denomination, and classifying the paper sheet S by denomination, or a classification process that identifies and counts a plurality of batch processing groups of a paper sheet S by each batch processing group, and stacks the paper sheet S separately by batch processing group may be performed.

The base machine 2 includes a loading portion 15 provided on the right side surface 11 of the main body as viewed from the operator side and that continuously opens to the right side 11 and the front face of the machine body on the operator side, and a rejection portion 16 that is provided above the loading portion 15 on the right side surface 11 and that continuously opens to the right side surface 11 and the front face of the main body.

Paper sheets S are loaded into the loading portion 15 from the outside by the operator. At this time, the paper sheet S is vertically stacked and placed on the bottom surface 17 of the loading portion 15 in a state of the long sides of the paper sheet S being aligned along the front-rear direction of the main body and the short sides along the left-right direction of the main body. The loading portion 15 moves the stacked paper sheet S loaded in this way one by one from the bottom so that the short sides thereof are along the conveyance direction, and feeding to the left of the main body. The paper sheet S moves throughout the entire paper sheet processing device 1 shown in FIG. 1 with the long sides thereof being aligned with the front-back direction of the main body.

The base machine 2 has a base machine feed path 20 for receiving and conveying the paper sheet S that has been loaded into the loading unit 15 and fed out from the loading unit 15. The base machine feed path 20 has an identification conveyance portion 21 that is connected to the input portion 15 and that receives and conveys the paper sheet S fed out from the loading portion 15. The base machine 2 has a validator 22 that identifies the paper sheet S conveyed by the identification conveyance portion 21 in the identification conveyance portion 21. The identification conveyance portion 21 horizontally extends from the loading portion 15 toward the left side surface 24 opposite to the right side surface 11 of the main body, and then extends upward. The validator 22 is provided in this horizontally extending portion of the identification conveyance portion 21.

The base machine feed path 20 has an outward-facing conveyance portion 28 that extends from the upper end of the identification conveyance portion 21 toward the left side surface 24 and opens to the left side surface 24. The base machine 2 also has a reject conveyance portion 27 that extends from the upper end of the identification conveyance portion 21 toward the right side surface 11 and is connected to the rejection portion 16. At the upper end position of the identification conveyance portion 21, a sorting portion 30 for sorting the paper sheet S conveyed by the identification and conveyance portion 21 to the outward-facing conveyance portion 28 and the rejection conveyance portion 27 is provided. In other words, the sorting portion 30 switches the conveyance destination of the paper sheet S from the identification conveyance portion 21 to the outward-facing conveyance portion 28 and the reject conveyance portion 27. The outward-facing conveyance portion 28 and the rejection conveyance portion 27 receive and convey the paper sheet S from the identification conveyance portion 21. The outward-facing conveyance portion 28 receives from the identification conveyance portion 21 the paper sheet S that has been successfully identified as an object to be counted by the validator 22, and conveys it to the outside of the base machine 2. The rejection conveyance portion 27 receives the paper sheet S that could not be successfully identified as a counting target by the validator 22 from the identification conveyance portion 21 and conveys it to the rejection portion 16.

The base machine 2 has a plurality of, specifically, three tributary conveyance portions 31 to 33 that branch off from the intermediate portion of the rejection conveyance portion 27. The base machine 2 has a sorting portion 34 at the position of the tributary conveyance portion 31 that sorts the paper sheet S of the rejection conveyance portion 27 to the tributary conveyance portion 31 and more to the rejection portion 16 side than the tributary conveyance portion 31 of the rejection conveyance portion 27. The base machine 2 has a sorting portion 35 at the position of the tributary conveyance portion 32 that sorts the paper sheet S of the rejection conveyance portion 27 to the tributary conveyance portion 32 and more to the rejection portion 16 side than the tributary conveyance portion 32 of the rejection conveyance portion 27. The base machine 2 has a sorting portion 36 at the position of the tributary conveyance portion 33 that sorts the paper sheet S of the rejection conveyance portion 27 to the tributary conveyance portion 33 and more to the rejection portion 16 side than the tributary conveyance portion 33 of the rejection conveyance portion 27, that is, to the rejection portion 16.

The paper sheet S is fed out from the end of the rejection conveyance portion 27, and rejection portion 16 stacks the paper sheet S thus fed out so as to be removable to the outside. In other words, the rejection portion 16 ejects the paper sheet S conveyed by the rejection conveyance portion 27 to the outside of the machine. Specifically, the rejection portion 16 stacks the paper sheet S other than the paper sheet S successfully identified as the counting target by the validator 22. Therefore, the rejection conveyance portion 27 receives and conveys the paper sheet S other than the paper sheet S successfully identified as the counting target by the validator 22 from the identification conveyance portion 21. Depending on the counting mode, the rejection conveyance portion 27 also receives and conveys the paper sheet S that has been successfully identified as a counting target by the validator 22 from the identification conveyance portion 21.

The rejection portion 16 has a bottom surface 37, a wall surface 38, and an impeller 39 that causes the paper sheet S fed out from the rejection conveyance portion 27 to abut the wall surface 38 and fall toward the bottom surface 37. Therefore, the rejection portion 16 stacks the fed out paper sheet S vertically to be placed on the bottom surface 37.

Each of the tributary conveyance portions 31 to 33 branches downward from the rejection conveyance portion 27, and in conjunction therewith, a plurality of, specifically, three identically shaped stacking portions 41 to 43 are provided on the underside thereof, being arranged side by side. The stacking portions 41 to 43 open to the front surface of the main body of the base machine 2. The leftmost stacking portion 41 among the stacking portions 41 to 43 is connected to the leftmost branch conveyance portion 31 among the branch conveyance portions 31 to 33, the middle stacking portion 42 to the middle branch conveyance portion 32, and the rightmost stacking portion 43 to the rightmost tributary conveyance portion 33. The stacking portions 41 to 43 are provided above validator 22.

The stacking portion 41 stacks the paper sheet S fed out from the tributary conveyance unit 31 so that they can be taken out from the front surface of the main body of the base machine 2. The stacking portion 41 includes an elevatable bottom plate 45 that slopes slightly downward to the right with respect to the horizontal, a wall surface 46 that extends upward on the right side of the bottom plate 45, and an impeller 47 that is arranged at the upper portion of the wall surface 46 and that causes the paper sheet S fed out from the tributary conveyance portion 31 to abut the wall surface 46 and fall toward the bottom plate 45. Therefore, the paper sheet S fed out to the stacking portion 41 is stacked vertically on the bottom plate 45. The bottom plate 45 moves up and down according to the stacking amount of the paper sheet S in the stacking portion 41.

The stacking portions 42 and 43 also have the same structure as the stacking portion 41, with the stacking portion 42 stacking the paper sheet S fed out from the branch conveyance portion 32 so as to be removable to the outside, and the stacking portion 43 stacking the paper sheet S fed out from the branch conveyance portion 33 so as to be removable to the outside. The stacking portions 41 to 43 selectively stack the paper sheet S that has been successfully identified as objects to be counted by the validator 22.

Independently provided in the base machine 2 are a loading portion drive portion (not shown) for driving the loading portion 15 and a base machine feed path drive portion (not shown) for driving the base machine transport path 20, whereby the loading portion 15 and the base machine feed path 20 are individually and independently operable.

The base machine 2 has a touch panel type operation display portion 55 on the front surface of the main body, for inputting operations by the operator and for displaying information to the operator. Further, the base machine 2 is provided with paper sheet detection sensors (not shown) at each portion of the base machine feed path 20 for detecting the conveyance state of the paper sheet S while detecting and counting the paper sheet S. These paper sheet detection sensors detect, as the conveyance state of the paper sheet S, whether the paper sheet S is conveyed normally without oblique feeding, near-feeding, or multi-feeding, or whether there is abnormal conveyance in which there is oblique feeding, near-feeding, or multi-feeding, and detect a jam state of the paper sheet S. That is, the paper sheet detection sensor detects the presence or absence of conveyance abnormalities including abnormal conveyance and occurrence of jams.

The paper sheet detection sensor is, for example, a light-transmissive sensor whose detection unit has a light-emitting unit and a light-receiving unit that allow the paper sheet S being conveyed on the base machine feed path 20 to pass therebetween. The paper sheet detection sensor detects that there is a paper sheet S at the position of the paper sheet detection sensor when the amount of light received by the light-receiving unit drops below a first predetermined value while the light-emitting unit is emitting light. At this time, the paper sheet detection sensor determines that the paper sheet S is being multi-fed if the amount of light transmitted through the paper sheet S is equal to or less than a second predetermined value that is smaller than the first predetermined value, and detects that the paper sheet S is not being multi-fed if greater than the second predetermined value.

The paper sheet detection sensor has a left and right pair of detection units when viewed in the conveyance direction of the paper sheet S, and when the deviation in the detection timing of one paper sheet S by these detection units is equal to or greater than to a predetermined time, the paper sheet detection sensor detects that the paper sheet S is skewed, and if less than the predetermined time, detects that the paper sheet S is not skewed.

When the detection interval between the previously detected paper sheet S and the next detected paper sheet S is equal to or shorter than a predetermined time, the paper sheet detection sensor detects a near feed for these paper sheets S, and when the predetermined time is exceeded, detects no near feed for these paper sheets S.

Further, when the paper sheet detection sensor continuously detects the paper sheet S for a predetermined time or longer, it detects that the paper sheet S is stuck at the position of the paper sheet detection sensor, that is, that a jam has occurred. Further, if the paper sheet detection sensor does not detect the paper sheet S even after a predetermined time has elapsed from the timing at which the paper sheet S should be detected, the paper sheet detection sensor detects that the paper sheet S has become stuck upstream of the position of the paper sheet detection sensor, that is, that a jam has occurred.

A predetermined one of these paper sheet detection sensors is also used as a timing sensor for switching the sorting portions 30, 34 to 36.

The base machine 2 is also provided with a master control portion 56 (control portion) that internally controls the loading portion 15, the rejection portion 16, the identification conveyance portion 21, the validator 22, the rejection conveyance portion 27, the outward-facing conveyance portion 28, the sorting portion 30, the tributary conveyance portions 31 to 33, the sorting portions 34 to 36, and the stacking portions 41 to 43, such as sorting the paper sheet S to the rejection portion 16 and the stacking portions 41 to 43 based on the identification result in the validator 22. The master control portion 56 controls the entire base machine 2 and also, by being communicatively connected via an interface to, among the first expansion unit 3 to the fourth expansion unit 6 shown in FIG. 1, those units that are interconnected to the base machine 2 to constitute the same paper sheet processing device 1, outputs control command signals. As shown in FIG. 2, the base machine 2 is provided with a power supply portion 57 that is connected to an external power supply and supplies power to each part of the base machine 2.

The first expansion unit 3 to the fourth expansion unit 6 and the terminal pocket 7 shown in FIG. 1 can be adjacently connected in a selective manner to the left side surface 24 of the base machine 2.

<First Expansion Unit 3>

Figure 3:
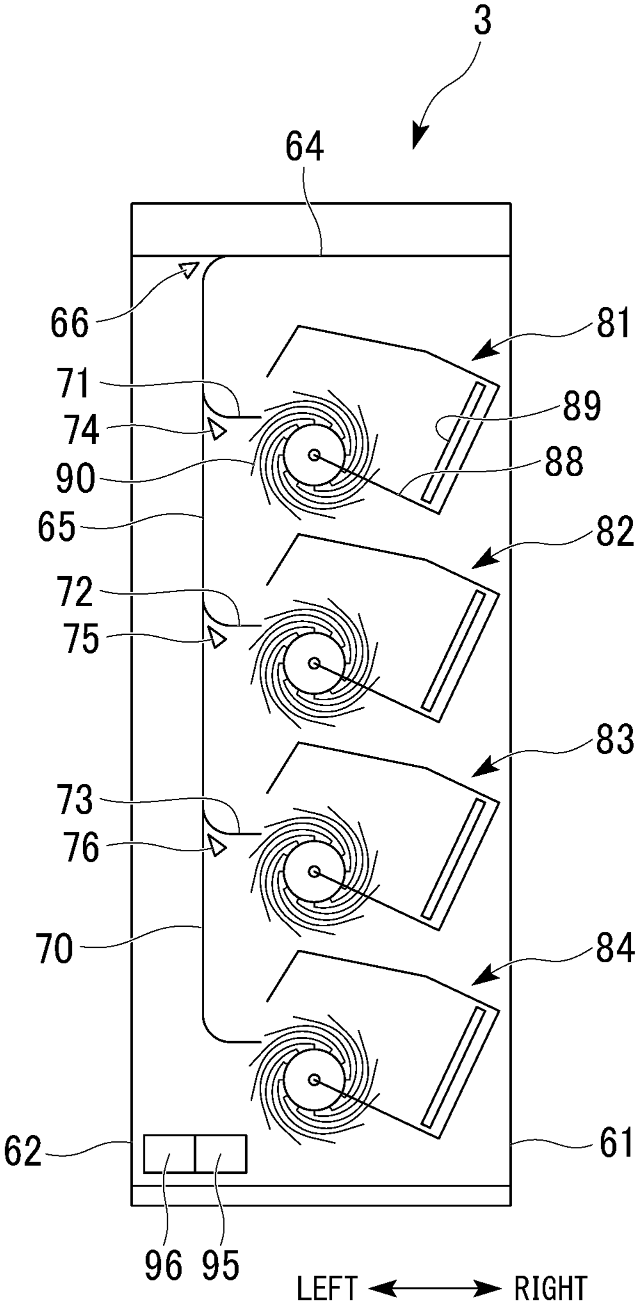
FIG. 3 A front view schematically showing a first expansion unit capable of constituting the paper sheet processing device according to the embodiment of the present invention.

As shown in FIG. 3, the first expansion unit 3 has an extension feed path 64 that opens to the upper part of the right side surface 61 of the main body, extends horizontally and linearly toward the left side surface 62 opposite to the right side surface 61, and opens to the upper part of the left side surface 62, and a branching feed path 65 that branches off from an intermediate position on the left side surface 62 side of the extension feed path 64 and extends downward. As shown in FIG. 1, when the first expansion unit 3 is connected adjacent to the base machine 2 with the right side surface 61 thereof overlaid on the left side surface 24 of the base machine 2, the extension feed path 64 receives and conveys the paper sheet S from the outward-facing conveyance portion 28 of the base machine 2. In other words, the extension feed path 64 extends from the base machine feed path 20, and the branching feed path 65 branches off from the extension feed path 64.

As shown in FIG. 3, the first expansion unit 3 has a sorting portion 66 that sorts the paper sheet S conveyed from the right side surface 61 to the left side surface 62 along the extension feed path 64 to the branching feed path 65 and more to the left side surface 62 side of the extension feed path 64 than the branching feed path 65.

The branching feed path 65 has a main conveyance portion 70 that receives the paper sheet S from an intermediate position of the extension feed path 64 and conveys it downward, and three tributary conveyance portions 71 to 73 branching off from the main conveyance portion 70. The tributary conveyance portions 71 to 73 are arranged side by side in the vertical direction of the main body, and branch off from the main conveyance portion 70 toward the right side surface 61.

The first expansion unit 3 has, at the position of the tributary conveyance portion 71, a sorting portion 74 that sorts the paper sheet S of the main conveyance portion 70 to the tributary conveyance portion 71 and more to the tributary conveyance portion 72 side of the main conveyance portion 70 than the tributary conveyance portion 71. The first expansion unit 3 has, at the position of the tributary conveyance portion 72, a sorting portion 75 that sorts the paper sheet S of the main conveyance portion 70 to the tributary conveyance portion 72 and more to the tributary conveyance portion 73 side of the main conveyance portion 70 than the tributary conveyance portion 72. The first expansion unit 3 has, at the position of the tributary conveyance portion 73, a sorting portion 76 that sorts the paper sheet S of the main conveyance portion 70 to the tributary conveyance portion 73 and more to the side opposite the extension feed path 64 than the tributary conveyance portion 73 of the main conveyance portion 70.

The first expansion unit 3 is provided with paper sheet detection sensors that detect and count the paper sheet S and detect the conveyance state thereof in each part of the extension feed path 64 and the branching feed path 65. These paper sheet detection sensors are the same as the paper sheet detection sensors of the base machine 2, and detect the presence or absence of abnormal conveyance of the paper sheet S, the occurrence of jamming, and the like. A predetermined one of these paper sheet detection sensors is also used as a timing sensor for switching the sorting portions 66, 74 to 76.

The first expansion unit 3 is provided with an extension feed path driving portion (not shown) for driving the extension feed path 64 and a branching feed path driving portion (not shown) for driving the branching feed path 65 independently. In other words, the extension feed path 64 and the branching feed path 65 can operate independently of each other.

The first expansion unit 3 has a plurality of, specifically, four stacking portions 81 to 84 of the same shape on the right side of the tributary conveyance portions 71 to 73 and the end of the main conveyance portion 70. The stacking portions 81 to 84 are arranged vertically. The stacking portions 81 to 84 each perform a stacking process of receiving and stacking the paper sheet S fed out from the branching feed path 65. Each of the stacking portions 81 to 84 opens to the front surface of the main body of the first expansion unit 3.

The uppermost stacking portion 81 of the stacking portions 81 to 84 is connected to the uppermost tributary conveyance portion 71 of the tributary conveyance portions 71 to 73, the stacking portion 82 under the stacking portion 81 is connected to the tributary conveyance portion 72 under the tributary conveyance portion 71, the stacking portion 83 under the stacking portion 82 is connected to the tributary conveyance portion 73 under the tributary conveyance portion 72, and the lowest stacking portion 84 is connected to the end of the main conveyance portion 70.

When the paper sheet processing device 1 has the configuration shown in FIG. 1, the stacking portions 81 to 84 each receive and stack paper sheets S that, after being identified by the validator 22 while being conveyed on the base machine feed path 20, are conveyed by the extension feed path 64 and the branching feed path 65 and fed out from the branching feed path 65. In other words, the first expansion unit 3 has the plurality of stacking portions 81 to 84 that are connected to the branching feed path 65 and stack the paper sheet S after being identified by the validator 22.

As shown in FIG. 3, the stacking portion 81 stacks the paper sheet S fed out from the tributary conveyance portion 71 so as to be removable to the outside from the front surface of the main body of the first expansion unit 3. The stacking portion 81 includes a bottom surface 88 inclined slightly downward to the right with respect to the horizontal, a wall plate 89 positioned perpendicularly to the top of the bottom surface 88 and movable to the left and right, and an impeller 90 that is arranged at the left portion of the bottom surface 88 and that causes the paper sheet S fed out from the tributary conveyance portion 71 to abut the bottom surface 88 and pushes the paper sheet S toward the wall plate 89. Therefore, the paper sheets S fed out to the stacking portion 81 are stacked in the left-right direction, and are taken out to the front from the front surface opening of the main body of the first expansion unit 3. The wall plate 89 moves left and right according to the stacking amount of the paper sheet S in the stacking portion 81.

The stacking portions 82 to 84 have the same structure as the stacking portion 81, with the stacking portion 82 stacking the paper sheet S fed out from the branch conveyance portion 72 so as to be removable to the outside, the stacking portion 83 stacking the paper sheet S fed out from the branch conveyance portion 73 so as to be removable to the outside, and the stacking portion 84 stacking the paper sheet S fed out from the end of the main conveyance portion 70 so as to be removable to the outside.

A slave control portion 95 (control unit) is provided inside the first expansion unit 3 as shown in FIG. 3, and by being communicably connected to the base machine 2 shown in FIG. 2 to receive a control command signal from the master control unit 56 thereof, controls the first expansion unit 3 on the basis of this control command signal. Further, the first expansion unit 3 is provided with a power supply portion 96 that is connected to an external power source and supplies power to each portion of the first expansion unit 3.

The base machine 2 and the first expansion unit 3 to the fourth expansion unit 6 including a separate first expansion unit 3 can be adjacently connected in a selective manner to the right side surface 61 side of the first expansion unit 3. Another first expansion unit 3 to the fourth expansion unit 6 including a separate first expansion unit 3 and the terminal pocket 7 can be adjacently connected in a selective manner to the left side surface 62 side of the first expansion unit 3, which is the side opposite the base machine 2.

<Second Expansion Unit 4>

Figure 4:
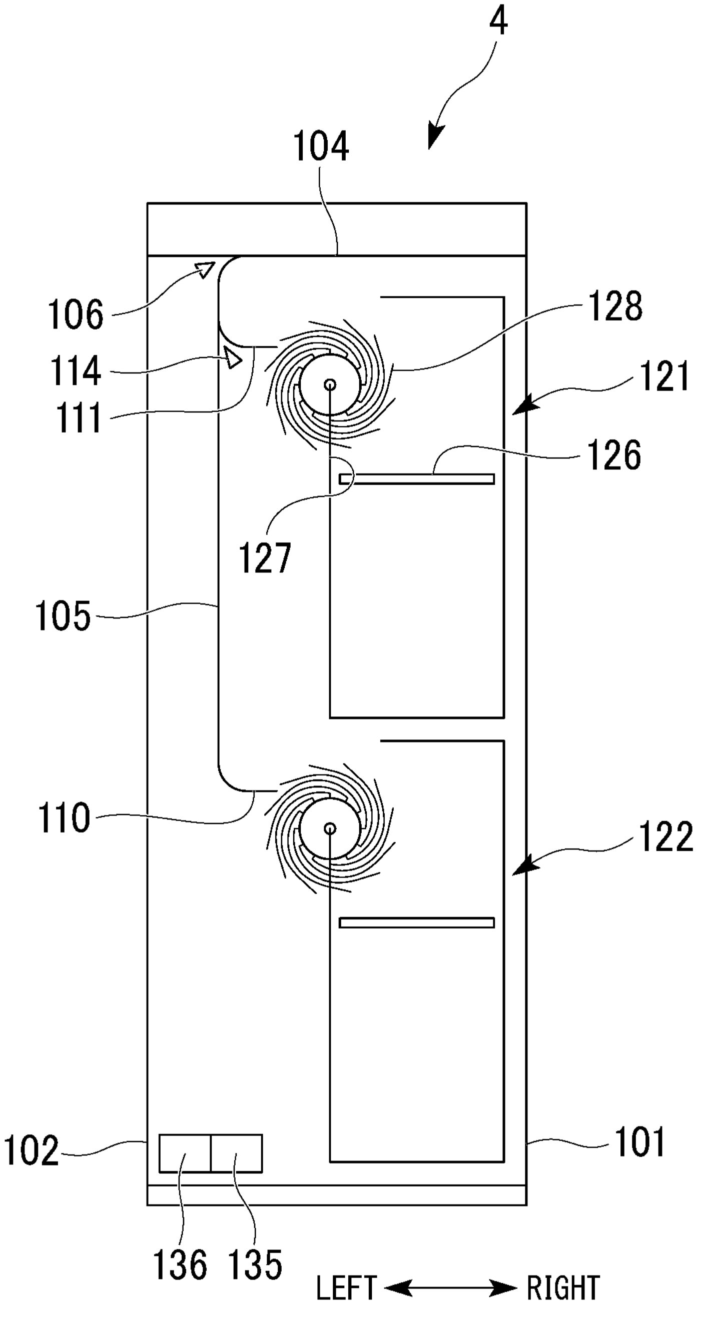
FIG. 4 A front view schematically showing a second expansion unit capable of constituting the paper sheet processing device according to the embodiment of the present invention.

As shown in FIG. 4, the second expansion unit 4 has an extension feed path 104 that opens to the upper part of the right side surface 101 of the main body, extends horizontally and linearly toward the left side surface 102 opposite to the right side surface 101, and opens to the upper part of the left side surface 102, and a branching feed path 105 that branches off from an intermediate position on the left side surface 102 side of the extension feed path 104 and extends downward. As shown in FIG. 1, when the second expansion unit 4 is connected adjacent to the first expansion unit 3 so that the right side surface 101 thereof overlaps the left side surface 62 of the first expansion unit 3, for example as shown in FIG. 1, the extension feed path 104 receives and conveys the paper sheet S from the extension feed path 64 of the first expansion unit 3. In other words, the extension feed path 104 is extended from the base machine feed path 20 via the extension feed path 64, and the branching feed path 105 branches off from the extension feed path 104.

As shown in FIG. 4, the second expansion unit 4 has a sorting portion 106 that sorts the paper sheet S conveyed from the right side surface 101 to the left side surface 102 along the extension feed path 104 to the branching feed path 105 and more to the left side surface 102 side of the extension feed path 104 than the branching feed path 105.

The branching feed path 105 has a main conveyance portion 110 that receives the paper sheet S from an intermediate position of the extension feed path 104 and conveys it downward, and a tributary conveyance portion 111 branching off from the main conveyance portion 110. The tributary conveyance portion 111 branches off from the main conveyance portion 110 toward the right side surface 101. The second expansion unit 4 has, at the position of the tributary conveyance portion 111, a sorting portion 114 that sorts the paper sheet S of the main conveyance portion 110 to the tributary conveyance portion 111 and to more to the side opposite the extension feed path 104 than the tributary conveyance portion 111 of the main conveyance portion 110.

The second expansion unit 4 is provided with paper sheet detection sensors that detect and count the paper sheet S and detect the conveyance state thereof in each part of the extension feed path 104 and the branching feed path 105. These paper sheet detection sensors are the same as the paper sheet detection sensors of the base machine 2, and detect the presence or absence of abnormal conveyance of the paper sheet S, the occurrence of jamming, and the like. A predetermined one of these paper sheet detection sensors is also used as a timing sensor for switching the sorting portions 106, 114.

The second expansion unit 4 is provided with an extension feed path driving portion (not shown) for driving the extension feed path 104 and a branching feed path driving portion (not shown) for driving the branching feed path 105 independently. In other words, the extension feed path 104 and the branching feed path 105 can operate independently of each other.

The second expansion unit 4 has a plurality of, specifically, two stacking portions 121, 122 on the right side of the tributary conveyance portion 111 and the end of the main conveyance portion 110. The stacking portions 121, 122 are arranged vertically. The stacking portions 121, 122 each perform a stacking process of receiving and stacking the paper sheet S fed out from the branching feed path 105, and open to the front surface of the main body of the second expansion unit 4. The upper stacking portion 121 of the stacking portions 121 and 122 is connected to the branch conveyance portion 111, while the lower stacking portion 122 is connected to the end of the main conveyance portion 110.

When the paper sheet processing device 1 has the configuration shown in FIG. 1, the stacking portions 121, 122 each receive and stack paper sheets S that, after being identified by the validator 22 while being conveyed on the base machine feed path 20, are conveyed by the extension feed paths 64, 104 and the branching feed path 105 and fed out from the branching feed path 105. In other words, the second expansion unit 4 has the plurality of stacking portions 121, 122 that are connected to the branching feed path 105 and stack the paper sheet S after being identified by the validator 22.

As shown in FIG. 4, the stacking portion 121 stacks the paper sheet S fed out from the tributary conveyance portion 111 so as to be removable to the outside from the front surface of the main body of the second expansion unit 4. The stacking portion 121 has a bottom plate 126 that is horizontally arranged and which can be raised and lowered, a wall surface 127 which is arranged on the left side of the bottom plate 126 and perpendicular thereto, and an impeller 128 that is arranged at the upper portion of the wall surface 127 and that causes the paper sheet S fed out from the tributary conveyance portion 111 to abut the wall surface and fall to the bottom plate 126. Therefore, the paper sheets S fed out to the stacking portion 121 are stacked vertically on the bottom plate 126, and are taken out to the front from the front surface opening of the second expansion unit 4. The bottom plate 126 moves up and down according to the stacking amount of the paper sheet S in the stacking portion 121.

The stacking portion 122 has the same structure as the stacking portion 121, with the stacking portion 122 stacking the paper sheet S fed out from the end of the main conveyance portion 110 so as to be removable to the outside.

A slave control portion 135 (control unit) is provided inside the second expansion unit 4 as shown in FIG. 4, and by being communicably connected to the base machine 2 shown in FIG. 1 to receive a control command signal from the master control portion 56 thereof, controls the second expansion unit 4 on the basis of this control command signal. Further, the second expansion unit 4 is provided with a power supply portion 136 that is connected to an external power source and supplies power to each portion of the second expansion unit 4. The respective stackable amounts of paper sheet S of the stacking portions 121 and 122 are larger than the stackable amounts of paper sheet S of the stacking units 81 to 84 of the first expansion unit 3.

The base machine 2 and the first expansion unit 3 to the fourth expansion unit 6 including a separate second expansion unit 4 can be adjacently connected in a selective manner to the right side surface 101 side of the second expansion unit 4. The first expansion unit 3 to the fourth expansion unit 6 including a separate second expansion unit 4 and the terminal pocket 7 can be adjacently connected in a selective manner to the left side surface 102 side of the second expansion unit 4, which is the side opposite the base machine 2.

<Third Expansion Unit 5>

Figure 5:
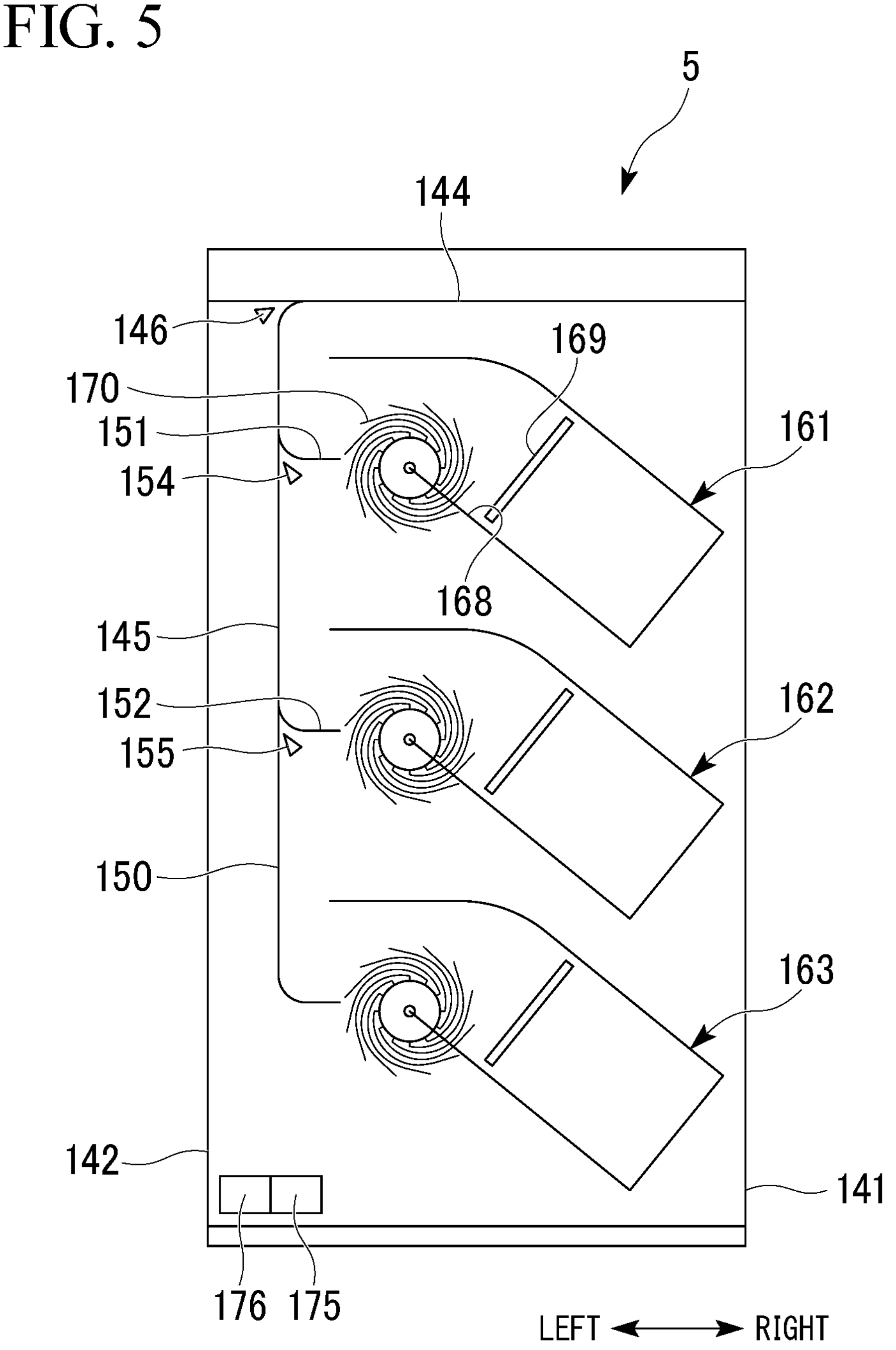
FIG. 5 A front view schematically showing a third expansion unit capable of constituting the paper sheet processing device according to the embodiment of the present invention.

As shown in FIG. 5, the third expansion unit 5 has an extension feed path 144 that opens to the upper part of the right side surface 141 of the main body, extends horizontally and linearly toward the left side surface 142 opposite to the right side surface 141, and opens to the upper part of the left side surface 142, and a branching feed path 145 that branches off from an intermediate position on the left side surface 142 side of the extension feed path 144 and extends downward. As shown in FIG. 1, when the third expansion unit 5 is connected adjacent to the second expansion unit 4 so that the right side surface 141 thereof overlaps the left side surface 102 of the second expansion unit 4, the extension feed path 144 receives and conveys the paper sheet S from the extension feed path 104 of the second expansion unit 4. In other words, the extension feed path 144 is extended from the base machine feed path 20 via the extension feed paths 64, 104, and the branching feed path 145 branches off from the extension feed path 144.

As shown in FIG. 5, the third expansion unit 5 has a sorting portion 146 that sorts the paper sheet S conveyed from the right side surface 141 to the left side surface 142 along the extension feed path 144 to the branching feed path 145 and more to the left side surface 142 side of the extension feed path 144 than the branching feed path 145.

The branching feed path 145 has a main conveyance portion 150 that receives the paper sheet S from an intermediate position of the extension feed path 144 and conveys it downward, and tributary conveyance portions 151, 152 branching off from the main conveyance portion 150. The tributary conveyance portions 151, 152 branch off from the main conveyance portion 150 toward the right side surface 141. The third expansion unit 5 has, at the position of the tributary conveyance portion 151, a sorting portion 154 that sorts the paper sheet S of the main conveyance portion 150 to the tributary conveyance portion 151 and more to the tributary conveyance portion 152 side of the main conveyance portion 150 than the tributary conveyance portion 151. The third expansion unit 5 has, at the position of the tributary conveyance portion 152, a sorting portion 155 that sorts the paper sheet S of the main conveyance portion 150 to the tributary conveyance portion 152 and more to the side opposite the extension feed path 144 than the tributary conveyance portion 152 of the main conveyance portion 150.

The third expansion unit 5 is provided with paper sheet detection sensors that detect and count the paper sheet S and detect the conveyance state thereof in each part of the extension feed path 144 and the branching feed path 145. These paper sheet detection sensors are the same as the paper sheet detection sensors of the base machine 2, and detect the presence or absence of abnormal conveyance of the paper sheet S, the occurrence of jamming, and the like. A predetermined one of these paper sheet detection sensors is also used as a timing sensor for switching the sorting portions 146, 154, 155.

The third expansion unit 5 is provided with an extension feed path driving portion (not shown) for driving the extension feed path 144 and a branching feed path driving portion (not shown) for driving the branching feed path 145 independently. In other words, the extension feed path 144 and the branching feed path 145 can operate independently of each other.

The third expansion unit 5 has a plurality of, specifically, three stacking portions 161 to 163 of the same shape on the right side of the tributary conveyance portions 151, 152 and the end of the main conveyance portion 150. The stacking portions 161 to 163 are arranged vertically. The stacking portions 161 to 163 each perform a stacking process of receiving and stacking the paper sheet S fed out from the branching feed path 145. Each of the stacking portions 161 to 163 opens to the front surface of the main body of the third expansion unit 5.

The uppermost stacking portion 161 of the stacking portions 161 to 163 is connected to the upper tributary conveyance portion 151 of the tributary conveying portions 151, 152, the middle stacking portion 162 is connected to the lower tributary conveyance portion 152, and the lowermost stacking portion 163 is connected to the end of the main conveyance portion 150.

When the paper sheet processing device 1 has the configuration shown in FIG. 1, the stacking portions 161 to 163 each receive and stack the paper sheet S that, after being identified by the validator 22 while being conveyed on the base machine feed path 20, are conveyed by the extension feed paths 64, 104, 144 and the branching feed path 145 and fed out from the branching feed path 145. In other words, the third expansion unit 5 has the plurality of stacking portions 161 to 163 that are connected to the branching feed path 145 and stack the paper sheet S after being identified by the validator 22.

As shown in FIG. 5, the stacking portion 161 stacks the paper sheet S fed out from the tributary conveyance portion 151 so as to be removable to the outside from the front surface of the main body of the third expansion unit 5. The stacking portion 161 includes a bottom surface 168 inclined slightly downward to the right with respect to the horizontal, a wall plate 169 positioned perpendicularly to the upper side of the bottom surface 168 and movable to the left and right, and an impeller 170 that is arranged at the left portion of the bottom surface 168, causes the paper sheet S fed out from the tributary conveyance portion 151 to abut the bottom surface 168 and pushes the paper sheet S toward the wall plate 169. Therefore, the paper sheets S fed out to the stacking portion 161 are stacked in the left-right direction, and are taken out to the front from the front surface opening of the main body of the third expansion unit 5. The wall plate 169 moves left and right according to the stacking amount of the paper sheet S in the stacking portion 161.

The stacking portions 162, 163 also have the same structure as the stacking portion 161, with the stacking portion 162 stacking the paper sheet S fed out from the branch conveyance portion 152 so as to be removable to the outside, and the stacking portion 163 stacking the paper sheet S fed out from the end of the main conveyance portion 150 so as to be removable to the outside.

A slave control portion 175 (control unit) is provided inside the third expansion unit 5 as shown in FIG. 5, and by being communicably connected to the base machine 2 shown in FIG. 1 to receive a control command signal from the master control portion 56 thereof, controls the third expansion unit 5 on the basis of this control command signal. Further, the third expansion unit 5 is provided with a power supply portion 176 that is connected to an external power source and supplies power to each portion of the third expansion unit 5. The respective stackable amounts of paper sheets S of the stacking portions 161 to 163 are larger than the stackable amounts of paper sheets S of the stacking portions 81 to 84 of the first expansion unit 3, and smaller than the stackable amounts of paper sheets S of the stacking portions 121, 122 of the second expansion unit 4.

The base machine 2 and the first expansion unit 3 to the fourth expansion unit 6 including a separate third expansion unit 5 can be adjacently connected in a selective manner to the right side surface 141 side of the third expansion unit 5. Another first expansion unit 3 to the fourth expansion unit 6 including a separate third expansion unit 5 and the terminal pocket 7 can be adjacently connected in a selective manner to the left side surface 142 side of the third expansion unit 5, which is the side opposite the base machine 2.

<Fourth Expansion Unit 6>

Figure 6:
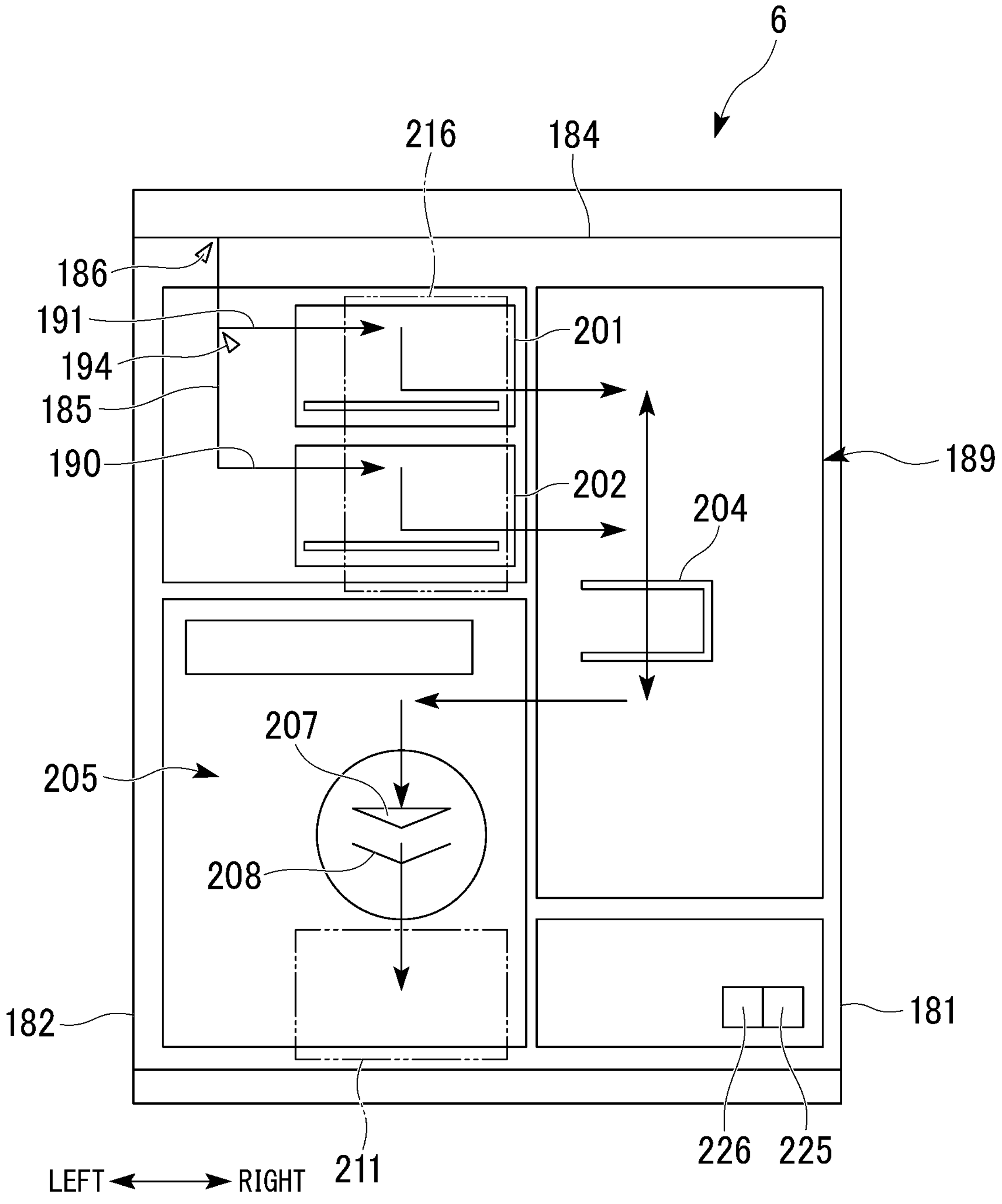
FIG. 6 A front view schematically showing a fourth expansion unit capable of constituting the paper sheet processing device according to the embodiment of the present invention.

As shown in FIG. 6, the fourth expansion unit 6 has an extension feed path 184 that opens to the upper part of the right side surface 181 of the main body, extends horizontally and linearly toward the left side surface 182 opposite to the right side surface 181, and opens to the upper part of the left side surface 182, and a branching feed path 185 that extends downward from an intermediate position on the left side surface 182 side of the extension feed path 184. As shown in FIG. 1, when the fourth expansion unit 6 is connected adjacent to the third expansion unit 5 so that the right side surface 181 thereof overlaps for example the left side surface 142 of the third expansion unit 5, the extension feed path 184 receives and conveys the paper sheet S from the extension feed path 144 of the third expansion unit 5. In other words, the extension feed path 184 is extended from the base machine feed path 20 via the extension feed paths 64, 104, 144, and the branching feed path 185 branches off from the extension feed path 184.

As shown in FIG. 6, the fourth expansion unit 6 has a sorting portion 186 that sorts the paper sheet S conveyed from the right side surface 181 to the left side surface 182 along the extension feed path 184 to the branching feed path 185 and more to the left side surface 182 side of the extension feed path 184 than the branching feed path 185.

The side of the branching feed path 185 opposite the extension feed path 184 is connected to a bundling portion 189 that stacks and binds a predetermined number (100) of paper sheets S.

The branching feed path 185 has a main conveyance portion 190 that receives the paper sheet S from an intermediate position of the extension feed path 184 and conveys it downward, and a tributary conveyance portion 191 branching off from the main conveyance portion 190. The tributary conveyance portion 191 branches off from the main conveyance portion 190 toward the right side surface 181. The fourth expansion unit 6 has, at the position of the tributary conveyance portion 191, a sorting portion 194 that sorts the paper sheet S of the main conveyance portion 190 to the tributary conveyance portion 191 and to more to the side opposite the extension feed path 184 than the tributary conveyance portion 191 of the main conveyance portion 190.

The fourth expansion unit 6 is provided with paper sheet detection sensors that detect and count the paper sheet S and detect the conveyance state thereof in each part of the extension feed path 184 and the branching feed path 185. These paper sheet detection sensors are the same as the paper sheet detection sensors of the base machine 2, and detect the presence or absence of abnormal conveyance of the paper sheet S, the occurrence of jamming, and the like. A predetermined one of these paper sheet detection sensors is also used as a timing sensor for switching the sorting portions 186, 194.

The fourth expansion unit 6 is provided with an extension feed path driving portion (not shown) for driving the extension feed path 184 and a branching feed path driving portion (not shown) for driving the branching feed path 185 independently. In other words, the extension feed path 184 and the branching feed path 185 can operate independently of each other.

The bundling portion 189 has a plurality of, specifically, two bonding stackers 201, 202 (stacking portions) on the right side of the tributary conveyance portion 191 and the end of the main conveyance portion 190. The bonding stackers 201, 202 are arranged vertically. The bonding stackers 201, 202 each perform an alignment and stacking process of receiving the paper sheet S fed out from the branching feed path 185 and aligning and stacking a predetermined binding unit sheet number (for example, 100 sheets), horizontally oriented, in the vertical direction. The upper bonding stacker 201 of the bonding stackers 201 and 202 is connected to the tributary conveyance portion 191, while the lower bonding stacker 202 is connected to the end of the main conveyance portion 190.

When the paper sheet processing device 1 has the configuration shown in FIG. 1, the bonding stackers 201, 202 each receive and stack paper sheets S that, after being identified by the validator 22 while being conveyed on the base machine feed path 20, are conveyed by the extension feed paths 64, 104, 144, 184 and the branching feed path 185 and fed out from the branching feed path 185. In other words, the fourth expansion unit 6 has the plurality of bonding stackers 201, 202 that are connected to the branching feed path 185 and stack the paper sheet S after being identified by the validator 22.

As shown in FIG. 6, the bundling portion 189 has a descending conveyance portion 204 for loading the stacked paper sheet S fed rightward from the bonding stackers 201 and 202 in a horizontal state and conveying the paper sheet S vertically downward. The bundling portion 189 also has, below the bonding stacker 202, a sealing portion 205 that collects a predetermined number of loose paper sheets S into a bundling unit to manufacture a small bundle of paper sheets integrated with bundling tape by bundling the stacked paper sheets S conveyed down by the descending conveyance portion 204 and sent out from the descending conveyance portion 204 in a horizontal state to the left side of the machine.

The sealing portion 205 creates the small bundles of paper sheets one bundle at a time, having gripping members 207, 208 that sandwich from top and bottom the stacked paper sheets S set leftward in the main body from the descending conveyance portion 204 and bend them into a V shape, and creates the small bundle of paper sheets by wrapping bundling tape around the stacked paper sheets S held by the gripping members 207, 208, gluing and cutting the bundling tape, and then pulling the gripping members 207, 208 away from the bundling tape.

Further, the bundling portion 189 has a drawer-type storage chamber 211 below the sealing portion 205 for receiving the small bundles of paper sheets produced by the sealing portion 205. The storage chamber 211 can be pulled out from the front surface of the fourth expansion unit 6. That is, the storage chamber 211 accepts small bundles of paper sheets from the sealing portion 205 in a state of being pushed into the main body, and by afterward being pulled out from the front surface, the small bundles of paper sheets can be removed from the machine. A door 216 is provided on the front of the main body of the fourth expansion unit 6 at the location of the bonding stackers 201, 202 to allow fractional paper sheets of the bonding stackers 201, 202 to be removed from the machine.

A slave control portion 225 (control unit) is provided inside the fourth expansion unit 6 as shown in FIG. 6, and by being communicably connected to the base machine 2 shown in FIG. 1 to receive a control command signal from the master control portion 56 thereof, controls the fourth expansion unit 6 on the basis of this control command signal. Further, the fourth expansion unit 6 is provided with a power supply portion 226 that is connected to an external power source and supplies power to each portion of the fourth expansion unit 6.

The base machine 4 and the first expansion unit 3 to the fourth expansion unit 6 including a separate fourth expansion unit 6 can be adjacently connected in a selective manner to the right side surface 181 side of the fourth expansion unit 6. Another first expansion unit 3 to the fourth expansion unit 6 including a separate fourth expansion unit 6 and the terminal pocket 7 can be adjacently connected in a selective manner to the left side surface 182 side of the fourth expansion unit 6, which is the side opposite the base machine 2.

<Terminal Pocket 7>

Figure 7:
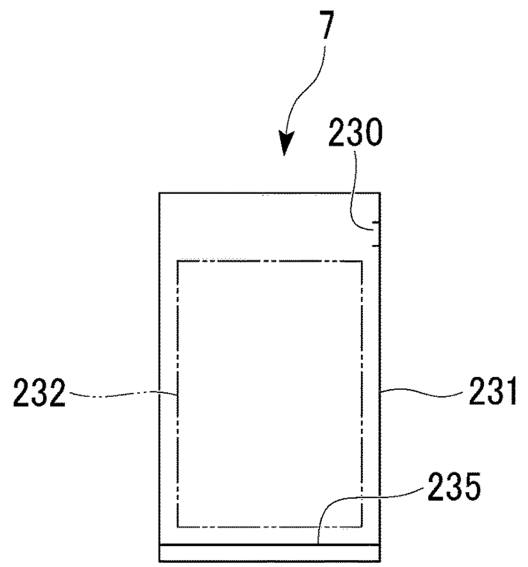
FIG. 7 A front view schematically showing a terminal pocket capable of constituting the paper sheet processing device according to the embodiment of the present invention.

As shown in FIG. 7, the terminal pocket 7 has an opening portion 230 at the top of right side surface 231. The terminal pocket 7 is a storage pocket that receives the paper sheet S fed out from the opening portion 230 and stacks the paper sheet S in the vertical direction on the bottom surface 235 in a horizontal orientation. The terminal pocket 7 has an opening/closing door 232 on the front surface for allowing the paper sheet S housed in the terminal pocket 7 to be taken out to the outside.

The base machine 2 and the first expansion unit 3 to the fourth extension unit 6 can be connected in a selective manner to the right side surface 231 side of the terminal pocket 7. When the base machine 2 is adjacently connected to the right side surface 231 side of the terminal pocket 7, the opening portion 230 of the terminal pocket 7 receives and stores the paper sheet S conveyed by the outward-facing conveyance portion 28 of the base machine 2 shown in FIG. 2 at the conveyance terminal position in the paper sheet processing device 1.

When any one of the first expansion unit 3 to the fourth expansion unit 6 is adjacently connected to the right side surface 231 of the terminal pocket 7, the paper sheet S conveyed on the extension feed path of the expansion unit adjacent to the terminal pocket 7 among the extension feed paths 64, 104, 144, 185 shown in FIGS. 3 to 6 is received and stored through the opening portion 230 at the conveyance terminal position of the paper sheet processing device 1.

<Overall Configuration of Paper Sheet Processing Device 1>

The paper sheet processing device 1 is manufactured by preparing the required number of the required types from the multiple types of the first expansion unit 3 to fourth expansion unit 6, sequentially connecting them to the base machine 2 in a set order, and connecting the terminal pocket 7 at the position farthest from the base machine 2. That is, various combinations of the paper sheet processing device 1 are possible, such as making the paper sheet processing device 1 by connecting only one of the first expansion unit 3 to the fourth expansion unit 6 selected and set adjacent to the base machine 2 and connecting the terminal pocket 7 thereto, making the paper sheet processing device 1 by connecting a plurality of units of different types selected and set among the first expansion unit 3 to the fourth expansion unit 6 to the base machine 2 and connecting the terminal pocket 7 thereto, making the paper sheet processing device 1 by connecting a plurality of units of the same type among the first expansion unit 3 to the fourth expansion unit 6 to the base machine 2 and connecting the terminal pocket 7 thereto, making the paper sheet processing device 1 by connecting a plurality of units of the same type among the first expansion unit 3 to the fourth expansion unit 6 to the base machine 2 and further connecting one or more units of different types, and connecting the terminal pocket 7 thereto. That is, one paper sheet processing device 1 is manufactured by combining one base machine 2 with any number of the first expansion unit 3 to the fourth expansion unit 6, together with the terminal pocket 7. Of course, in any combination, when a plurality of units out of the first expansion unit 3 to the fourth expansion unit 6 are connected to the base machine 2, the arrangement order of the expansion units can also be selected and set. The paper sheet processing device 1 can be configured without the terminal pocket 7.

When the paper sheet processing device 1 includes at least one of the expansion units 3 through 6, in any combination, the master control portion 56 of the base machine 2 is connected in a communicable manner to the slave control portions among the connected slave control portions 95, 135, 175, 225 of the expansion units 3 through 6 via communication cables (not shown), and outputs control command signals to the slave control portions of the connected units. When the paper sheet processing device 1 includes at least one of the first expansion unit 3 to the fourth expansion unit 6, in any combination, the power supply portion of the connected one of the power supply portions 96, 136, 176, 226 of the expansion units 3 through 6 is turned on and off in conjunction with the power supply portion 57 of the base machine 2.

For example, as shown in FIG. 1, one first expansion unit 3 is connected to the base machine 2 by a coupling mechanism (not shown), with the right side surface 61 of the first expansion unit 3 making contact with the left side surface 24 of the base machine 2, and the outward-facing conveyance portion 28 and the extension feed path 64 arranged so that the paper sheet S can be delivered. One second expansion unit 4 is connected to this first expansion unit 3 by a coupling mechanism (not shown), with the right side surface 101 of the second expansion unit 4 making contact with the left side surface 62 of the first expansion unit 3, and the extension feed path 64 and the extension feed path 104 arranged so that the paper sheet S can be delivered. One third expansion unit 5 is connected to this second expansion unit 4 by a coupling mechanism (not shown), with the right side surface 141 of the third expansion unit 5 making contact with the left side surface 102 of the second expansion unit 4, and the extension feed path 104 and the extension feed path 144 arranged so that the paper sheet S can be delivered. One fourth expansion unit 6 is connected to this third expansion unit 5 by a coupling mechanism (not shown), with the right side surface 181 of the fourth expansion unit 6 making contact with the left side surface 142 of the third expansion unit 5, and the extension feed path 144 and the extension feed path 184 arranged so that the paper sheet S can be delivered. One terminal pocket 7 is connected to this fourth expansion unit 6 by a coupling mechanism (not shown), with the right side surface 231 of the terminal pocket 7 making contact with the left side surface 182 of the fourth expansion unit 6, so that a paper sheet S can be passed from the extension feed path 184 to the terminal pocket 7. In this manner, a single paper sheet processing device 1 is manufactured. In this case, the terminal pocket 7 receives and stacks the paper sheet S from the opening at the end of the extension feed path 184.

In this configuration, in the paper sheet processing device 1, the master control portion 56 of the base machine 2 controls the base machine 2 and also the slave control portion 95 of the first expansion unit 3, the slave control portion 95 of the second expansion unit 4, the slave control portion 175 of the third expansion unit 5, and the slave control portion 225 of the fourth expansion unit 6 by outputting control command signals to each.

Unit station address #1 is preset for the first expansion unit 3, unit station address #2 for the second expansion unit 4, unit station address #3 for the third expansion unit 5, and unit station address #4 for the fourth expansion unit 6.

When performing necessary communication with, for example, the slave control portion 95 of the first expansion unit 3, the master control portion 56 of the base machine 2 transmits a control command signal specifying the unit station address #1. When the control command signal specifying unit station address #1 is received in this manner, only the slave control portion 95 of the first expansion unit 3 recognizes the reception of a control command signal addressed to its own station. Conversely, when the slave control portion 95 of the first expansion unit 3 makes a required communication to the master control portion 56 of the base machine 2, the slave control portion 95 does so by sending a signal with the unit station address #1 appended. Upon receiving a signal specifying unit station address #1, only the master control portion 56 of the base machine 2 recognizes the reception of the signal from the slave control portion 95 of the first expansion unit 3.

This mechanism is similar between the master control portion 56 of the base machine 2 and the slave control portion 135 of the second expansion unit 4, between the master control portion 56 of the base machine 2 and the slave control portion 175 of the third expansion unit 5, and between the master control portion 56 of the base machine 2 and the slave control portion 225 of the fourth expansion unit 6. This is the mechanism by which such an interface is established between the master control portion 56 and the multiple slave control portions 95, 135, 175, and 225.

In the paper sheet processing device 1, the master control portion 56 of the base unit 2 sets, based on a setting input to the operation display portion 55, whether the destination by classification for the classified paper sheet S is any of the stacking portions 41 to 43 of the base machine 2, the stacking portions 81 to 84 of the first expansion unit 3, the stacking portions 121, 122 of the second expansion unit 4, the stacking portions 161 to 163 of the third expansion unit 5, the bundling portion 189 of the fourth expansion unit 6 and the terminal pocket 7.

The master control portion 56 causes the paper sheet S to be fed one by one to the identification conveyance portion 21 by the input unit 15, conveyed by the identification conveyance portion 21, and identified by the validator 22. The destination of each paper sheet S is determined from the identification result of the validator 22. The master control portion 56 causes the paper sheet S other than the paper sheet S successfully identified by the identifying portion unit 22 as count targets to be guided from the identification conveyance portion 21 to the rejection conveyance portion 27 by the sorting portion 30 shown in FIG. 2, and fed out from the terminal of the rejection conveyance portion 27 to the rejection portion 16. The master control portion 56 guides the paper sheet S of the type successfully identified from the identification result of the validator 22 as a counting object and to be conveyed to the stacking portion 41 from the identification conveyance portion 21 to the rejection conveyance portion 27 by the sorting portion 30, and causes the paper sheet S to be sorted from the rejection conveyance portion 27 to the tributary conveyance portion 31 by the sorting portion 34 and fed out to the stacking portion 41. The master control portion 56 guides the paper sheet S of the type successfully identified from the identification result of the validator 22 as a counting object and to be conveyed to the stacking portion 42 from the identification conveyance portion 21 to the rejection conveyance portion 27 by the sorting portion 30, and causes the paper sheet S to be sorted from the rejection conveyance portion 27 to the tributary conveyance portion 32 by the sorting portion 35 and fed out to the stacking portion 42. The master control portion 56 guides the paper sheet S of the type successfully identified from the identification result of the validator 22 as a counting object and to be conveyed to the stacking portion 43 from the identification conveyance portion 21 to the rejection conveyance portion 27 by the sorting portion 30, and causes the paper sheet S to be sorted from the rejection conveyance portion 27 to the tributary conveyance portion 33 by the sorting portion 36 and fed out to the stacking portion 43.

The master control portion 56 guides the paper sheet S of the type successfully identified from the identification result of the validator 22 as a counting object and to be conveyed to any of the stacking portions 81 to 84 of the first expansion unit 3, the stacking portions 121 and 122 of the second expansion unit 4, the stacking portions 161 to 163 of the third expansion unit 5, and the bundling portion 189 of the fourth expansion unit 6 from the identification conveyance portion 21 to the outward-facing conveyance portion 28 by the sorting portion 30, and conveys the paper sheet S by the outward-facing conveyance portion 28 to the first expansion unit 3 shown in FIG. 1. At the same time, the master control portion 56 outputs a control command signal including the identification information of the conveyance destination for this paper sheet S to the slave control portion 95 of the first expansion unit 3, the slave control portion 135 of the second expansion unit 4, the slave control portion 175 of the third expansion unit 5, and the slave control portion 225 of the fourth expansion unit 6.

The slave control portion 95 of the first expansion unit 3 controls the first expansion unit 3 based on the control command signal received from the master control portion 56. For example, upon detecting the paper sheet S by a predetermined paper sheet detection sensor (not shown) provided more to the right side surface 61 side than the sorting portion 66 in the extension feed path 64 shown in FIG. 3, when the control command signal for the paper sheet S contains a designation of any of the stacking portions 81 to 84 as the conveyance destination, the extension feed path 64, the branching feed path 65 and the sorting portions 66, 74 to 76 are controlled to send this paper sheet S to the designated one of the stacking portions 81 to 84. On the other hand, when the control command signal for the paper sheet S detected by this predetermined paper sheet detection sensor does not contain designation of any of the stacking portions 81 to 84 as the conveyance destination, the extension feed path 64 and the sorting portion 66 are controlled to send this paper sheet S to the extension feed path 104 of the second extension unit 4 shown in FIG. 1.

Therefore, the extension feed path 64 of the first expansion unit 3 accepts the paper sheet S that has been successfully identified as a counting object by the validator 22 of the base machine 2 and conveyed by the outward-facing conveyance portion 28, and conveys the paper sheet S toward the outside of the machine on the side of the first expansion unit 3 on the opposite side of the base machine 2. Also, the branching feed path 65 of the first expansion unit 3 branches off from the extension feed path 64 to convey the paper sheet S. The stacking portions 81 to 84 of the first expansion portion 3 classify and stack the paper sheet S conveyed by the branching feed path 65.

The slave control portion 135 of the second expansion unit 4 controls the second expansion unit 4 based on the control command signal received from the master control portion 56. For example, upon detecting the paper sheet S by a predetermined paper sheet detection sensor (not shown) provided more to the right side surface 101 side than the sorting portion 106 in the extension feed path 104 shown in FIG. 4, when the control command signal for the paper sheet S contains a designation of either one of the stacking portions 121, 122 as the conveyance destination, the extension feed path 104, the branching feed path 105 and the sorting portions 106, 114 are controlled to send this paper sheet S to the designated one of the stacking portions 121, 122. On the other hand, when the control command signal for the paper sheet S detected by this predetermined paper sheet detection sensor does not contain a designation of either of the stacking portions 121, 122 as the conveyance destination, the extension feed path 104 and the sorting portion 106 are controlled to send this paper sheet S to the extension feed path 144 of the third expansion unit 5 shown in FIG. 1.

Therefore, the extension feed path 104 of the second expansion unit 4 accepts the paper sheet S that has been successfully identified as a counting object by the validator 22 of the base machine 2 and conveyed by the outward-facing conveyance portion 28, and conveys the paper sheet S toward the outside of the machine on the side of the second expansion unit 4 on the opposite side of the base machine 2. Also, the branching feed path 105 of the second expansion unit 4 branches off from the extension feed path 104 to convey the paper sheet S. The stacking portions 121, 122 of the second expansion portion 4 stack the paper sheet S conveyed by the branching feed path 105.

The slave control portion 175 of the third expansion unit 5 controls the third expansion unit 5 based on the control command signal received from the master control portion 56. For example, upon detecting the paper sheet S by a predetermined paper sheet detection sensor (not shown) provided more to the right side surface 141 side than the sorting portion 146 in the extension feed path 144 shown in FIG. 5, when the control command signal for the paper sheet S contains a designation of any one of the stacking portions 161 to 163 as the conveyance destination, the extension feed path 144, the branching feed path 145 and the sorting portions 146, 154, 155 are controlled to send this paper sheet S to the designated one of the stacking portions 161 to 163. On the other hand, when the control command signal for the paper sheet S detected by this predetermined paper sheet detection sensor does not contain a designation of any of the stacking portions 161 to 163 as the conveyance destination, the extension feed path 144 and the sorting portion 146 are controlled to send this paper sheet S to the extension feed path 184 of the fourth expansion unit 6 shown in FIG. 1.

Therefore, the extension feed path 144 of the third expansion unit 3 accepts the paper sheet S that has been successfully identified as a counting object by the validator 22 of the base machine 3 and conveyed by the outward-facing conveyance portion 28, and conveys the paper sheet S toward the outside of the machine on the side of the third expansion unit 5 on the opposite side of the base machine 2. Also, the branching feed path 145 of the third expansion unit 5 branches off from the extension feed path 144 to convey the paper sheet S. The stacking portions 161 to 163 of the third expansion portion 5 classify and stack the paper sheet S conveyed by the branching feed path 145.

The slave control portion 225 of the fourth expansion unit 6 controls the fourth expansion unit 6 based on the control command signal received from the master control portion 56. For example, upon detecting the paper sheet S by a predetermined paper sheet detection sensor provided more to the right side surface 181 side than the sorting portion 186 in the extension feed path 184 shown in FIG. 6, when the control command signal for the paper sheet S contains a designation of the bundling portion 189 as the conveyance destination, the extension feed path 184, the branching feed path 185 and the sorting portions 186, 194 are controlled to send this paper sheet S to the then-currently stacking one among the bonding stackers 201, 202. On the other hand, when the control command signal for the paper sheet S detected by this predetermined paper sheet detection sensor does not contain a designation of the bundling portion 189 as the conveyance destination, the extension feed path 184 and the sorting portion 186 are controlled to send this paper sheet S to the terminal pocket 7 shown in FIG. 1.

The slave control unit 225 of the fourth extension unit 6 feeds the paper sheet S to one of the bonding stackers 201, 202 shown in FIG. 6, and when the number of stacked sheets in one thereof reaches the unit number of sheets for bundling, the paper sheets S are fed into the other one, and the stacked paper sheets S of the bundling unit number are conveyed by the descending conveyance portion 204, bundled by the sealing portion 205, and fed into the storage chamber 211.

Therefore, the extension feed path 184 of the fourth expansion unit 6 accepts the paper sheet S that has been successfully identified as a counting object by the validator 22 of the base machine 2 shown in FIG. 1 and conveyed by the outward-facing conveyance portion 28, and conveys the paper sheet S toward the outside of the machine on the side of the fourth expansion unit 6 on the opposite side of the base machine 2. Also, the branching feed path 185 of the fourth expansion unit 6 branches off from the extension feed path 184 to convey the paper sheet S. The bundling portion 189 of the fourth expansion portion 6 bundles the paper sheet S conveyed by the branching feed path 185.

<Control Contents: Normal>

The master control unit 56 of the base machine 2 takes in the paper sheet S fed into the loading portion 15 one by one, and conveys the paper sheet S that has been successfully identified as a counting object by the validator 22 to, for example, the predetermined stacking portions 41 to 43 to be stacked, in accordance with the counting mode. Also, the paper sheet S other than the paper sheet S successfully identified as a counting object is conveyed to the rejection portion 16 to be stacked.

A counting mode is a mode pertaining to operation that has been prepared in advance in plurality and stored in the storage portion of the master control portion 56. A mode that, for example, among the paper sheet S successfully identified by the validator 22 as a counting object, sorts and stacks by denomination paper sheet S of 10,000-yen, 5,000-yen, and 1,000-yen notes in the three stacking portions 41 to 43 of the base machine 2, and stacks other paper sheet S in the rejection portion 16 is set as a first counting mode. In the first counting mode, for example, 10,000-yen notes are set to be stacked in the stacking portion 41, 5,000-yen notes are stacked in the stacking portion 42, and 1,000-yen notes are stacked in the stacking portion 43, respectively.

A mode that, for example, among the paper sheet S successfully identified by the validator 22 as a counting object, sorts and stacks by denomination paper sheet S of 10,000-yen, 5,000-yen, 2,000-yen, and 1,000-yen notes in the four stacking portions 81 to 84 of the first expansion unit 3 and stacks other paper sheets S in the rejection portion 16 is set as a second counting mode. In the second counting mode, for example, 10,000-yen notes are set to be stacked in the stacking portion 81, 5,000-yen notes are stacked in the stacking portion 82, 2,000-yen notes are stacked in the stacking portion 83, and 1,000-yen notes are stacked in the stacking portion 84, respectively.

For example, as an operation for counting a large number of paper sheets S, a mode that, for example, among the paper sheet S successfully identified by the validator 22 as a counting object, sorts and stacks by denomination paper sheets S of 10,000-yen notes in the two stacking portions 121 and 122 of the second expansion unit 4, 5,000-yen bills, 2,000-yen, and 1,000-yen notes in the three stacking portions 161 to 163 of the third expansion portion 5, and stacks other paper sheets S in the rejection portion 16 is set as a third counting mode. In the third counting mode, for example, 5,000-yen notes are set to be stacked in the stacking portion 161, 2,000-yen notes are stacked in the stacking portion 162, and 1,000-yen notes are stacked in the stacking portion 163, respectively. In addition, in the third counting mode, 10,000-yen notes are stacked first in the stacking portion 121 of the two stacking portions 121 and 122, and when the stacking portion 121 is full, the 10,000-yen notes are stacked in the stacking portion 122.

A mode that, for example, after stacking by denomination 10,000-yen and 1,000-yen notes, among the paper sheet S successfully identified by the validator 22 as a counting object, in the two bonding stackers 201, 202 of the fourth expansion unit 6, performs sealing with the sealing portion 205 located thereunder and stores the sealed small bundles in the storage chamber 211 is set as the fourth counting mode.

As described above, the operator can select the desired counting mode on the operation display portion 55, and then feed the paper sheet S into the loading portion 15 for counting.

A count sensor (not shown) is provided at each entrance of the stacking portions 41 to 43, 81 to 84, 121, 122, 161 to 163 and the bonding stackers 201 and 202. The master control portion 56 of the base machine 2 counts the number of paper sheets S that have passed through the count sensors, and confirms and detects the number of sheets stacked in each of the stacking portions 41 to 43. The slave control portion 95 of the first expansion unit 3 counts the number of paper sheets S that have passed through the count sensors, and confirms and detects the number of sheets stacked in each of the stacking portions 81 to 84. Similarly, the slave control portion 135 of the second expansion unit 4 counts the number of paper sheets S that have passed through the count sensors, and confirms and detects the number of sheets stacked in each of the stacking portions 121 and 122, the slave control portion 175 of the third expansion unit 5 counts the number of paper sheets S that have passed through the count sensors, and confirms and detects the number of sheets stacked in each of the stacking portions 161 to 163 and the slave control portion 225 of the fourth expansion unit 6 counts the number of paper sheets S that have passed through the count sensors, and confirms and detects the number of sheets counted in each of the bonding stackers 201 and 202.

The stacking portions 41 to 43, 81 to 84, 121, 122, 161 to 163 and the bonding stackers 201 and 202 are each provided with a stacking portion residual sensor (not shown), with the slave control portions 95, 135, 175, 225 of the first expansion units 3 to the fourth expansion unit 6 capable of detecting whether or not a paper sheet S remains in the stacking portions 41 to 43, 81 to 84, 121, 122, 161 to 163, and the bonding stackers 201 and 202, respectively, depending on whether the corresponding stacking portion residual sensor detects a paper sheet S. The information detected by the slave control portions 95, 135, 175, and 225 is transmitted to the master control portion 56 of the base machine 2 through the above-described interface, and is centrally managed by the master control portion 56.

(Second Counting Mode: Normal)

Next, in the second counting mode, control of the master control portion 56 of the base machine 2 and the slave control portions 95, 135, 175, 225 of the first expansion unit 3 to the fourth expansion unit 6 when counting the paper sheet S will be described in detail.

First, when an operator loads the paper sheet S into the loading portion 15 and presses the "count" button (not shown) on the operation display portion 55, the master control portion 56 recognizes this and notifies the plurality of slave control portions 95, 135, 175 and 225 by transmitting a control command signal including a command indicating that counting will now be performed in the second counting mode and to begin the counting. In response, all of the slave control portions 95, 135, 175 and 225 recognize that they will start counting in the second counting mode.

Then, the slave control unit 95 starts driving the extension feed path 64 and the branching feed path 65, and notifies the master control portion 56 of this fact by transmitting a signal including that effect. The slave control unit 135 starts driving the extension feed path 104 and the branching feed path 105, and notifies the master control portion 56 of this fact by transmitting a signal including that effect. The slave control unit 175 starts driving the extension feed path 144 and the branching feed path 145, and notifies the master control portion 56 of this fact by transmitting a signal including that effect. The slave control unit 225 starts driving the extension feed path 184 and the branching feed path 185, and notifies the master control portion 56 of this fact by transmitting a signal including that effect.

Subsequently, the master control portion 56 drives the loading portion 15 and the base machine feed path 20 of the base machine 2, causing the paper sheet S in the loading portion 15 to be taken into the machine one by one to be conveyed. Then, the master control portion 56 causes the validator 22 to identify the paper sheet S while being conveyed by the identification conveyance portion 21 of the base machine feed path 20. If the first paper sheet S identified by the validator 22 is, for example, a 10,000-yen note that has been successfully identified as a counting object, denomination information of the 10,000-yen note is associated with the information on this first paper sheet S and stored, and conveyance destination information to the effect that the conveyance destination thereof is the stacking portion 81 of the first expansion unit 3 is also associated and stored.

If the second paper sheet S next identified by the validator 22 is, for example, a 5,000-yen note that has been successfully identified as a counting object, the master control portion 56 stores in association with the information on this second paper sheet S denomination information of the 5,000-yen note, and also stores and associates conveyance destination information to the effect that the conveyance destination thereof is the stacking portion 82 of the first expansion unit 3.

If the third paper sheet S next identified by the validator 22 is, for example, a 2,000-yen note that has been successfully identified as a counting object, the master control portion 56 stores in association with the information on this third paper sheet S denomination information of the 2,000-yen note, and also stores and associates conveyance destination information to the effect that the conveyance destination thereof is the stacking portion 83 of the first expansion unit 3.

If the fourth paper sheet S next identified by the validator 22 is, for example, a 1,000-yen note that has been successfully identified as a counting object, the master control portion 56 stores in association with the information on this fourth paper sheet S denomination information of the 1,000-yen note, and also stores and associates conveyance destination information to the effect that the conveyance destination thereof is the stacking portion 84 of the first expansion unit 3.

As described above, the master control portion 56, based on the identification results in the validator 22 for each paper sheet S taken in from the loading portion 15, for each paper sheet S that is successfully identified as a counting object, performs the process of associating the denomination information and destination information with the information of the paper sheet S so identified as described above, while transmitting and notifying control command signals including the results of this association process to all the multiple slave control portions 95, 135, 175, 225.

That is, the master control portion 56 transmits to and notifies all the multiple slave control portions 95, 135, 175, 225 of the results of the association processing each time a paper sheet S taken in from loading portion 15 is successfully identified by validator 22 as a counting object, such that the first paper sheet S identified by the validator 22 is a 10,000-yen note and the conveyance destination thereof is the stacking portion 81 of the first expansion unit 3, the second paper sheet S next identified by the validator 22 is a 5,000-yen note and the conveyance destination thereof is the stacking portion 82 of the first expansion unit 3, the third paper sheet S identified by the validator 22 is a 2,000-yen note and the conveyance destination thereof is the stacking portion 83 of the first expansion unit 3, and the fourth paper sheet S identified by the validator 22 is a 1,000-yen note and the conveyance destination thereof is the stacking portion 84 of the first expansion unit 3.

In addition, the master control portion 56, while conveying on the base machine feed path 20 the paper sheet S that has been successfully identified as a counting object by the validator 22, conveys the paper sheet to the extension feed path 64 of the first expansion unit 3, with the sorting direction of the sorting portion 30 made the direction to direct the paper sheet S from the identification conveyance portion 21 to the outward-facing conveyance portion 28. In this way, the paper sheets S that have been successfully identified as a counting object by the validator 22 are transferred from the base machine 2 to the first expansion unit 3.

The paper sheets S not correctly identified as counting objects by the validator 22 are conveyed to the rejection portion 16 and stacked, with the sorting direction of the sorting portion 30 made the direction to direct the paper sheet S from the identification conveyance portion 21 to the rejection conveyance portion 27.

When the paper sheet S loaded into the loading portion 15 runs out, if there is a paper sheet S that has been stacked in the rejection portion 16, the operator reloads the paper sheet S into the loading portion 15 and presses the "count" button (not shown) on the operation display portion 55. Then, the paper sheet S loaded into the loading portion 15 is processed in the same manner as described above, and if the paper sheet S is successfully identified by the validator 22 as a counting object, the master control portion 56 causes this paper sheet S to be conveyed to the first expansion unit 3.

The slave control portion 95 of the first extension unit 3 detects the paper sheet S transferred from the outward-facing conveyance portion 28 of the base machine 2 to the extension feed path 64 with a paper sheet detection sensor (not shown) provided more to the outward-facing conveyance portion 28 side of the extension feed path 64 than the sorting portion 66. At that time, the slave control portion 95 recognizes, based on the association information transmitted from the master control portion 56 described above, that the first paper sheet S conveyed on the extension feed path 64 is a 10,000-yen note and that its conveyance destination is the stacking portion 81 of the first expansion unit 3. Therefore, the slave control portion 95 causes the paper sheet S to be conveyed along the main conveyance portion 70 and the tributary conveyance portion 71 of the branching feed path 65 by the sorting portions 66 and 74 and to be stacked in the stacking portion 81.

The slave control portion 95 recognizes that the second paper sheet S conveyed on the extension feed path 64 is a 5,000-yen note and that the conveyance destination thereof is the stacking portion 82 of the first expansion unit 3. Therefore, the slave control portion 95 causes the paper sheet S to be conveyed along the main conveyance portion 70 and the tributary conveyance portion 72 of the branching feed path 65 by the sorting portions 66, 74, 75 and to be stacked in the stacking portion 82.

The slave control portion 95 recognizes that the third paper sheet S conveyed on the extension feed path 64 is a 2,000-yen note and that the conveyance destination thereof is the stacking portion 83 of the first expansion unit 3. Therefore, the slave control portion 95 causes the paper sheet S to be conveyed along the main conveyance portion 70 and the tributary conveyance portion 73 of the branching feed path 65 by the sorting portions 66, 74 to 76 and to be stacked in the stacking portion 83.

The slave control portion 95 recognizes that the fourth paper sheet S conveyed on the extension feed path 64 is a 1,000-yen note and that the conveyance destination thereof is the stacking portion 84 of the first expansion unit 3. Therefore, the slave control portion 95 causes the paper sheet S to be conveyed along the main conveyance portion 70 of the branching feed path 65 by the sorting portions 66, 74 to 76 and to be stacked in the stacking portion 84.

As described above, the slave control portion 95 of the first expansion unit 3 performs a stacking operation to stack all of the paper sheet S received from the base machine 2 in a predetermined stacking portion among the stacking portions 81 to 84 based on the association information communicated from the master control portion 56, respectively.

When the stacking operation for all the paper sheet S received from the base machine 2 is completed, the slave control portion 95 of the first expansion unit 3 notifies the master control portion 56 by sending an end notification signal to that effect. In response, the master control portion 56 sends a control command signal including a "counting end stop" command to each of the multiple slave control portions 95, 135, 175, and 225 to notify them. Then the slave control portion 95 stops the conveyance operation of the extension feed path 64 and the branching feed path 65, the slave control portion 135 stops the conveyance operation of the extension feed path 104 and the branching feed path 105, the slave control portion 175 stops the conveyance operation of the extension feed path 144 and the branching feed path 145, and the slave control portion 225 stops the conveyance operation of the extension feed path 184 and the branching feed path 185, respectively.

Subsequently, the master control portion 56 displays on the operation display portion 55 the fact that the counting process has been successfully completed, and on the basis of the identification result of the validator 22, displays for the paper sheet S successfully identified as a counting target, a detailed description such as the quantity and amount of money for each denomination as well as the total amount of money by this counting process. When the operator confirms the display and presses the "done" button (not shown) on the operation display portion 55, the master control portion 56 confirms the counting transaction process performed in this second counting mode.

(Third Counting Mode: Normal)

Next, in the third counting mode, control of the master control portion 56 of the base machine 2 and the slave control portions 95, 135, 175, 225 of the first expansion unit 3 to the fourth expansion unit 6 during counting of the paper sheets S will be described in detail.

First, when an operator loads the paper sheet S into the loading portion 15 and presses the "count" button (not shown) on the operation display portion 55, the master control portion 56 recognizes this and notifies the plurality of slave control portions 95, 135, 175 and 225 by transmitting a control command signal including a command indicating that counting will now be performed in the third counting mode and to begin the counting. In response, all of the slave control portions 95, 135, 175 and 225 recognize that they will start counting in the third counting mode.

Then, the slave control unit 95 starts driving the extension feed path 64 and the branching feed path 65, and notifies the master control portion 56 of this fact by transmitting a signal including that effect. The slave control unit 135 starts driving the extension feed path 104 and the branching feed path 105, and notifies the master control portion 56 of this fact by transmitting a signal including that effect. The slave control unit 175 starts driving the extension feed path 144 and the branching feed path 145, and notifies the master control portion 56 of this fact by transmitting a signal including that effect. The slave control unit 225 starts driving the extension feed path 184 and the branching feed path 185, and notifies the master control portion 56 of this fact by transmitting a signal including that effect.

Subsequently, the master control portion 56 drives the loading portion 15 and the base machine feed path 20 of the base machine 2, causing the paper sheet S in the loading portion 15 to be taken into the machine one by one and conveyed. Then, the master control portion 56 causes the validator 22 to identify the paper sheet S while being conveyed by the identification conveyance portion 21 of the base machine feed path 20. If the first paper sheet S identified by the validator 22 is, for example, a 10,000-yen note that has been successfully identified as a counting object, denomination information of the 10,000-yen note is associated with the information on this first paper sheet S and stored, and conveyance destination information to the effect that the conveyance destination thereof are the two stacking portions 121 and 122 of the second expansion unit 4 is also associated and stored.

If the second paper sheet S next identified by the validator 22 is, for example, a 5,000-yen note that has been successfully identified as a counting object, the master control portion 56 stores in association with the information on this second paper sheet S denomination information of the 5,000-yen note, and also stores and associates conveyance destination information to the effect that the conveyance destination thereof is the stacking portion 161 of the third expansion unit 5.

If the third paper sheet S next identified by the validator 22 is, for example, a 2,000-yen note that has been successfully identified as a counting object, the master control portion 56 stores in association with the information on this third paper sheet S denomination information of the 2,000-yen note, and also stores and associates conveyance destination information to the effect that the conveyance destination thereof is the stacking portion 162 of the third expansion unit 5.

If the fourth paper sheet S next identified by the validator 22 is, for example, a 1,000-yen note that has been successfully identified as a counting object, the master control portion 56 stores in association with the information on this fourth paper sheet S denomination information of the 1,000-yen note, and also stores and associates conveyance destination information to the effect that the conveyance destination thereof is the stacking portion 163 of the third expansion unit 5.

As described above, the master control portion 56, based on the identification results in the validator 22 for each paper sheet S taken in from the loading portion 15, for each paper sheet S that is successfully identified as a counting object, performs the process of associating the denomination information and destination information with the information of the paper sheet S so identified as described above, while transmitting and notifying control command signals including the results of this association process to all the multiple slave control portions 95, 135, 175, 225.

That is, the master control portion 56 transmits to and notifies all the multiple slave control portions 95, 135, 175, 225 the results of the association processing each time a paper sheet S taken in from loading portion 15 is successfully identified by validator 22 as a counting object, such that the first paper sheet S identified by the validator 22 is a 10,000-yen note and the conveyance destination thereof are the two stacking portions 121 and 122 of the second expansion unit 4, that the second paper sheet S next identified by the validator 22 is a 5,000-yen note and the conveyance destination thereof is the stacking portion 161 of the third expansion unit 5, that the third paper sheet S next identified by the validator 22 is a 2,000-yen note and the conveyance destination thereof is the stacking portion 162 of the third expansion unit 5, and that the fourth paper sheet S next identified by the validator 22 is a 1,000-yen note and the conveyance destination thereof is the stacking portion 163 of the third expansion unit 5.

In addition, the master control portion 56, while conveying on the base machine feed path 20 the paper sheet S that has been successfully identified as a counting object by the validator 22, conveys the paper sheet to the extension feed path 64 of the first expansion unit 3, with the sorting direction of the sorting portion 30 made the direction to direct the paper sheet S from the identification conveyance portion 21 to the outward-facing conveyance portion 28. In this way, the paper sheets S that have been successfully identified as a counting object by the validator 22 are transferred from the base machine 2 to the first expansion unit 3.

The paper sheets S not correctly identified as counting objects by the validator 22 are conveyed to the rejection portion 16 and stacked, with the sorting direction of the sorting portion 30 made the direction to direct the paper sheet S from the identification conveyance portion 21 to the rejection conveyance portion 27.

When the paper sheet S loaded into the loading portion 15 runs out, if there is a paper sheet S that has been stacked in the rejection portion 16, the operator reloads the paper sheet S into the loading portion 15 and presses the "count" button (not shown) on the operation display portion 55. Then, the paper sheet S loaded into the loading portion 15 is processed in the same manner as described above, and if the paper sheet S is successfully identified by the validator 22 as a counting object, the master control portion 56 causes this paper sheet S to be conveyed to the first expansion unit 3.

The slave control portion 95 of the first extension unit 3 detects the paper sheet S transferred from the outward-facing conveyance portion 28 of the base machine 2 to the extension feed path 64 with a paper sheet detection sensor (not shown) provided more to the outward-facing conveyance portion 28 side of the extension feed path 64 than the sorting portion 66. At that time, the slave control portion 95 recognizes, based on the association information transmitted from the master control portion 56 described above, that the conveyance destination of all the paper sheet S conveyed on the extension feed path 64 is the second expansion unit 4 or the third expansion unit 5 from the first to the last sheet. The slave control portion 95 has all the paper sheet S conveyed as they are on the extension feed path 64, to be sequentially conveyed to the extension feed path 104 of the second expansion unit 4.

The slave control portion 135 of the second expansion unit 4 detects the paper sheet S transferred from the extension feed path 64 to the extension feed path 104 of the first expansion unit 3 with a paper sheet detection sensor (not shown) provided more to the extension feed path 64 side of the extension feed path 104 than the sorting portion 106. At that time, the slave control portion 135 recognizes, based on the association information transmitted from the master control portion 56 described above, that the first paper sheet S conveyed on the extension feed path 104 is a 10,000-yen note and that the conveyance destination thereof are the stacking portions 121 and 122 of the second expansion unit 4. Therefore, the slave control portion 135 causes the paper sheet S to be conveyed along the main conveyance portion 110 and the tributary conveyance portion 111 of the branching feed path 105 by the sorting portions 106 and 114 and to be stacked in the stacking portion 121 on the upper stage. When the upper-stage stacking portion 121 subsequently becomes full due to the paper sheet S being conveyed to the upper-stage stacking portion 121, the slave control portion 135 causes the 10,000-yen note paper sheet S from that point to be conveyed along the main conveyance portion 110 of the branching feed path 105 by the sorting portions 106 and 114 and to be stacked in the lower-stage stacking portion 122.

On the other hand, the slave control portion 135 has all the paper sheets S other than 10,000-yen notes conveyed as they are on the extension feed path 104, to be sequentially conveyed to the extension feed path 144 of the third expansion unit 5.

The slave control portion 175 of the third expansion unit 5 detects the paper sheet S transferred from the extension feed path 104 of the second expansion unit 4 to the extension feed path 144 with a paper sheet detection sensor (not shown) provided more to the extension feed path 104 side of the extension feed path 144 than the sorting portion 146. At that time, the slave control portion 175 recognizes, based on the association information transmitted from the master control portion 56 described above, that the first paper sheet S conveyed on the extension feed path 144 is a 5,000-yen note and that the conveyance destination thereof is the stacking portions 161 of the third expansion unit 5. Therefore, the slave control portion 175 causes the paper sheet S to be conveyed along the main conveyance portion 150 and the tributary conveyance portion 151 of the branching feed path 145 by the sorting portions 146 and 154 and to be stacked in the stacking portion 161.

The slave control portion 175 recognizes that the second paper sheet S conveyed on the extension feed path 144 is a 2,000-yen note and that the conveyance destination thereof is the stacking portion 162 of the third expansion unit 5. Therefore, the slave control portion 175 causes the paper sheet S to be conveyed along the main conveyance portion 150 and the tributary conveyance portion 152 of the branching feed path 145 by the sorting portions 146, 154, 155 and to be stacked in the stacking portion 162.

The slave control portion 175 recognizes that the third paper sheet S conveyed on the extension feed path 144 is a 1,000-yen note and that the conveyance destination thereof is the stacking portion 163 of the third expansion unit 5. Therefore, the slave control portion 175 causes the paper sheet S to be conveyed along the main conveyance portion 150 of the branching feed path 145 by the sorting portions 146, 154, 155 and to be stacked in the stacking portion 163.

As described above, the slave control portion 135 of the second expansion unit 4 and the slave control portion 175 of the third expansion unit 5 perform a stacking operation to stack all of the paper sheet S transferred from the base machine 2 in a predetermined stacking portion among the stacking portions 121, 122, 161 to 163 based on the association information transmitted from the master control portion 56 to each.

When the stacking operation for all the paper sheet S transferred from the base machine 2 via the first expansion unit 3 is completed, the slave control portion 135 of the second expansion unit 4 and the slave control portion 175 of the third expansion unit 5 notify the master control portion 56 by sending an end notification signal to that effect. In response, the master control portion 56 sends a control command signal including a "counting end stop" command to each of the multiple slave control portions 95, 135, 175, and 225 to notify them. Then the slave control portion 95 stops the conveyance operation of the extension feed path 64 and the branching feed path 65, the slave control portion 135 stops the conveyance operation of the extension feed path 104 and the branching feed path 105, the slave control portion 175 stops the conveyance operation of the extension feed path 144 and the branching feed path 145, and the slave control portion 225 stops the conveyance operation of the extension feed path 184 and the branching feed path 185, respectively.

Subsequently, the master control portion 56 displays on the operation display portion 55 the fact that the counting process has been successfully completed, and on the basis of the identification result of the validator 22, displays for the paper sheet S successfully identified as a counting target, a detailed description such as the quantity and amount of money for each denomination as well as the total amount of money by this counting process. When the operator confirms the display and presses the "done" button (not shown) on the operation display portion 55, the master control portion 56 confirms the counting transaction process performed in this third counting mode.

<Control Contents: When an Abnormality Occurs>

The normal counting operation was described above, but an abnormality may occur during the counting operation. Details of the control in that case will be described below.

There are two main types of abnormalities: those that require an emergency stop (immediate stop by applying a brake to the feed path) because no further conveyance operation of the target feed path can be performed, and those that require a normal stop (stop after the paper sheet on the feed path has been conveyed) so that the conveyor operation itself of the feed path can be performed.

Abnormalities that require an emergency stop include abnormalities such as an abnormality in which a cover (not shown) of each feed path is opened during the conveyance operation, jamming of the paper sheet S, an abnormal motor rotation of the drive unit, and an operation switching failure in the sorting portion. On the other hand, abnormalities that can be handled by a normal stop include the occurrence of a conveyance abnormality such as double feeding and skewing of the paper sheet S, detection of an abnormality in a sensor such as the paper sheet detection sensor and the stacking portion full detection sensor, and defective intake of paper sheet S at the loading portion 15. Another factor pertaining to the occurrence of an abnormality is the location where the abnormality occurred. The master control portion 56 and the slave control portions 95, 135, 175, 225 are designed to perform control after an abnormality occurs based on these two factors.

(First Abnormality in Second Counting Mode)

The first abnormality in the second counting mode is a conveyance abnormality that has occurred inside the base machine 2 and requires an "emergency stop".

As the first abnormality in the second counting mode, details of the control in the case of, for example, a paper sheet jam abnormality requiring an "emergency stop" occurring at the validator 22 during the counting operation in the second counting mode will be described below.

If the validator 22 detects, during normal counting operation in the second counting mode described above, the occurrence of a paper sheet S jam in which a paper sheet S identified by the validator 22 of the base machine 2 becomes stuck in the validator 22, the master control portion 56 first immediately stops driving of the loading portion 15 of the base machine 2 to stop the taking-in operation of a paper sheet S by the loading portion 15. At the same time, the master control portion 56 also immediately stops the conveyance operation of the base machine feed path 20. At that time, if there is a possibility that the paper sheet S being conveyed on the base machine feed path 20 will stop at the position of the sorting portion 30 in the upper left part of the base machine 2, the master control portion 56, by stopping the base machine feed path 20 not immediately but after a certain amount of time has elapsed, so that the paper sheet S being conveyed may pass beyond the sorting portion 30 to the extension feed path 64 of the first expansion portion 3.

After the conveyance operation of the base machine transport path 20 is stopped, the master control portion 56 performs a notification by transmitting to all of the multiple slave control portions 95, 135, 175, 225 a control command signal including a command that an abnormality requiring an "emergency stop" has occurred in the base machine 2 and that the extension transfer paths 64, 104, 144, 184 and the branching feed paths 65, 105, 145, 185 should undergo a "normal finalizing stop".

Upon receiving the above control command signal, if there are paper sheets S being conveyed on the extension feed path 64 and the branching feed path 65 of the first expansion unit 3, the slave control portion 95 of the first expansion unit 3 causes a stacking operation to be performed to stack the paper sheet S in the predetermined stacking portion among the stacking portions 81 to 84 based on the association information transmitted from the master control portion 56 while continuing the conveyance operation of that paper sheet S. In other words, when an abnormality occurs at the base machine 2, a paper sheet S that has already been delivered to the first expansion unit 3 in a normal state are stacked in the corresponding stacking portions among the stacking portions 81 to 84 in the same manner as under normal conditions.

In other words, during the occurrence of the first abnormality in the second counting mode, the slave control portion 95 continues the conveyance operation of both the extension feed path 64 and the branching feed path 65 without immediate stoppage when a paper sheet jam abnormality has occurred requiring an "emergency stop" in the validator 22, depending on the location and type of the conveyance abnormality that occurred, and conveys the paper sheet S of the extension feed path 64 and the branching feed path 65 to the predetermined stacking portion of any of the stacking portions 81 to 84 for stacking.

In the case where the base machine 2 continues to perform the conveyance operation for some predetermined time in order to prevent the paper sheet S from stopping at the position of the sorting portion 30, the paper sheet S that has passed over the sorting portion 30 to be transferred to the extension feed path 64 after the abnormality occurrence and just prior to the predetermined time elapsing is detected with a predetermined paper sheet detection sensor more on the outward-facing conveyance portion 28 side of the extension feed path 64 than the branching feed path 65. Then, the slave control portion 95 of the first expansion unit 3, regarding this paper sheet S as the last paper sheet S to be continuously conveyed in the first expansion unit 3, performs the stacking operation to perform stacking to the corresponding stacking portion among the stacking portions 81 to 84 until this last paper sheet S.

Then, when this stacking operation is completed, the slave control portion 95 of the first expansion unit 3 notifies the master control portion 56 by transmitting a signal to that effect. In response, the master control portion 56 sends a control command signal including a "counting end stop" command to each of the multiple slave control portions 95, 135, 175, 225 to notify them. Then, the slave control portions 95, 135, 175, 225 stop the conveyance operations of the extension feed paths 64, 104, 144, 184 and the branching feed paths 65, 105, 145, 185.

Subsequently, the master control portion 56 then finalizes the count of the paper sheets S that have been successfully conveyed to the stacking portions 81 to 84. Note that the master control portion 56 considers all the paper sheet S other than the paper sheet S normally conveyed to the stacking portions 81 to 84 to be unfinalized.

Figure 8:
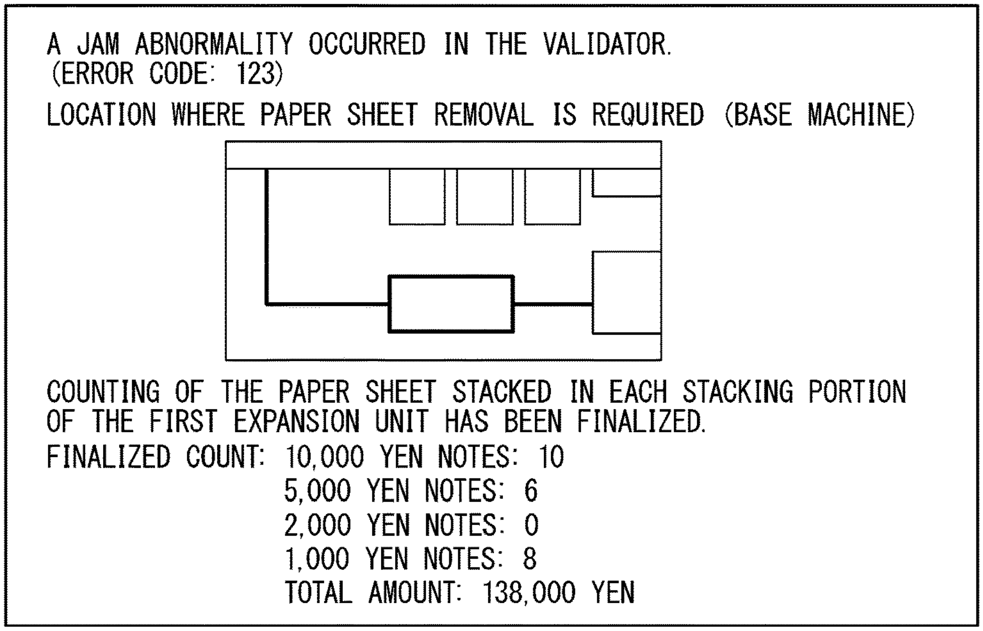
FIG. 8 A front view showing the contents displayed on the operation display unit at the time of a first abnormality in the second counting mode of the paper sheet processing device according to the embodiment of the present invention.

Then, as shown in FIG. 8, the master control portion 56 causes the operation display portion 55 to indicate that a paper sheet S jam abnormality has occurred in the validator 22, the error code thereof, and the base machine feed path 20 and validator 22 (the bold lines in FIG. 8), where paper sheets S remain and require removal, as detected based on the detection results of the paper sheet detection sensors (not shown) in each portion.

At the same time, the master control portion 56 causes the operation display portion 55 to indicate that the counting of the counted and conveyed paper sheet S already stacked in the stacking portions 81 to 84 has been finalized, and details of the quantity and amount by denomination and the total monetary amount of the paper sheet S that has been counted and finalized in this manner.

Figure 9:
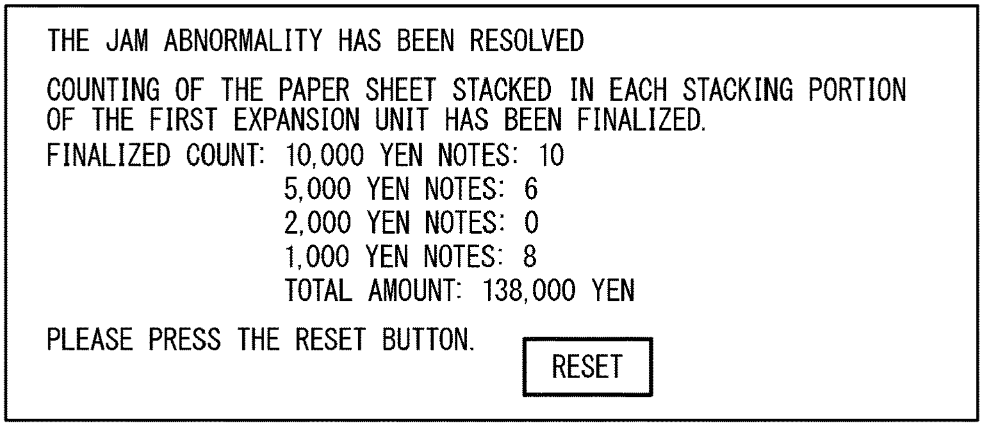
FIG. 9 A front view showing the contents displayed on the operation display unit at the time of a first abnormality in the second counting mode of the paper sheet processing device according to the embodiment of the present invention.

Then, the operator recognizes this fact and starts the abnormality recovery process. First, the side cover (not shown) of the base machine 2 is opened to expose the validator 22 and the base machine feed path 20, the jammed paper sheet S remaining in the validator 22 is removed, and if there is a paper sheet S stuck elsewhere in the base machine feed path 20, that paper sheet S is also removed, and then the side cover (not shown) of the base machine 2 is closed. Then, as shown in FIG. 9, the master control unit 56 causes the operation display portion 55 to display the fact that the jam abnormality has been resolved, a display prompting the user to press the "reset" button on the operation display portion 55, and the "reset" button. Seeing this, the operator presses the "reset" button on the operation display portion 55.

Figure 10:
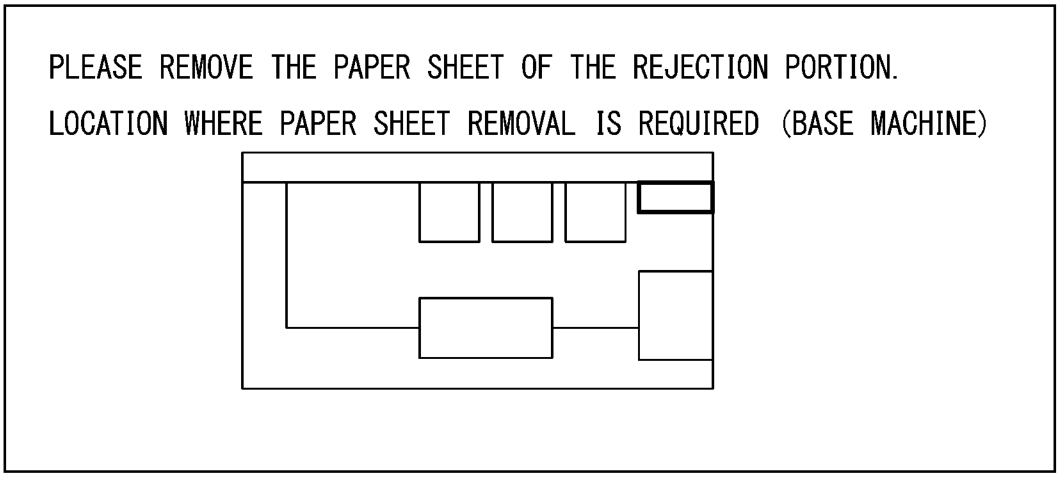
FIG. 10 A front view showing the contents displayed on the operation display unit at the time of a first abnormality in the second counting mode of the paper sheet processing device according to the embodiment of the present invention.

Then, the master control portion 56 performs a reset operation to drive the base machine feed path 20 for a predetermined time to convey the paper sheet S in the base machine feed path 20 to the rejection portion 16, with the sorting portion 30 oriented to convey the paper sheet S from the identification conveyance portion 21 to the rejection conveyance portion 27. Then, if there is any paper sheet S that was forgotten to be removed in the base machine feed path 20, this reset operation will convey those paper sheets S to the rejection portion 16. When there is a paper sheet S that was conveyed to the rejection portion 16, the master control portion 56, as shown in FIG. 10, causes the operation display portion 55 to display an indication guiding the user to remove the paper sheet S in the rejection portion 16 and indicate the location of the rejection portion 16 (the bold frame portion in FIG. 10).

Figure 11:
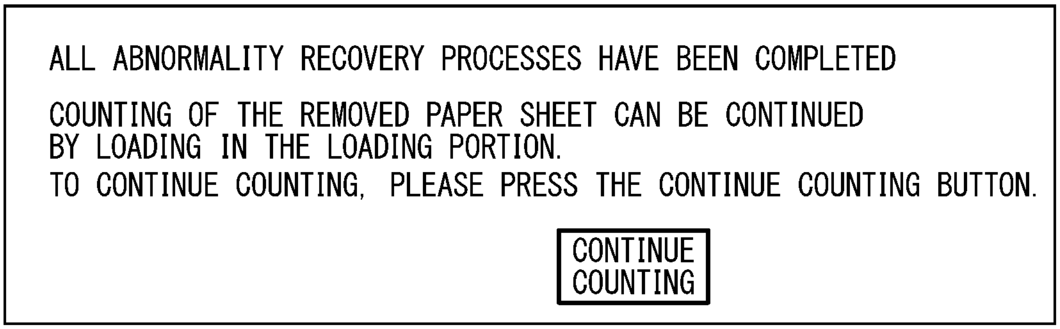
FIG. 11 A front view showing the contents displayed on the operation display unit at the time of a first abnormality in the second counting mode of the paper sheet processing device according to the embodiment of the present invention.

When the residual detection sensor (not shown in the figure) of the rejection portion 16 detects that the operator has removed the paper sheet S from the rejection portion 16, the master control portion 56 displays on the operation display portion 55 that the reset process, that is, the abnormality recovery process, is complete, as shown in FIG. 11, and also displays on the operation display portion 55 a guide to the effect that the paper sheet S removed from the rejection portion 16 can be loaded into the loading portion 15 for continued counting, and a "continued counting" button.

Thus, even if a paper sheet S jam occurs in the validator 22 during normal counting operation in the second counting mode, the paper sheet S downstream of the jam, which is being conveyed in the first expansion unit 3, is stacked in the corresponding stacking portion among the stacking portions 81 to 84 based on the association information transmitted from the master control portion 56 for each. Therefore, the number of paper sheets S stacked in the stacking portions 81 to 84 can be counted and finalized.

In the above, during the abnormality recovery process, the operator can remove the paper sheet S in the validator 22 and the base machine feed path 20 of the base machine 2 where the abnormality occurred, and also remove the paper sheet S in the rejection portion 16 if there are any there. That is, the operator does not need to access the stacking portions 81 to 84, the extension feed path 64 and the branching feed path 65 of the first expansion unit 3, and does not need to remove the paper sheet S from the stacking portions 81 to 84, the extension feed path 64 and the branching feed path 65. Therefore, it is possible to reduce the burden on the operator involved in the operation of the abnormality recovery process.

(Second Abnormality in Second Counting Mode)

The second abnormality in the second counting mode is a conveyance abnormality that has occurred inside the base machine 2 and can be handled by a "normal stop".

As the second abnormality in the second counting mode, details of the control will be described below for the case of, for example, a paper sheet S intake failure occurring in the loading portion 15 during the counting operation in the second counting mode and that can be resolved with a "normal stop".

If, during the normal counting operation in the second counting mode described above, an intake failure occurs for a paper sheet S to be taken in by loading portion 15 of the base machine 2, and the paper sheet S becomes stuck in the loading portion 15, the master control portion 56 first immediately stops the driving of the loading portion 15 to stop the operation of taking in the paper sheet S. On the other hand, the master control portion 56 does not stop the conveyance operation of the base machine feed path 20 but allows the conveyance operation to continue, and so all the paper sheets S successfully identified as counting targets by the validator 22 among the paper sheets S being conveyed on the base machine feed path 20 are passed to the first expansion unit 3. On the other hand, the paper sheets S not successfully identified as counting objects by the validator 22 are conveyed to the rejection portion 16.

The master control portion 56 notifies all of the multiple slave control portions 95, 135, 175, 225 that an abnormality requiring a "normal stop" has occurred in the base machine 2, and transmits thereto a control command signal including a command to perform a "normal finalizing stop" on the extension transfer paths 64, 104, 144, 184 and the branching feed paths 65, 105, 145, 185. In response, the slave control portion 95 of the first expansion unit 3 continues to perform the conveyance operation for the paper sheets S being conveyed on the extension feed path 64 and the branching feed path 65 of the first expansion unit 3, including the paper sheets S accepted from the base unit 2 even after the occurrence of the abnormality, and while doing so causes a stacking operation to be performed that stacks the paper sheet S in the corresponding stacking portion among the stacking portions 81 to 84, based on the association information transmitted from the master control portion 56.

In other words, during the occurrence of the second abnormality in the second counting mode, the slave control portion 95 continues the conveyance operation of all of the base machine feed path 20, the extension feed path 64 and the branching feed path 65 without immediate stoppage when an intake malfunction of the paper sheet S has occurred that can be resolved with a "normal stop" in the loading portion 15, depending on the location and type of the conveyance abnormality that occurred, and stacks the paper sheet S of the base machine feed path 20, the extension feed path 64 and the branching feed path 65 in the predetermined stacking portion of any of the stacking portions 81 to 84.

Then, when this stacking operation is completed, the slave control portion 95 of the first expansion unit 3 notifies the master control portion 56 by performing a transmission to that effect. In response, the master control portion 56 sends a control command signal including a "counting end stop" command to each of the multiple slave control portions 95, 135, 175, 225 to notify them. Then, the plurality of slave control portions 95, 135, 175, 225 stop the conveyance operations of the extension feed paths 64, 104, 144, 184 and the branching feed paths 65, 105, 145, 185.

Subsequently, the master control portion 56 then finalizes the count of the paper sheets S that have been successfully conveyed to the stacking portions 81 to 84. Note that the master control portion 56 considers all the paper sheets S other than the paper sheets S normally conveyed to the stacking portions 81 to 84 to be unfinalized.

The master control portion 56 then causes the operation display portion 55 to perform a display according to that shown in FIGS. 8 through 11 during the first abnormality in the second counting mode. That is, the master control portion 56 first causes the operation display portion 55 to display an error code to the effect that an intake malfunction abnormality has occurred in the loading portion 15. At the same time, the master control portion 56 also causes the operation display portion 55 to display that the counting of the counted and conveyed paper sheet S already stacked in the stacking portions 81 to 84 has been finalized, and details of the quantity and amount by denomination and the total monetary amount of the paper sheet S that has been counted and finalized in this manner.

Then, the operator recognizes this fact and starts the abnormality recovery process. The operator first opens the front cover of the base machine 2 (not shown) to expose the intake portion 15 and removes paper sheets S that are stuck in the intake portion 15. The operator then closes the front cover of the base machine 2 (not shown) and presses the "reset" button (not shown) on the operation display portion 55.

Thus, even if a paper sheet S intake malfunction has occurred in the intake portion 15 during the normal counting operation in the second counting mode, a stacking operation is performed to stack in the corresponding stacking portion among the stacking portions 81 to 84 based on the association information transmitted from the master control portion 56 the paper sheet S being conveyed in the base machine feed path 20 of the base machine 2, and the extension feed path 64 and the branching feed path 65 of the first expansion unit 3, at least on the downstream side. Therefore, the number of paper sheets S stacked in the stacking portions 81 to 84 can be counted and finalized.

In the above, during the abnormality recovery process, the operator should remove the paper sheet S in the loading portion 15 of the base machine 2 where the abnormality occurred, and also remove the paper sheet S in the rejection portion 16 if there are any there. That is, the operator does not need to access the base machine feed path 20 of the base machine 2, and the stacking portions 81 to 84, the extension feed path 64 and the branching feed path 65 of the first expansion unit 3, and does not need to remove the paper sheet S from the base machine feed path 20, the stacking portions 81 to 84, the extension feed path 64 and the branching feed path 65. Therefore, it is possible to reduce the burden on the operator involved in the operation of the abnormality recovery process.

(Third Abnormality in Second Counting Mode)

The third abnormality in the second counting mode is a conveyance abnormality requiring an "emergency stop" that occurred in the extension feed path 64 of the first expansion unit 3.

As the third abnormality in the second counting mode, details of the control in the case of, for example, a paper sheet jam abnormality requiring an "emergency stop" occurring in, for example, the extension feed path 64 of the first expansion unit 3 during the counting operation in the second counting mode will be described below.

During the normal counting operation in the above-described second counting mode, suppose a paper sheet jam abnormality requiring an "emergency stop" has occurred more on the outward-facing conveyance portion 28 side of the extension feed path 64 of the first expansion unit 3 than the sorting portion 66. Then, first, the slave control portion 95 of the first expansion unit 3 detects this, and notifies the master control portion 56 by sending a signal to the effect that a paper sheet jam abnormality requiring an "emergency stop" has occurred on the outward-facing conveyance portion 28 side of the extension feed path 64 of the first expansion unit 3 rather than the sorting portion 66.

In response, the master control portion 56 notifies all of the multiple slave control portion 95, 135, 175, 225 to the effect that a paper sheet jam abnormality requiring an "emergency stop" has occurred on the outward-facing conveyance portion 28 side of the extension feed path 64 of the first expansion unit 3 rather than the sorting portion 66, and transmits to all of the slave control portions 95, 135, 175, 225 of the first expansion unit 3 to the fourth expansion unit 6 a control command signal including a command to the effect that the extension feed paths 64, 104, 144, 184 are to undergo an "emergency stop", and transmits a control command signal including a command to the effect that the branching feed paths 65, 105, 145, 185 are to undergo an "normal finalizing stop". The master control portion 56 immediately stops the drive of the loading portion 15 of the base machine 2 to stop the taking-in operation of a paper sheet S by the loading portion 15.

If the master control portion 56 determines that, with regard to the conveyance operation of the base machine feed path 20, there is a risk of a paper sheet S on the base machine feed path 20 being passed downstream to the first expansion unit 3 as a result of the switching operation of the sorting unit 30 not occurring in time, the master control portion 56 immediately stops the conveyance operation of the base machine feed path 20. In contrast, upon determining that all the paper sheet S in the base machine feed path 20 can be conveyed to the rejection portion 16 normally due to the switching of the sorting portion 30 happening in time, the master control portion 56 switches the conveyance destination to the rejection portion 16 and conveys all the paper sheet S on the base machine feed path 20 to the rejection portion 16 to be stacked.

Upon receiving the above control command signal from the master control portion 56, the slave control portion 95 of the first expansion unit 3 immediately stops the conveyance operation of the extension feed path 64 and continues the conveyance operation of the branching feed path 65 to carry out the conveyance operation. As a result, the first expansion unit 3 performs a stacking operation to stack the paper sheet S being conveyed on the branching feed path 65 in the corresponding stacking portion among the stacking portions 81 to 84, based on the association information transmitted from the master control portion 56.

In other words, during the occurrence of the third abnormality in the second counting mode, the slave control portion 95 continues the conveyance operation of the branching feed path 65, which is one of the extension feed path 64 and the branching feed path 65, without immediate stoppage when a paper sheet jam abnormality has occurred requiring an "emergency stop" in the extension feed path 64 of the first expansion unit 3, depending on the location and type of the conveyance abnormality that occurred, and conveys the paper sheet S of the branching feed path 65 to the predetermined stacking portion of any of the stacking portions 81 to 84.

Then, when this stacking operation is completed, the slave control portion 95 of the first expansion unit 3 notifies the master control portion 56 by performing a transmission to that effect. In response, the master control portion 56 sends a control command signal including a "counting end stop" command to each of the multiple slave control portions 95, 135, 175, 225 to notify them. Then, the plurality of slave control portions 95, 135, 175, 225 stop the conveyance operations of the extension feed paths 64, 104, 144, 184 and the branching feed paths 65, 105, 145, 185.

Subsequently, the master control portion 56 then finalizes the count of the paper sheets S that have been successfully conveyed to the stacking portions 81 to 84. Note that the master control portion 56 considers all the paper sheets S other than the paper sheets S normally conveyed to the stacking portions 81 to 84 to be unfinalized.

The master control portion 56 causes the operation display portion 55 to perform a display according to that shown in FIGS. 8 through 11 during the first abnormality in the second counting mode. That is, the master control portion 56 first causes the operation display portion 55 to indicate that a paper sheet jam abnormality has occurred in the extension feed path 64 of the first expansion unit 3, the error code thereof, and the extension feed path 64 where paper sheets S remain and require removal, as detected based on the detection results of the paper sheet detection sensors (not shown) in each portion. At this time, if the base machine feed path 20 of the base machine 2 also corresponds to a location where the paper sheets S remain and need to be removed, the base machine feed path 20 is also displayed.

At the same time, the master control portion 56 causes the operation display portion 55 to also indicate that the counting of the counted and conveyed paper sheet S already stacked in the stacking portions 81 to 84 has been finalized, and details of the quantity and amount by denomination and the total monetary amount of the paper sheet S that has been counted and finalized in this manner.

Then, the operator recognizes this fact and starts the abnormality recovery process. The operator opens the top cover (not shown) of the first expansion unit 3 to expose the expansion feed path 64, removes the jammed paper sheet stuck in the extension feed path 64, and also removes a paper sheet S stuck elsewhere in the extension feed path 64, if any, and closes the top cover. When the base machine feed path 20 of the base machine 2 is displayed on the operation display portion 55 as the location of the paper sheet S that needs to be removed, the operator opens the front cover (not shown) of the base machine 2 to expose the base machine feed path 20, removes the paper sheet S stuck in the base machine feed path 20, and closes this front cover. Then the "reset" button (not shown) on the operation display portion 55 is pressed.

Then, the master control portion 56 switches the sorting portion 30 to the direction conveying the paper sheet S from the identification conveyance portion 21 to the rejection conveyance portion 27, to cause the base machine feed path 20 to convey a paper sheet S to the rejection portion 16. Then, if there is any paper sheet S that was forgotten to be removed in the base machine feed path 20, this reset operation will cause those paper sheets S to be conveyed to the rejection portion 16 and stacked. At this time, the master control portion 56 causes the operation display portion 55 to show an indication guiding the user to remove the paper sheet S from the rejection portion 16.

At the same time, the master control portion 56 outputs a control command signal to the slave control portion 95 of the first expansion unit 3, instructing it to perform a reset operation. The slave control portion 95 of the first expansion unit 3 then performs a reset operation of the extension feed path 64 and the branching feed path 65. If there is any paper sheet S that was forgotten to be removed in the extension feed path 64, the slave control portion 95 switches the conveyance destination so that if there is an empty stacking portion among the stacking portions 81 to 84 where the paper sheet S is yet to be stacked, all the paper sheets S that were forgotten to be removed are collectively conveyed to the empty stacking portion in the stacking portions 81 to 84 as a destination for evacuation. In other words, the paper sheet S that was forgotten to be removed in the extension feed path 64 are conveyed to an empty stacking portion as an evacuation destination among the stacking portions 81 to 84, rather than to a predetermined conveyance destination based on the association information transmitted from the master control portion 56.

That is, even if the operator forgets to remove the paper sheet S stuck in the target extension feed path 64 during the abnormality recovery processing operation after a conveyance abnormality has occurred, the slave control portion 95 switches the conveyance destination of such stuck paper sheet S to an empty stacking portion as an evacuation destination among the stacking portions 81 to 84 during the reset operation of the target extension feed path 64 and branching feed path 65.

If, at the time of this reset operation, there is no empty stacking portion among the stacking portions 81 to 84 in which no paper sheet S is stacked, the slave control portion 95 collectively conveys all the paper sheets S that were forgotten to be removed in the extension feed path 64 to the stacking portion with the lowest stacked number of paper sheets S among the stacking portions 81 to 84 as the evacuation destination.

Note that, for example, a predetermined stacking portion, for example, stacking portion 84, is set in advance from among the stacking portions 81 to 84 as an evacuation destination for the paper sheet S, and the slave control portion 95 may gather all the paper sheets S that were forgotten to be removed from the extension feed path 64 during the reset operation of the extension feed path 64 and the branching feed path 65, and have them conveyed to this stacking portion 84 for accumulation.

After the reset operation is completed, the slave control portion 95 of the first expansion unit 3 notifies the master control portion 56 by transmitting information on the stacking portion that is the evacuation destination when paper sheets S that were forgotten to be removed from the extension feed path 64 are evacuated to one of the stacking portions 81 to 84. In response, the master control portion 56 causes the operation display portion 55 to show a guidance display on removing the paper sheet S in the stacking portion that is the evacuation destination. In this case, the master control portion 56 assumes that all paper sheets S in the stacking portion of this evacuation destination are unfinalized. The paper sheets S removed from the stacking portion that is the evacuation destination are reloaded into the loading portion 15, and are identified and counted again in a continuation process after the abnormality recovery process.

Thus, even if a paper sheet jam abnormality has occurred in the extension feed path 64 of the first expansion unit 3, a stacking operation is performed to stack in a predetermined stacking portion among the stacking portions 81 to 84 based on the association information transmitted from the master control portion 56 the paper sheet S being conveyed in the branching feed path 65 of the first expansion unit 3, at least on the downstream side. Therefore, it is possible to count and finalize the paper sheet S that has been stacked in a stacking portion which is not the evacuation destination of the paper sheet S that was forgotten to be removed, among the stacking portions 81 to 84.

In addition, even if there are paper sheets S that have been forgotten to be removed on the extension feed path 64 during the abnormality recovery process by the operator, if there is an empty stacking portion among the stacking portions 81 to 84, the paper sheets S are collectively conveyed and stacked in that stacking portion, and if there is no empty stacking portion, the paper sheets are collectively conveyed and stacked in the stacking portion with the least number of paper sheets among the stacking portions 81 to 84, or to a predetermined stacking portion among the stacking portions 81 to 84. Therefore, the operator does not need to access stacking portions other than the evacuation destination among the stacking portions 81 to 84 and the branching feed path 65, and so it is no longer necessary to remove a paper sheet S from stacking portions other than the evacuation destination and the branching feed path 65. Accordingly, it is possible to reduce the burden on the operator involved in the operation of the abnormality recovery process.

Any one stacking portion among the stacking portions 121 and 122 of the second expansion unit 4, the stacking portions 161 to 163 of the third expansion unit 5, and the terminal pocket 7, for example, the stacking portion 121, may serve as the evacuation destination of the paper sheets S when there are paper sheets S that were forgotten to be removed from the extension feed path 64 during the abnormality recovery process.

(Fourth Abnormality in Second Counting Mode)

The fourth abnormality in the second counting mode is a conveyance abnormality, resolved by a "normal stop", that occurred in the extension feed path 64 of the first expansion unit 3.

As the fourth abnormality in the second counting mode, details of the control in the case of, for example, a paper sheet double-feed abnormality requiring a "normal stop" occurring in, for example, the extension feed path 64 of the first expansion unit 3 during the counting operation in the second counting mode will be described below.

During the normal counting operation in the above-described second counting mode, suppose a paper sheet double-feed abnormality requiring a "normal stop" has occurred more on the outward-facing conveyance portion 28 side of the extension feed path 64 of the first expansion unit 3 than the sorting portion 66. Then, first, the slave control portion 95 of the first expansion unit 3 detects this, and notifies the master control portion 56 by sending a signal to the effect that a paper sheet double-feed abnormality requiring a "normal stop" has occurred on the outward-facing conveyance portion 28 side of the extension feed path 64 of the first expansion unit 3 rather than the sorting portion 66.

Here, the paper sheet double-feed abnormality is an abnormality in which two or three paper sheets S are conveyed in an overlapping manner, which may result in incorrect feeding to the designated conveyance destination based on the association information transmitted from the master control portion 56. Here, since it is not possible to determine whether two sheets or three sheets are overlapped in the double feeding, there is a possibility that paper sheet S subsequently conveyed may not be correctly conveyed to the predetermined conveyance destination based on the association information transmitted from the master control portion 56. However, since there is no abnormality such as the extension feed path 64 becoming clogged with jammed paper sheet, the conveyance operation itself can continue.

Upon receiving notification that a paper sheet double-feed abnormality requiring a "normal stop" has occurred on the outward-facing conveyance portion 28 side of the extension feed path 64 rather than the sorting portion 66, the master control portion 56 notifies all of the slave control portions 95, 135, 175, 225 by transmitting a signal to the effect that a paper sheet double-feed abnormality requiring a "normal stop" has occurred on the outward-facing conveyance portion 28 side of the extension feed path 64 of the first expansion unit 3 rather than the sorting portion 66.

The master control portion 56 transmits to all of the multiple slave control portions 95, 135, 175, 225 of the second expansion unit 4 to the fourth expansion unit 6 a control command signal including a command to perform a "normal non-finalizing stop" on the extension feed paths 104, 144, 184, and transmits a control command signal including a command to perform a "normal finalizing stop" on the branching feed paths 105, 145, 185.

The master control portion 56 immediately stops the drive of the loading portion 15 of the base machine 2 to stop the taking-in operation of a paper sheet S by the loading portion 15. In the event of determining that, with regard to the conveyance operation of the base machine feed path 20, there is a risk of a paper sheet S on the base machine feed path 20 being passed downstream to the first expansion unit 3 as a result of the switching operation of the sorting unit 30 not occurring in time, the master control portion 56 immediately stops the conveyance operation of the base machine feed path 20. In contrast, in the event of determining that all the paper sheet S in the base machine feed path 20 can be conveyed to the rejection portion 16 normally due to the switching of the sorting portion 30 happening in time, the master control portion 56 has all the paper sheet S on the base machine feed path 20 conveyed to the rejection portion 16 to be stacked.

The slave control portion 95 of the first expansion unit 3, which receives the above control command signal from the master control portion 56, continues the conveyance operation of the branching feed path 65 and performs a stacking operation that causes the paper sheet S being conveyed on the branching feed path 65 to be stacked in the corresponding stacking portion among the stacking portions 81 to 84, based on the association information transmitted from the master control portion 56.

Although the conveyance operation of the extension feed path 64 is continued, for a paper sheet S being conveyed on the extension feed path 64 including the paper sheet S involved in the paper sheet double-feed abnormality, the slave control portion 95 switches the conveyance destination so that if there is an empty stacking portion among the stacking portions 81 to 84 where the paper sheet S is yet to be stacked, all the paper sheets S are collectively conveyed to this empty stacking portion as an evacuation destination.

That is, when a conveyance abnormality requiring "normal stop" occurs in the extension feed path 64, the slave control portion 95 switches the conveyance destination so that the paper sheets S being conveyed in the extension feed path 64 are conveyed to an empty stacking portion as an evacuation destination where paper sheets S are not stacked among the stacking portions 81 to 84. Note that even when a conveyance abnormality requiring "normal stop" occurs in the branching feed path 65, the slave control portion 95 switches the conveyance destination so that the paper sheets S being conveyed in the branching feed path 65 and the extension feed path 64 are conveyed to an empty stacking portion as an evacuation destination where paper sheets S are not stacked among the stacking portions 81 to 84.

If there is no empty stacking portion where paper sheets S are yet to be stacked among the stacking portions 81 to 84, the slave control portion 95 collectively conveys all the paper sheets S being conveyed in the extension feed path 64 to the stacking portion with the lowest stacked number of paper sheets S among the stacking portions 81 to 84 as the evacuation destination. In other words, when a conveyance abnormality requiring a "normal stop" has occurred, if an empty stacking portion where paper sheets S are yet to be stacked does not exist among the stacking portions 81 to 84, the slave control portion 95 switches the conveyance destination so that the paper sheet S being conveyed in the extension feed path 64 or in the branching feed path 65 is conveyed to the stacking portion with the lowest number of stacked sheets among the stacking portions 81 to 84 serving as the evacuation destination.

In this case, when a conveyance abnormality requiring a "normal stop" occurs in the extension feed path 64 and there are no empty stacking portions among the stacking portions 81 to 84, the slave control portion 95 switches the conveyance destination so that paper sheets S being conveyed on the extension feed path 64 are conveyed to the stacking portion with the lowest number of stacked sheets among the stacking portions 81 to 84. When a conveyance abnormality requiring a "normal stop" occurs in the branching feed path 65 and there are no empty stacking portions among the stacking portions 81 to 84, the slave control portion 95 switches the conveyance destination so that paper sheets S being conveyed on the branching feed path 65 and the extension feed path 64 are conveyed to the stacking portion with the lowest number of stacked sheets among the stacking portions 81 to 84.

For example, a predetermined evacuation destination stacking portion, for example, the stacking portion 84, may be set as the evacuation destination of the paper sheet among the stacking portions 81 to 84, and the slave control portion 95 may cause all the paper sheet to be collectively conveyed to the stacking portion 84 to be stacked. In other words, the slave control portion 95 may switch the conveyance destination so that when a conveyance abnormality occurs, the paper sheet S being conveyed in the extension feed path 64 or the paper sheet S being conveyed in the branching feed path 65 is conveyed to a predetermined stacking portion that has been preset among the stacking portions 81 to 84.

In this case, when a conveyance abnormality requiring a "normal stop" occurs in the extension feed path 64, the slave control portion 95 switches the conveyance destination so that paper sheet S being conveyed on the extension feed path 64 is conveyed to the predetermined stacking portion among the stacking portions 81 to 84, for example, stacking portion 84. When a conveyance abnormality requiring a "normal stop" has occurred in the branching feed path 65, the slave control portion 95 switches the conveyance destination so that the paper sheet S being conveyed on the branching feed path 65 and the paper sheet S being conveyed on the extension feed path 64 is conveyed to the predetermined stacking portion among the stacking portions 81 to 84, for example, stacking portion 84.

In other words, during the occurrence of the fourth abnormality in the second counting mode, the slave control portion 95 continues the conveyance operation of both the extension feed path 64 and the branching feed path 65 without immediate stoppage when an abnormality has occurred requiring a "normal stop" in the extension feed path 64 of the first expansion unit 3, depending on the location and type of the conveyance abnormality that occurred, and conveys the paper sheet S of the extension feed path 64 and the branching feed path 65 to the predetermined stacking portion of any of the stacking portions 81 to 84.

Then, when this stacking operation is completed, the slave control portion 95 of the first expansion unit 3 notifies the master control portion 56 by performing a transmission to that effect. In response, the master control portion 56 sends a control command signal including a "counting end stop"

command to each of the multiple slave control portions 95, 135, 175, 225 to notify them. Then, the plurality of slave control portions 95, 135, 175, 225 stop the conveyance operations of the extension feed paths 64, 104, 144, 184 and the branching feed paths 65, 105, 145, 185.

Subsequently, the master control portion 56 then finalizes the count of the paper sheet S normally conveyed to the stacking portion other than the stacking portion serving as the evacuation destination for the paper sheet S in the extension feed path 64 of the stacking portions 81 to 84. Note that the master control portion 56 considers all the paper sheet S other than the paper sheet S normally conveyed to the stacking portion other than the stacking portion serving as the evacuation destination for the paper sheet S in the extension feed path 64 of the stacking portions 81 to 84 to be unfinalized.

The master control portion 56 then causes the operation display portion 55 to perform a display according to that shown in FIGS. 8 through 11 during the first abnormality in the second counting mode. In other words, the master control portion 56 causes the operation display portion 55 to indicate, first, that a paper sheet double-feed abnormality requiring a "normal stop" has occurred in the extension feed path 64 and that the unfinalized paper sheet S being conveyed has been stacked in a stacking portion of the evacuation destination among the stacking portions 81 to 84 as described above, that there is a need to remove the stacked paper sheet S including the paper sheet S in question from this evacuation destination stacking portion, the error code thereof, and the location in the base machine feed path 20 where a paper sheet S remains and needs to be removed, having been detected based on the detection results of the paper sheet detection sensors (not shown) in each portion.

At the same time, the master control portion 56 also causes the operation display portion 55 to indicate that the counting of the counted and conveyed paper sheet S already stacked in the stacking portions 81 to 84 has been finalized except for the paper sheet S in the aforementioned evacuation destination stacking portion, and details of the quantity and amount by denomination and the total monetary amount of the paper sheet S that has been counted and finalized in this manner.

Then, the operator recognizes this fact and starts the abnormality recovery process. The operator removes the paper sheet S from the evacuation destination stacking portion among the stacking portions 81 to 84, guided by the operation display portion 55. When the base machine feed path 20 of the base machine 2 is displayed on the operation display portion 55 as the location of the paper sheet S that needs to be removed, the operator opens the front cover (not shown) of the base machine 2 to expose the base machine feed path 20, and removes the stuck paper sheet S. Moreover, when there is guidance to remove the paper sheet S in the rejection portion 16, the paper sheet S in the rejection portion 16 is also removed.

When the operator presses the "reset" button (not shown), the master control portion 56 performs a reset operation in the base machine 2 to switch the sorting portion 30 to the direction of conveying a paper sheet S from the identification conveyance portion 21 to the rejection conveyance portion 27, to cause the paper sheet S stuck in the base machine feed path 20 to be conveyed to the rejection portion 16 in the base machine feed path 20. Thereby, if there is any paper sheet S stuck in the base machine feed path 20, this will cause all the stuck paper sheet S to be conveyed to the rejection portion 16 and stacked. At this time, the master control portion 56 causes the operation display portion 55 to display guidance on removing the paper sheet S from the rejection portion 16.

At the same time, the master control portion 56 outputs a control command signal to the slave control portion 95 of the first expansion unit 3, instructing it to perform a reset operation. The slave control portion 95 of the first expansion unit 3 then performs a reset operation of the extension feed path 64 and the branching feed path 65.

As described above, even if a double-feed abnormality has occurred in the extension feed path 64 of the first expansion unit 3, the paper sheet S being conveyed in the branching feed path 65 of the first expansion unit 3, on the downstream side of the abnormality, is stacked in a predetermined stacking portion among the stacking portions 81 to 84 based on the association information transmitted from the master control portion 56. Therefore, the counting of the number of paper sheets S stacked in a stacking portions other than the evacuation destination of the paper sheets S of the extension feed path 64, among the stacking portions 81 to 84, can be regarded as finalized.

In addition, even when a paper sheet double-feed abnormality occurs in the extension feed path 64, the conveying operation of the extension feed path 64 is continued without being stopped. If there is an empty stacking portion among the stacking portions 81 to 84 to serve as an evacuation destination, the paper sheets S of the extension feed path 64 are collectively conveyed and stacked in this stacking portion, and if there is no empty stacking portion, the paper sheet S of the extension feed path 64 is collectively conveyed and stacked in the stacking portion with the least number of stacked paper sheet S among the stacking portions 81 to 84 as the evacuation destination. Alternatively, the paper sheets S on the extension feed path 64 are collectively conveyed and stacked in a predetermined stacking portion, for example, the stacking portion 84, which is a predetermined evacuation destination set in advance as an evacuation destination among the stacking portions 81 to 84. Therefore, the operator does not need to access stacking portions other than the evacuation destination, the extension feed path 64 and the branching feed path 65, and so it is no longer necessary to remove the paper sheet S. Accordingly, it is possible to reduce the burden on the operator involved in the operation of the abnormality recovery process.

When a conveyance abnormality requiring a "normal stop" has occurred in the branching feed path 64, any one stacking portion among the stacking portions 121 and 122 of the second expansion unit 4, the stacking portions 161 to 163 of the third expansion unit 5, and the terminal pocket 7, for example, the stacking portion 121, may serve as the evacuation destination of the paper sheet S being conveyed on the extension feed path 63.

(First Abnormality in Third Counting Mode)

The first abnormality in the third counting mode is a conveyance abnormality requiring an "emergency stop" that occurred in the extension feed path 104 of the second expansion unit 4.

As the first abnormality in the third counting mode, details of the control in the case of, for example, a paper sheet jam abnormality requiring an "emergency stop" occurring in, for example, the extension feed path 104 of the second expansion unit 4 during the counting operation in the third counting mode will be described below.

During the normal counting operation in the above-described third counting mode described above, suppose a paper sheet jam abnormality requiring an "emergency stop" has occurred more on the extension feed path 64 side of the extension feed path 104 in the second expansion unit 4 than the sorting portion 106. Then, first, the slave control portion 135 of the second expansion unit 4 detects this, and notifies the master control portion 56 by transmitting a signal to the effect that a paper sheet jam abnormality requiring an "emergency stop" has occurred more on the extension feed path 64 side of the extension feed path 104 in the second expansion unit 4 than the sorting portion 106.

In response, the master control portion 56 notifies all of the slave control portions 95, 125, 175, 225 by transmitting thereto a signal to the effect that a paper sheet jam abnormality requiring an "emergency stop" has occurred more on the extension feed path 64 side of the extension feed path 104 in the second expansion unit 4 than the sorting portion 106.

At the same time, the master control portion 56 transmits to the slave control portion 135 of the second expansion unit 4 a control command signal including a command to perform an "emergency stop" on the extension feed path 104, and transmits a control command signal including a command to perform a "normal finalizing stop" on the branching feed path 105.

The master control portion 56 notifies the slave control portion 95 of the first expansion unit 3 by transmitting thereto a control command signal including a command to perform a "normal non-finalizing stop" on the extension feed path 64, and transmitting thereto a control command signal including a command to perform a "normal finalizing stop" on the branching feed path 65.

In addition, the master control portion 56 transmits to the slave control portions 175 and 225 of the third expansion unit 5 and fourth expansion unit 6 a control command signal that includes a command to perform a "normal finalizing stop" on the extension feed paths 144 and 184 and the branching feed paths 145 and 185.

The master control portion 56 immediately stops the drive of the loading portion 15 of the base machine 2 to stop the taking-in operation of a paper sheet S by the loading portion 15. Note that, if a determination is made that, with regard to the conveyance operation of the base machine feed path 20, there is a risk of a paper sheet S on the base machine feed path 20 being passed downstream to the first expansion unit 3 as a result of the switching operation of the sorting unit 30 not occurring in time, the conveyance operation of the base machine feed path 20 is immediately stopped. Conversely, in the case of a determination that all the paper sheet S in the base machine feed path 20 can be conveyed to the rejection portion 16 normally due to the switching of the sorting portion 30 happening in time, all the paper sheet S on the base machine feed path 20 is conveyed to the rejection portion 16 to be stacked.

The slave control portion 95 of the first expansion unit 3, which receives the above control command signal from the master control portion 56, continues the conveyance operation of the extension feed path 64 and the branching feed path 65 to cause the paper sheet S being conveyed on the extension feed path 64 to be stacked in a predetermined stacking portion, for example, stacking portion 84, as an evacuation destination among the stacking portions 81 to 84, which are all empty.

In other words, during the occurrence of the first abnormality in the third counting mode, the slave control portion 95 continues the conveyance operation of both the extension feed path 64 and the branching feed path 65 without immediate stoppage when a paper sheet jam abnormality has occurred requiring an "emergency stop" in the extension feed path 104 of the second expansion unit 4, depending on the location and type of the conveyance abnormality that occurred, and conveys the paper sheet S of the extension feed path 64 to the predetermined stacking portion of the evacuation destination of any of the stacking portions 81 to 84.

The slave control portion 135 of the second expansion unit 4, which receives the above control command signal from the master control portion 56, immediately stops the conveyance operation of the extension conveying path 104 while continuing the conveyance operation of the branching feed path 105, and performs a stacking operation for the paper sheet S being conveyed on the branching feed path 105 to the corresponding stacking portion among the stacking portions 121 and 122, based on the association information transmitted from the master control portion 56.

In other words, during the occurrence of the first abnormality in the third counting mode, the slave control portion 135 continues the conveyance operation of the branching feed path 105, which is one of the extension feed path 104 and the branching feed path 105, without immediate stoppage when a paper sheet jam abnormality has occurred requiring an "emergency stop" in the extension feed path 104 of the second expansion unit 4, depending on the location and type of the conveyance abnormality that occurred, and conveys the paper sheet S of the branching feed path 105 to the predetermined stacking portion of either of the stacking portions 121 and 122.

If there are paper sheets S being conveyed on the extension feed path 144 and the branching conveyance route 145, the slave control portion 175 of the third expansion unit 5, which receives the aforementioned control command signal from the master control portion 56, performs the stacking operation to the corresponding stacking portion among the stacking portions 161 to 163 based on the association information transmitted from the master control portion 56, while continuing to perform the conveyance operation.

In other words, during the occurrence of the first abnormality in the third counting mode, the slave control portion 175 continues the conveyance operation of both the extension feed path 144 and the branching feed path 145 without immediate stoppage when a paper sheet jam abnormality has occurred requiring an "emergency stop" in the extension feed path 104 of the second expansion unit 4, depending on the location and type of the conveyance abnormality that occurred, and conveys the paper sheet S of the extension feed path 144 and the branching feed path 145 to the predetermined stacking portion of any of the stacking portions 161 to 163.

As described above, when the plurality of the first expansion unit 3 to the third expansion unit 5 are provided, these slave control portions 95, 135, 175 will, depending on the location of the conveyance abnormality that has occurred and the type of conveyance abnormality, convey the paper sheet S being conveyed downstream from the extension feed path 104 of the second expansion unit 4, which is the location of the conveyance abnormality that has occurred, to the predetermined stacking portion among the stacking portions 161 to 163, and convey the paper sheet S being conveyed upstream of the extension feed path 104 of the second expansion unit 4 to the predetermined stacking portion among the stacking portions 81 to 84 upstream of the extension feed path 104, which are different from the stacking portions 161 to 163. In other words, the slave control portions 95, 135, 175 individually switch the conveyance destination of the paper sheet S being conveyed downstream from the location of the conveyance abnormality that occurred and the paper sheet S being conveyed upstream from the location of the conveyance abnormality that occurred so as to either convey the paper sheet S to a predetermined stacking portion or to a separate stacking portion, according to the location of the conveyance abnormality that occurred and the type of conveyance abnormality.

When the slave control portions 95, 135, 175 of the first expansion unit 3 to the third expansion unit 5 finish their respective processes, they transmit a signal to that effect to the master control portion 56 to give notification. In response, the master control portion 56 sends a control command signal including a "counting end stop" command to each of the multiple slave control portions 95, 135, 175, 225 to notify them. Then, the plurality of slave control portions 95, 135, 175, 225 stop the conveyance operations of the extension feed paths 64, 104, 144, 184 and the branching feed paths 65, 105, 145, 185.

Subsequently, the master control portion 56 finalizes the counting of the paper sheet S normally conveyed to the stacking portions 121, 122, 161 to 163, which are other than the stacking portion serving as the evacuation destination for the paper sheet S in the extension feed path 64 of the stacking portions 81 to 84. Note that the master control portion 56 considers all the paper sheet S other than the paper sheet S normally conveyed to the stacking portions 121, 122, 161 to 163 to be unfinalized.

The master control portion 56 then causes the operation display portion 55 to perform a display according to that shown in FIGS. 8 through 11 during the first abnormality in the second counting mode. That is, the master control portion 56 first causes the operation display portion 55 to indicate that a paper sheet jam abnormality has occurred in the extension feed path 104 of the second expansion unit 4, the error code thereof, and the location where the paper sheets S remain and require removal, as detected based on the detection results of the paper sheet detection sensors (not shown) in each portion.

At the same time, the master control portion 56 causes the operation display portion 55 to also indicate that the counting of the counted and conveyed paper sheet S already stacked in the stacking portions 121 and 122 and the stacking portions 161 to 163 has been finalized, and details of the quantity and amount by denomination and the total monetary amount of the paper sheet S whose counting has been finalized in this manner.

Then, the operator recognizes this fact and starts the abnormality recovery process. The operator opens the top cover (not shown) of the second expansion unit 4 to expose the expansion feed path 104, removes the jammed paper sheet S stuck in the extension feed path 104, and also removes a paper sheet S stuck elsewhere in the extension feed path 104, if any, and closes this top cover. When the base machine feed path 20 of the base machine 2 is displayed on the operation display portion 55 as a location where the paper sheet S needs to be removed, the operator opens the front cover (not shown) of the base machine 2 to expose the base machine feed path 20, removes the stuck paper sheet S, and then closes this front cover. When the operation display portion 55 displays that the paper sheet S is being rejected by the rejection portion 16, the operator removes the paper sheet S from the rejection portion 16. Further, when the operation display portion 55 displays that the paper sheets S are being stacked in the stacking portion as the evacuation destination among the stacking portions 81 to 84, the operator removes the paper sheet S from this stacking portion. Then the "reset" button (not shown) on the operation display portion 55 is pressed.

Then, the master control portion 56 performs a reset operation in the base machine 2 that switches the sorting portion 30 to the direction of conveying the paper sheet S from the identification conveyance portion 21 to the rejection conveyance portion 27, to cause the paper sheet S of the identification conveyance portion 21 to be conveyed to the rejection portion 16. Then, if there is any paper sheet S that was forgotten to be removed in the base machine feed path 20, this reset operation will cause those paper sheets S to be conveyed to the rejection portion 16 and stacked. At this time, the master control portion 56 causes the operation display portion 55 to display guidance on the removal of the paper sheet S from the rejection portion 16.

At the same time, the master control portion 56 outputs a control command signal to the slave control portion 95 of the first expansion unit 3, instructing it to perform a reset operation. The slave control portion 95 of the first expansion unit 3 then performs a reset operation of the extension feed path 64 and the branching feed path 65.

At the same time, the master control portion 56 outputs a control command signal to the slave control portion 175 of the third expansion unit 5, instructing it to perform a reset operation. The slave control portion 175 of the third expansion unit 5 then performs a reset operation of the extension feed path 144 and the branching feed path 145.

At the same time, the master control portion 56 outputs a control command signal to the slave control portion 135 of the second expansion unit 4, instructing it to perform a reset operation. At this time, if there is a paper sheet S stuck in the extension feed path 104, the slave control portion 175 switches the conveyance destination so that if there is an empty stacking portion among the stacking portions 121 and 122 where the paper sheet S is yet to be stacked, all the paper sheets S in question are collectively conveyed to the empty stacking portion in the stacking portions 121 and 122 as an evacuation destination.

That is, even if the operator forgets to remove the paper sheet S stuck in the target extension feed path 104 during the abnormality recovery processing operation after a conveyance abnormality has occurred, the slave control portion 135 switches the conveyance destination of such paper sheet S stuck in the extension feed path 104 to an empty stacking portion as an evacuation destination among the stacking portions 121 and 122 during the reset operation of the extension feed path 104 and branching feed path 105.

Note that, at this time, if there is no empty stacking portion among the stacking portions 121 and 122 in which no paper sheet S is stacked, the slave control portion 135 switches the conveyance destination so as to collectively convey all the paper sheet S stuck in the extension feed path 104 to the stacking portion with the lowest stacked number of paper sheet S among the stacking portions 121 and 122 as the evacuation destination.

Moreover, for example, as a conveyance change destination of a paper sheet S stuck in the extension feed path 104, the slave control portion 175 may set a predetermined stacking portion, for example, the stacking portion 122, in advance as the evacuation destination among stacking portions 121 and 122, and then collectively convey all the paper sheet in question to this stacking portion 122 to be stacked.

After the reset operation is completed, the slave control portion 135 of the second expansion unit 4 notifies the master control portion 56 by transmitting information on the stacking portion that is the evacuation destination of a paper sheet S stuck in the extension feed path 104 among the stacking portions 121 and 122. In response, the master control portion 56 causes the operation display portion 55 to show a guidance display on removing the paper sheet S in the stacking portion. In this case, the master control portion 56 determines all the paper sheets S in the stacking portion, of the stack portions 121 and 122, that is the evacuation destination for the paper sheets S that were stuck in the extension feed path 104 to be unfinalized.

Thus, even if a paper sheet jam abnormality has occurred in the extension feed path 104 of the second expansion unit 4, the paper sheets S being conveyed in the branching feed path 105 of the second expansion unit 4 and the extension feed path 144 and the branching feed path 145 of the third expansion unit 5, on the downstream side of the abnormality, are stacked in the corresponding stacking portion of the stacking portions 121 and 122 and the stacking portions 161 to 163, on the basis of the association information transmitted from the master control portion 56. Therefore, the counting of the paper sheet S stacked in the stacking portion other than the aforementioned evacuation destination of the stacking portions 121 and 122 of the second expansion unit 4 and the stacking portions 161 to 163 of the third expansion unit 5 can be regarded as finalized.

In addition, even if there are paper sheets S that have been forgotten to be removed on the extension feed path 104 during the abnormality recovery process by the operator, if there is an empty stacking portion among the stacking portions 121 and 122, the paper sheets S are collectively conveyed and stacked in that stacking portion as an evacuation destination, and if there is no empty stacking portion, the paper sheets are collectively conveyed and stacked in the stacking portion with the least number of paper sheets among the stacking portions 121 and 122, or to a predetermined stacking portion among the stacking portions 121 and 122 as an evacuation destination. For this reason, the operator does not need to access stacking portions other than the evacuation destination of the paper sheet S forgotten to be removed, and the branching feed path 105, and so it is no longer necessary to remove the paper sheet S. Accordingly, it is possible to reduce the burden on the operator involved in the operation of the abnormality recovery process.

Moreover, even if there is paper sheet S that has been forgotten to be removed on the extension feed path 104, during the reset operation the paper sheet S in question will be conveyed to the aforementioned stacking portion of the evacuation destination among the stacking portions 121 and 122 to be stacked. From this point as well, it is possible to reduce the burden on the operator involved in the operation of the abnormality recovery process.

If there is paper sheet S that has been forgotten to be removed from the extension feed path 104 during the abnormality recovery process performed by the operator, the terminal pocket 7 may be used as the evacuation destination.

(Second Abnormality in Third Counting Mode)

The second abnormality in the third counting mode is a conveyance abnormality, resolved by a "normal stop", that occurred in the extension feed path 104 of the second expansion unit 4.

As the second abnormality in the third counting mode, details of the control in the case of, for example, a paper sheet double-feed abnormality requiring a "normal stop" occurring in, for example, the extension feed path 104 of the second expansion unit 4 during the counting operation in the third counting mode will be described below.

During the normal counting operation in the above-described third counting mode described above, suppose a paper sheet double-feed abnormality requiring a "normal stop" has occurred more on the extension feed path 64 side of the extension feed path 104 in the second expansion unit 4 than the sorting portion 106. Then, first, the slave control portion 135 of the second expansion unit 4 detects this, and notifies the master control portion 56 by transmitting a signal to the effect that a paper sheet double-feed abnormality requiring a "normal stop" has occurred more on the extension conveyance portion 64 side of the extension feed path 104 in the second expansion unit 4 than the sorting portion 106.

In response, the master control portion 56 notifies all of the slave control portions 95, 125, 175, 225 by transmitting thereto a signal to the effect that a paper sheet double-feed abnormality requiring a "normal stop" has occurred more on the extension conveyance portion 64 side of the extension feed path 104 in the second expansion unit 4 than the sorting portion 106.

In addition, the master control portion 56 transmits to the slave control portion 95 of the first expansion unit 3, the slave control portion 135 of the second expansion unit 4, and the slave control portion 175 of the third expansion unit 5 a control command signal that includes a command to perform a "normal finalizing stop" of the branching feed paths 65, 105, 145.

In addition, the master control portion 56 notifies the slave control portion 95 of the first expansion unit 3 and the slave control portion 135 of the second expansion unit 4 by transmitting thereto a control command signal that includes a command to make the extension feed paths 64 and 104 perform a "normal non-finalizing stop".

In addition, the master control portion 56 notifies the slave control portion 175 of the third expansion unit 5 downstream of the second expansion unit 4 by transmitting thereto a control command signal that includes a command to perform a "normal finalizing stop" of the extension feed path 144.

The master control portion 56 immediately stops the drive of the loading portion 15 of the base machine 2 to stop the taking-in operation of a paper sheet S by the loading portion 15. Note that, if a determination is made that, with regard to the conveyance operation of the base machine feed path 20, there is a risk of a paper sheet S on the base machine feed path 20 being passed downstream to the first expansion unit 3 as a result of the switching operation of the sorting unit 30 not occurring in time, the conveyance operation of the base machine feed path 20 is immediately stopped. Conversely, in the case of a determination that all the paper sheet S in the base machine feed path 20 can be conveyed to the rejection portion 16 normally due to the switching of the sorting portion 30 happening in time, all the paper sheet S of the base machine feed path 20 is conveyed to the rejection portion 16 to be stacked.

Upon receiving the above control command signal from the master control portion 56, the slave control portion 95 of the first expansion unit 3 continues the conveyance operation of the extension feed path 64 to perform the conveyance operation and transfer the paper sheet S to the extension feed path 104 of the second expansion unit 4 on the downstream side.

If there are paper sheets S being conveyed on the branching feed path 105, the slave control portion 135 of the second expansion unit 4, which receives the aforementioned control command signal from the master control portion 56, stacks the paper sheets to the predetermined stacking portion among the stacking portions 121 and 122 based on the association information transmitted from the master control portion 56, while continuing to perform the conveyance operation.

Although the conveyance operation of the extension feed path 104 is continued, since the paper sheets S being conveyed on the extension feed path 104 including the paper sheets S involved in the paper sheet double-feed abnormality and the paper sheets S transferred from the extension feed path 64 are not finalized, if there is an empty stacking portion among the stacking portions 121 and 122 where the paper sheet S is yet to be stacked, all the paper sheets S are collectively conveyed to this empty stacking portion of the stacking portions 121 and 122 as an evacuation destination.

That is, when a conveyance abnormality requiring a "normal stop" occurs in the extension feed path 104, the slave control portions 95 and 135, in order to evacuate the paper sheet S being conveyed in the extension feed paths 64 and 104, switch the conveyance destinations so that the paper sheets S are conveyed to an empty stacking portion where paper sheets S are not stacked among the stacking portions 121 and 122. Note that when a conveyance abnormality requiring a "normal stop" occurs in the branching feed path 105, the slave control portions 95 and 135, in order to evacuate the paper sheet S being conveyed in the extension feed paths 64 and 104 and the branching feed path 105, switch the conveyance destinations so as to convey the paper sheet S to an empty stacking portion where paper sheets S are not stacked among the stacking portions 121 and 122.

At this time, if there is no empty stacking portion as an evacuation destination in the stacking portions 121 and 122, the slave control portion 135 collectively conveys the paper sheet S being conveyed on the extension feed paths 64 and 104 to the stacking portion with the least number of paper sheets S stacked among the stacking portions 121 and 122 serving as the evacuation destination.

In other words, when a conveyance abnormality requiring a "normal stop" has occurred, if an empty stacking portion where paper sheets S are yet to be stacked does not exist among the stacking portions 121 and 122, the slave control portion 135 switches the conveyance destination so that the paper sheets S being conveyed in the extension feed path 104 or the paper sheets being conveyed in the branching feed path 105 are conveyed to the stacking portion with the lowest number of stacked sheets among the stacking portions 121 and 122.

Specifically, when a conveyance abnormality requiring a "normal stop" occurs in the extension feed path 104 and there are no empty stacking portions among the stacking portions 121 and 122, the slave control portion 135 switches the conveyance destination so that paper sheets S being conveyed on the extension feed path 104 are conveyed to the stacking portion with the lowest number of stacked sheets among the stacking portions 121 and 122. When a conveyance abnormality requiring a "normal stop" occurs in the branching feed path 105 and there are no empty stacking portions among the stacking portions 121 and 122, the slave control portion 135 switches the conveyance destination so that paper sheets S being conveyed on the branching feed path 105 and the extension feed path 104 are conveyed to the stacking portion with the lowest number of stacked sheets among the stacking portions 121 and 122.

Alternatively, as the evacuation destination for a paper sheet S when a conveyance abnormality requiring a "normal stop" occurs for example in the extension feed path 104 and the branching feed path 105, a predetermined conveyance destination stacking portion, for example, the stacking portion 122, may be set among the stacking portions 121 and 122, and the paper sheet S in question may be collectively conveyed to the stacking portion 122 to be stacked.

In other words, when a conveyance abnormality requiring a "normal stop" occurs in the extension feed path 104 or the branching feed path 105, the slave control portion 135 may switch the conveyance destination so as to convey the paper sheet S being conveyed in the extension feed path 104 or the paper sheet S being conveyed in the branching feed path 105 to a predetermined stacking portion that has been set in advance among the stacking portions 121 and 122.

Specifically, when a conveyance abnormality requiring a "normal stop" occurs in the extension feed path 104, the slave control portion 135 switches the conveyance destination so that paper sheet S being conveyed on the extension feed path 104 is conveyed to the stacking portion of a predetermined conveyance destination among the stacking portions 121 and 122, for example, stacking portion 122. When a conveyance abnormality requiring a "normal stop" occurs in the branching feed path 105, the slave control portion 135 switches the conveyance destination so as to convey the paper sheet S being conveyed on the branching feed path 105 and the extension feed path 104 to the stacking portion of a predetermined conveyance destination among the stacking portions 121 and 122, for example, stacking portion 122.

As described above, during the occurrence of the second abnormality in the third counting mode, the slave control portions 95 and 135 continue the conveyance operation of all of the extension feed paths 64 and 104 and the branching feed path 105 without immediate stoppage when an abnormality has occurred requiring a "normal stop" in the extension feed path 104 of the second expansion unit 4, depending on the location and type of the conveyance abnormality that occurred, and conveys the paper sheet S of the extension feed paths 64 and 104 and the branching feed path 105 to the evacuation destination stacking portion of either of the stacking portions 121 and 122.

If there are paper sheets S being conveyed on the extension feed path 144 and the branching conveyance route 145, the slave control portion 175 of the third expansion unit 5, which receives the aforementioned control command signal from the master control portion 56, performs the stacking operation to the corresponding stacking portion among the stacking portions 161 to 163 based on the association information transmitted from the master control portion 56, while continuing to perform the conveyance operation.

In other words, during the occurrence of a conveyance abnormality, the slave control portion 175 continues the conveyance operation of both the extension feed path 144 and the branching feed path 145 without immediate stoppage when an abnormality has occurred requiring a "normal stop" in the extension feed path 104 of the second expansion unit 4 on the upstream side, depending on the location and type of the conveyance abnormality that occurred, and conveys the paper sheet S of the extension feed path 144 and the branching feed path 145 to the predetermined stacking portion of any of the stacking portions 161 to 163.

As described above, when the plurality of the first expansion unit 3 to the third expansion unit 5 are provided, the slave control portions 95, 135, 175 will, depending on the location of the conveyance abnormality that has occurred and the type of conveyance abnormality, convey the paper sheet S being conveyed downstream from the extension feed path 104 of the second expansion unit 4, which is the location of the conveyance abnormality that has occurred, to the predetermined stacking portion among the stacking portions 161 to 163, and convey the paper sheet S being conveyed upstream of the extension feed path 104 of the second expansion unit 4 to the predetermined stacking portion among the stacking portions 121 and 122 separate from the stacking portions 161 to 163. In other words, the slave control portions 95, 135, 175 individually switch the conveyance destination of the paper sheet S being conveyed downstream from the location of the conveyance abnormality that occurred and the paper sheet S being conveyed upstream from the location of the conveyance abnormality that occurred so as to either convey the paper sheet S to a predetermined stacking portion or to a separate stacking portion, according to the location of the conveyance abnormality that occurred and the type of conveyance abnormality.

Then, when these stacking operations are completed, the slave control portions 95, 135, 175 of the first expansion unit 3 to the third expansion unit 5 notify the master control portion 56 by performing a transmission to that effect. In response, the master control portion 56 transmits a control command signal including a "counting end stop" command to each of the multiple slave control portions 95, 135, 175, 225. Then, the plurality of slave control portions 95, 135, 175, 225 stop the conveyance operations of the extension feed paths 64, 104, 144, 184 and the branching feed paths 65, 105, 145, 185.

Subsequently, the master control portion 56 finalizes the count of the paper sheet S normally conveyed to the stacking portions other than the aforementioned evacuation destination stacking portion of the stacking portions 121 and 122, and the stacking portions 161 to 163. Note that the master control portion 56 considers all the paper sheet S other than the paper sheet S normally conveyed to the stacking portions other than the aforementioned evacuation destination stacking portion of the stacking portions 121 and 122, and the stacking portions 161 to 163 to be unfinalized.

The master control portion 56 then causes the operation display portion 55 to perform a display according to that shown in FIGS. 8 through 11 during the first abnormality in the second counting mode. In other words, the master control portion 56 causes the operation display portion 55 to indicate, first, that a paper sheet double-feed abnormality requiring a "normal stop" has occurred in the extension feed path 104 and that the unfinalized paper sheet S being conveyed have been stacked in an evacuation destination stacking portion (for example, the stacking portion 122) as described above, that there is a need to remove the paper sheet S from this stacking portion, the error code thereof, and the location where paper sheets S remain and need to be removed, having been detected based on the detection results of the paper sheet detection sensors (not shown) in each portion.

At the same time, the master control portion 56 causes the operation display portion 55 to indicate that the counting of the counted and conveyed paper sheet S stacked in the stacking portions 161 to 163 and the counting of the paper sheet S of the stacking portion other than the aforementioned evacuation destination stacking portion (for example stacking portion 121) among the stacking portions 121 and 122 has been finalized, and details of the quantity and amount by denomination and the total monetary amount of the paper sheet S that has been counted and finalized in this manner.

Then, the operator recognizes this fact and starts the abnormality recovery process. The operator removes the paper sheet S from the aforementioned evacuation destination stacking portion of the stacking sections 121 and 122 of the second expansion unit 4 for which guidance was given by the operation display section 55, and also removes the paper sheet S from the rejection portion 16 when the operation display portion 55 guides the operator to remove the paper sheet S from the rejection portion 16. When the base machine feed path 20 of the base machine 2 is displayed on the operation display portion 55 as a location where the paper sheet S needs to be removed, the operator opens the front cover (not shown) of the base machine 2 to expose the base machine feed path 20, removes the stuck paper sheet S, and then closes this front cover.

Then, when the operator presses a "reset" button (not shown) on the operation display portion 55, the master control portion 56 performs a reset operation that switches sorting portion 30 to the direction of conveying the paper sheet S from the identification conveyance portion 21 to the rejection conveyance portion 27, to cause the paper sheet S of the identification conveyance portion 21 to be conveyed to the rejection portion 16. At this time, if there is any paper sheet S stuck in the base machine feed path 20, this will cause all the paper sheet S to be conveyed to the rejection portion 16 and stacked. At this time, the master control portion 56 causes the operation display portion 55 to display guidance to guide the operator on removing the paper sheet S from the rejection portion 16.

At the same time, the master control portion 56 outputs a control command signal to the slave control portion 95 of the first expansion unit 3, instructing it to perform a reset operation. The slave control portion 95 of the first expansion unit 3 then performs a reset operation of the extension feed path 64 and the branching feed path 65.

At the same time, the master control portion 56 outputs a control command signal to the slave control portion 135 of the second expansion unit 4, instructing it to perform a reset operation. The slave control portion 135 of the second expansion unit 4 then performs a reset operation of the extension feed path 104 and the branching feed path 105.

At the same time, the master control portion 56 outputs a control command signal to the slave control portion 175 of the third expansion unit 5, instructing it to perform a reset operation. The slave control portion 175 of the third expansion unit 5 then performs a reset operation of the extension feed path 144 and the branching feed path 145.

Thus, even if a paper sheet double-feed abnormality has occurred in the extension feed path 104 of the second expansion unit 4, the paper sheets S being conveyed in the branching feed path 105 of the second expansion unit 4 and the extension feed path 144 and the branching feed path 145 of the third expansion unit 5, on the downstream side of the abnormality, are stacked in the predetermined stacking portion of the stacking portions 121 and 122 and the stacking portions 161 to 163, on the basis of the association information transmitted from the master control portion 56. Therefore, the counting of the paper sheet S stacked in the stacking portions 161 to 163 of the third expansion unit 5 and the stacking portion other than the evacuation destination of the stacking portions 121 and 122 of the second expansion unit 4 can be regarded as finalized. Accordingly, it is possible to reduce the operation burden on the operator involved in the abnormality recovery process.

When a conveyance abnormality requiring a "normal stop" has occurred in the extension feed path 104, the evacuation destination of the paper sheet S being conveyed in the extension feed paths 64 and 104 may be the terminal pocket 7, and so the paper sheet S may be conveyed to the terminal pocket 7.

(Third Abnormality in Third Counting Mode)

The third abnormality in the third counting mode is a conveyance abnormality requiring an "emergency stop" that occurred in the extension feed path 105 of the second expansion unit 4.

As the third abnormality in the third counting mode, details of the control in the case of a paper sheet jam abnormality requiring an "emergency stop" occurring in the branching feed path 105 of the second expansion unit 4 during the counting operation in the third counting mode will be described below.

During the normal counting operation in the above-described third counting mode described above, suppose a paper sheet jam abnormality requiring an "emergency stop" has occurred more on the stacking portion 122 side of the main conveyance portion 110 of the branching feed path 105 than the sorting portion 114 in the second expansion unit 4. Then, first, the slave control portion 135 of the second expansion unit 4 detects this, and notifies the master control portion 56 by transmitting a signal to the effect that a paper sheet jam abnormality requiring an "emergency stop" has occurred more on the stacking portion 122 side of the main conveyance portion 110 of the branching feed path 105 than the sorting portion 114 in the second expansion unit 4.

In response, the master control portion 56 notifies all of the slave control portions 95, 125, 175, 225 by transmitting thereto a signal to the effect that a paper sheet jam abnormality requiring an "emergency stop" has occurred more on the stacking portion 122 side of the main conveyance portion 110 of the branching feed path 105 than the sorting portion 114 in the second expansion unit 4.

The master control portion 56 transmits to the slave control portion 135 of the second expansion unit 4 a control command signal including a command to perform an "normal non-finalizing stop" on the extension feed path 104, and transmits thereto a control command signal including a command to perform a "emergency stop" on the branching feed path 105.

The master control portion 56 transmits to the slave control portion 95 of the first expansion unit 3 a control command signal including a command to perform a "normal non-finalizing stop" on the extension feed path 64, and transmits thereto a control command signal including a command to perform a "normal finalizing stop" on the branching feed path 65.

The master control portion 56 transmits to the slave control portions 175 and 225 of the third expansion unit 5 and fourth expansion unit 6 a control command signal that includes a command to perform a "normal finalizing stop" on the extension feed paths 144 and 184 and the branching feed paths 145 and 185.

The master control portion 56 immediately stops the drive of the loading portion 15 of the base machine 2 to stop the taking-in operation of a paper sheet S by the loading portion 15. Note that, if a determination is made that, with regard to the conveyance operation of the base machine feed path 20, there is a risk of a paper sheet S on the base machine feed path 20 being passed downstream to the first expansion unit 3 as a result of the switching operation of the sorting unit 30 not occurring in time, the master control portion 56 immediately stops the conveyance operation of the base machine feed path 20. Conversely, in the case of a determination that all the paper sheet S in the base machine feed path 20 can be conveyed to the rejection portion 16 normally due to the switching of the sorting portion 30 happening in time, the master control portion 56 has all the paper sheet S of the base machine feed path 20 conveyed to the rejection portion 16 to be stacked.

The slave control portion 95 of the first expansion unit 3, which receives the above control command signal from the master control portion 56, switches the conveyance destination of the paper sheet S being conveyed on the extension feed path 64 to an evacuation destination stacking portion determined in advance among any of the empty stacking portions 81 to 84 of the first expansion unit 3 via the branching feed path 65, and causes the paper sheet S to be stacked at this stacking portion.

In other words, during the occurrence of the third abnormality in the third counting mode, the slave control portion 95 continues the conveyance operation of both the extension feed path 64 and the branching feed path 65 without immediate stoppage when an abnormality has occurred requiring an "emergency stop" in the branching feed path 105 of the second expansion unit 4, depending on the location and type of the conveyance abnormality that occurred, and conveys the paper sheet S of the extension feed path 64 to one of the stacking portions 81 to 84 serving as the predetermined evacuation destination.

Upon receiving the above control command signal from the master control portion 56, the slave control portion 135 of the second expansion unit 4 immediately stops the conveyance operation of the branching feed path 105. Further, the paper sheet S being conveyed on the extension feed path 104 cannot be conveyed to either of the stacking portions 121 and 122 of the second expansion unit 4. Therefore, the paper sheets S being conveyed on the extension feed path 104 are stacked at the evacuation destination stacking portion among the stacking portions 161 to 163 of the third expansion unit 5 via the extension feed path 144 and the branching feed path 145. At this time, if there is an empty stacking portion among the stacking portions 161 to 163, this stacking portion shall be the evacuation destination, and if there is no empty stacking portion among the stacking portions 161 to 163, the stacking portion with the least number of sheets shall be the evacuation destination. Alternatively, a predetermined stacking portion among the stacking portions 161 to 163, for example, the stacking portion 163, shall be the evacuation destination.

In other words, during the occurrence of a conveyance abnormality, the slave control portion 95 continues the conveyance operation of all of the extension feed paths 104 and 144 and the branching feed path 145 without immediate stoppage when an abnormality requiring an "emergency stop" has occurred in the branching feed path 105 of the second expansion unit 4, depending on the location and type of the conveyance abnormality that occurred, and conveys the paper sheet S of the extension feed path 104 to the stacking portion serving as the predetermined evacuation destination among the stacking portions 161 to 163.

If there are paper sheets S being conveyed on the extension feed path 144 and the branching conveyance route 145, the slave control portion 175 of the third expansion unit 5, which receives the aforementioned control command signal from the master control portion 56, stacks the paper sheets S to the predetermined stacking portion among the stacking portions 161 to 163 based on the association information transmitted from the master control portion 56, while continuing to perform the conveyance operation.

In other words, during the occurrence of a conveyance abnormality, the slave control portion 175 continues the conveyance operation of both the extension feed path 144 and the branching feed path 145 without immediate stoppage when an abnormality requiring an "emergency stop" has occurred in the branching feed path 105 of the second expansion unit 4, depending on the location and type of the conveyance abnormality that occurred, and conveys the paper sheet S of the extension feed path 144 and the branching feed path 145 to the predetermined stacking portion of any of the stacking portions 161 to 163.

When the slave control portions 95, 135, 175 of the first expansion unit 3 to the third expansion unit 5 finish their respective processes, they transmit a signal to that effect to the master control portion 56 to give notification.

In response, the master control portion 56 transmits a control command signal including a "counting end stop" command to each of the multiple slave control portions 95, 135, 175, 225. Then, the plurality of slave control portions 95, 135, 175, 225 stop the conveyance operations of the extension feed paths 64, 104, 144, 184 and the branching feed paths 65, 105, 145, 185.

Subsequently, the master control portion 56 then finalizes the counting of the paper sheet S normally conveyed to the stacking portions 121 and 122 and the stacking portions other than the evacuation destination stacking portion of the paper sheet S of the extension feed paths 64 and 104 among the stacking portions 161 to 163. Note that the master control portion 56 considers all the paper sheet S other than the paper sheet S normally conveyed to the stacking portions 121 and 122 and the stacking portions other than the evacuation destination stacking portion of the stacking portions 161 to 163 to be unfinalized.

The master control portion 56 then causes the operation display portion 55 to perform a display according to that shown in FIGS. 8 through 11 during the first abnormality in the second counting mode. That is, the master control portion 56 first causes the operation display portion 55 to indicate that a paper sheet jam abnormality has occurred in the branching feed path 105 of the second expansion unit 4, the error code thereof, and the location where the paper sheet S remains and requires removal, as detected based on the detection results of the paper sheet detection sensors (not shown) in each portion.

At the same time, the master control portion 56 also causes the operation display portion 55 to indicate that the counting of the counted and conveyed paper sheet S stacked in the stacking portions 121 and 122 and the paper sheet S stacked in the stacking portions 161 to 163 except for the paper sheet S of the evacuation destination stacking portion that received paper sheet S requiring removal has been finalized, and details of the quantity and amount by denomination and the total monetary amount of the paper sheet S that has been counted and finalized in this manner.

Then, the operator recognizes this fact and starts the abnormality recovery process. The operator opens the front cover (not shown) of the second expansion unit 4 to expose the branching feed path 105, removes the jammed paper sheet S stuck in the branching feed path 105, and also removes a paper sheet S stuck elsewhere in the branching feed path 105, if any, and closes the front cover. When the base machine feed path 20 of the base machine 2 is displayed on the operation display portion 55 as the location where the paper sheets S need to be removed, the operator opens the front cover (not shown) of the base machine 2 to expose the base machine feed path 20, removes the paper sheets S stuck in the base machine feed path 20, and closes the front cover. When the operation display portion 55 displays that there is a paper sheet S rejected by the rejection portion 16, the operator takes out the paper sheet S from the rejection portion 16. Moreover, when the operation display portion 55 displays that there is a paper sheet S that has been evacuated to the predetermined stacking portion serving as the evacuation destination among the stacking portions 81 to 84, the operator removes the paper sheet S from this stacking portion. Moreover, when the operation display portion 55 displays that there is a paper sheet S that has been evacuated to the predetermined stacking portion serving as the evacuation destination among the stacking portions 161 to 163, the operator removes the paper sheet S from this stacking portion. Then the "reset" button (not shown) on the operation display portion 55 is pressed.

Then, the master control portion 56 performs a reset operation that switches the sorting portion 30 to the direction of conveying the paper sheet S from the identification conveyance portion 21 to the rejection conveyance portion 27, to cause the paper sheet S of the base machine feed path 20 to be conveyed to the rejection portion 16. Then, if there is any paper sheet S that was forgotten to be removed in the base machine feed path 20, this reset operation will cause those paper sheets S to be conveyed to the rejection portion 16 and stacked. At this time, the master control portion 56 causes the operation display portion 55 to display guidance on the removal of the paper sheet S from the rejection portion 16.

At the same time, the master control portion 56 outputs a control command signal to the slave control portion 95 of the first expansion unit 3, instructing it to perform a reset operation. The slave control portion 95 of the first expansion unit 3 then performs a reset operation of the extension feed path 64 and the branching feed path 65.

At the same time, the master control portion 56 outputs a control command signal to the slave control portion 175 of the third expansion unit 5, instructing it to perform a reset operation. The slave control portion 175 of the third expansion unit 5 then performs a reset operation of the extension feed path 144 and the branching feed path 145.

At the same time, the master control portion 56 outputs a control command signal to the slave control portion 135 of the second expansion unit 4, instructing it to perform a reset operation. At this time, if there are any paper sheets S stuck in the branching feed path 105, all the paper sheets S are conveyed to a predetermined evacuation destination among the stacking portions 121 and 122, for example, the stacking portion 122, for stacking. At this time, the master control portion 56 causes the operation display portion 55 to display guidance to guide the operator on removing the paper sheet S from the evacuation destination stacking portion 122. In this case, the master control portion 56 assumes that all paper sheets S in this evacuation destination stacking portion 122 are unfinalized.

As described above, even if a paper sheet jam abnormality occurs on the branching feed path 105 of the second expansion unit 4, the paper sheets S being conveyed on the extension feed path 144 and the branching transport path 145 of the third expansion unit 5, on the downstream side, are stacked in a predetermined stacking portion of the stacking portions 161 to 163 based on the association information transmitted from the master control portion 56. Therefore, among the stacking portions 161 to 163 of the third expansion unit 5, the counting can be regarded as finalized except for the paper sheet S of the evacuation destination stacking portion from which the paper sheet S needs to be removed.

Moreover, if there is a paper sheet S that has been forgotten to be removed from the branching feed path 105 during the abnormality recovery processing by the operator, during the reset operation the paper sheet in question will be conveyed to the stacking portion of the evacuation destination among the stacking portions 121 and 122 to be stacked. Therefore, it is possible to reduce the burden on the operator involved in the operation of the abnormality recovery process.

When a conveyance abnormality requiring an "emergency stop" occurs in the branching feed path 105, the paper sheets S being conveyed in the extension feed paths 64 and 104 may be conveyed to any of the corresponding stacking portions 161 to 163 if the conveyance destination based on the identification result of the validator 22 is one of the stacking portions 161 to 163, or to the terminal pocket 7 as an evacuation destination if the conveyance destination based on the identification result of the validator 22 is the stacking portions 121 and 122. In this case, counting of the paper sheet S transported to any of the corresponding stacking portions 161 to 163 will be finalized, while the counting of the paper sheet S conveyed to the terminal pocket 7 will not be finalized.

(Fourth Abnormality in Third Counting Mode)

The fourth abnormality in the third counting mode is a conveyance abnormality requiring an “emergency stop” that occurred in the branching feed path 145 of the third expansion unit 5.

As the fourth abnormality in the third counting mode, details of the control in the case of a paper sheet jam abnormality requiring an “emergency stop” occurring in the branching feed path 145 of the third expansion unit 5 during the counting operation in the third counting mode will be described below.

During the normal counting operation in the third counting mode described above, suppose a paper sheet jam abnormality requiring an “emergency stop” has occurred between the sorting portion 154 and the sorting portion 155 in the main conveyance portion 150 of the branching feed path 145 of the third expansion unit 5. Then, the slave control portion 175 of the third expansion unit 5 detects this, and notifies the master control portion 56 by transmitting a signal to the effect that a paper sheet jam abnormality requiring an “emergency stop” has occurred between the sorting portion 154 and the sorting portion 155 in the main conveyance portion 150 of the branching feed path 145 of the third expansion unit 5.

In response, the master control portion 56 notifies all of the slave control portions 95, 125, 175, 225 by transmitting thereto a signal to the effect that a paper sheet jam abnormality requiring an “emergency stop” has occurred between the sorting portion 154 and the sorting portion 155 in the main conveyance portion 150 of the branching feed path 145 of the third expansion unit 5.

The master control portion 56 transmits to the slave control portion 175 of the third expansion unit 5 a control command signal including a command to perform an “normal non-finalizing stop” on the extension feed path 144, and transmits thereto a control command signal including a command to perform an “emergency stop” on the branching feed path 145.

The master control portion 56 transmits to the slave control portions 95 and 135 of the first expansion unit 3 and the second expansion unit 4 a control command signal including a command to perform a “normal non-finalizing stop” on the extension feed paths 64 and 104, and transmits thereto a control command signal including a command to perform a “normal finalizing stop” on the branching feed paths 65 and 105.

The master control portion 56 transmits to the slave control portion 225 of the fourth expansion unit 6 a control command signal that includes a command to perform a “normal finalizing stop” on the extension feed path 184 and the branching feed path 185.

The master control portion 56 immediately stops the drive of the loading portion 15 of the base machine 2 to stop the taking-in operation of a paper sheet S by the loading portion 15. Note that, if a determination is made that, with regard to the conveyance operation of the base machine feed path 20, there is a risk of a paper sheet S on the base machine feed path 20 being passed downstream to the first expansion unit 3 as a result of the switching operation of the sorting unit 30 not occurring in time, the conveyance operation of the base machine feed path 20 is immediately stopped. Conversely, in the case of a determination that all the paper sheet S in the base machine feed path 20 can be conveyed to the rejection portion 16 normally due to the switching of the sorting portion 30 happening in time, all the paper sheet S of the base machine feed path 20 is conveyed to the rejection portion 16 to be stacked.

The slave control portion 95 of the first expansion unit 3, which has received the above control command signal from the master control portion 56, when there is a paper sheet S being conveyed on the extension feed path 64, switches the conveyance destination of the paper sheet S to an evacuation destination stacking portion determined in advance among the empty stacking portions 81 to 84 of the first expansion unit 3 and causes the paper sheet S to be stacked in this stacking portion.

In other words, during the occurrence of the fourth abnormality in the third counting mode, the slave control portion 95 continues the conveyance operation of both the extension feed path 64 and the branching feed path 65 on the upstream side without immediate stoppage when an abnormality has occurred requiring an “emergency stop” in the branching feed path 145 of the third expansion unit 5, depending on the location and type of the conveyance abnormality that occurred, and conveys the paper sheet S of the extension feed path 64 to any of the stacking portions 81 to 84 serving as the predetermined evacuation destination.

If there are paper sheets S being conveyed on the branching feed path 105, the slave control portion 135 of the second expansion unit 4, which receives the aforementioned control command signal from the master control portion 56, stacks the paper sheets S to the predetermined stacking portion among the stacking portions 121 and 122 based on the association information transmitted from the master control portion 56, while continuing to perform the conveyance. If there are paper sheets S being conveyed in the extension feed path 104, the paper sheet S are stacked in the evacuation destination stacking portion of either of the stacking portions 121 and 122 of the second expansion unit 4. At this time, if there is an empty stacking portion among the stacking portions 121 and 122, this stacking portion shall be the evacuation destination, and if there is no empty stacking portion among the stacking portions 121 and 122, the stacking portion with the least number of sheets shall be the evacuation destination. Alternatively, a preset stacking portion among the stacking portions 121 and 122, for example, the stacking portion 122, shall be the evacuation destination.

In other words, during the occurrence of a conveyance abnormality, the slave control portion 135 continues the conveyance operation of both the extension feed path 104 and the branching feed path 105 without immediate stoppage when an abnormality requiring an “emergency stop” has occurred in the branching feed path 145 of the third expansion unit 5, depending on the location and type of the conveyance abnormality that occurred, and conveys the paper sheet S of the extension feed path 104 and the branching feed path 105 to the predetermined stacking portion of either of the stacking portions 121 and 122.

Upon receiving the above control command signal from the master control portion 56, the slave control portion 175 of the third expansion unit 5 immediately stops the conveyance operation of the branching feed path 145. If any paper sheets S are being conveyed in the extension feed path 144, the slave control portion 175 allows the conveying operation to continue as it is, and has the paper sheet S conveyed to the terminal pocket 7 via the extension feed path 184 for stacking.

In other words, during the occurrence of a conveyance abnormality, the slave control portions 175 and 225 continue the conveyance operation of the extension feed path 144, which is one of the extension feed path 144 and the branching feed path 145, without immediate stoppage when an abnormality requiring an “emergency stop” has occurred in the branching feed path 145 of the third expansion unit 5, depending on the location and type of the conveyance abnormality that occurred, and convey the paper sheet S of the extension feed path 144 to the terminal pocket 7 as the stacking portion via the extension feed path 184. In other words, the slave control portions 175 and 225 switch the conveyance destination so that the paper sheet S being conveyed on the extension feed path 144 is conveyed to the terminal pocket 7 if the location of the conveyance abnormality that has occurred is not in the extension feed path 144.

The slave control portions 95, 135, 175 of the first expansion unit 4 to the fourth expansion unit 6, upon finishing their respective processes, notify the master control portion 56 by transmitting a signal thereto to that effect. In response, the master control portion 56 transmits a control command signal including a “counting end stop” command to each of the multiple slave control portions 95, 135, 175, 225. Then, the plurality of slave control portions 95, 135, 175, 225 stop the conveyance operations of the extension feed paths 64, 104, 144, 184 and the branching feed paths 65, 105, 145, 185.

Subsequently, the master control portion 56 finalizes the counting of the paper sheet S normally conveyed to the stacking portions 161 to 163 and the stacking portion other than the stacking portion serving as the evacuation destination of the paper sheet S of the extension feed path 104 among the stacking portions 121 and 122. Note that the master control portion 56 considers all the paper sheet S other than the paper sheet S normally conveyed to the stacking portions 161 to 163 and the stacking portion other than the stacking portion serving as the evacuation destination among the stacking portions 121 and 122 to be unfinalized.

The master control portion 56 causes the operation display portion 55 to perform a display according to that shown in FIGS. 8 through 11 during the first abnormality in the second counting mode. That is, the master control portion 56 first causes the operation display portion 55 to indicate that a paper sheet jam abnormality has occurred in the branching feed path 145 of the third expansion unit 5, the error code thereof, and the location where the paper sheets S remain and require removal, as detected based on the detection results of the paper sheet detection sensors (not shown) in each portion.

At the same time, the master control portion 56 also causes the operation display portion 55 to indicate that the counting of the counted and conveyed paper sheet S already stacked in the stacking portions 161 to 163 and the paper sheet S excluding the paper sheet S of the evacuation destination stacking portion of the paper sheet S among the stacking portions 121 and 122 has been finalized, and details of the quantity and amount by denomination and the total monetary amount of the paper sheet S that has been counted and finalized in this manner.

Then, the operator recognizes this fact and starts the abnormality recovery process. The operator opens the front cover (not shown) of the third expansion unit 5 to expose the branching feed path 145, removes the jammed paper sheet S stuck in the branching feed path 145, and also removes a paper sheet S stuck elsewhere in the branching feed path 145, if any, and closes the front cover. When the base machine feed path 20 of the base machine 2 is displayed on the operation display portion 55 as a location where the paper sheet S needs to be removed, the operator opens the front cover (not shown) of the base machine 2 to expose the base machine feed path 20, removes the stuck paper sheet S, and then closes the front cover. When the operation display portion 55 displays that there is a paper sheet S rejected by the rejection portion 16, the operator takes out the paper sheet S from the rejection portion 16. Moreover, when the operation display portion 55 displays that there is a paper sheet S that has been evacuated to the predetermined stacking portion serving as the evacuation destination among the stacking portions 81 to 84, the operator removes the paper sheet S from this stacking portion. Moreover, when the operation display portion 55 displays that there is a paper sheet S that has been evacuated to the stacking portion serving as the evacuation destination among the stacking portions 121 and 122, the operator removes the paper sheet S from this stacking portion. Moreover, when the operation display portion 55 displays that there is a paper sheet S that has been evacuated to the terminal pocket 7 serving as the evacuation destination, the operator removes the paper sheet S from the terminal pocket 7. Then the operator presses the “reset” button (not shown) on the operation display portion 55.

Then, the master control portion 56 performs a reset operation that switches the sorting portion 30 to the direction of conveying the paper sheet S from the identification conveyance portion 21 to the rejection conveyance portion 27, to cause the paper sheet S of the base machine feed path 20 to be conveyed to the rejection portion 16. Then, if there is any paper sheet S that was forgotten to be removed in the base machine feed path 20, this reset operation will cause those paper sheets S to be conveyed to the rejection portion 16 and stacked. At this time, the master control portion 56 causes the operation display portion 55 to display guidance on the removal of the paper sheet S from the rejection portion 16.

At the same time, the master control portion 56 outputs a control command signal to the slave control portion 95 of the first expansion unit 3, instructing it to perform a reset operation. The slave control portion 95 of the first expansion unit 3 then performs a reset operation of the extension feed path 64 and the branching feed path 65.

At the same time, the master control portion 56 outputs a control command signal to the slave control portion 135 of the second expansion unit 4, instructing it to perform a reset operation. The slave control portion 135 of the second expansion unit 4 then performs a reset operation of the extension feed path 104 and the branching feed path 105.

At the same time, the master control portion 56 outputs a control command signal to the slave control portion 175 of the third expansion unit 5, instructing it to perform a reset operation. The slave control portion 175 of the third expansion unit 5 then performs a reset operation of the extension feed path 144 and the branching feed path 145.

At this time, if there are any paper sheets S stuck in the branching feed path 145 of the third expansion unit 5, all the stuck paper sheets S are conveyed to a predetermined evacuation destination stacking portion among the stacking portions 161 to 163, for example, the stacking portion 163, for stacking. At this time, the master control portion 56 causes the operation display portion 55 to display guidance to guide the operator on removing the paper sheet S from the evacuation destination stacking portion 163. In this case, the master control portion 56 assumes that all the paper sheet S in this evacuation destination stacking portion 163 are unfinalized.

As described above, if a paper sheet jam abnormality has occurred in the branching feed path 145 of the third expansion unit 5, the counting of the paper sheet S stacked in the stacking portions 161 to 163 of the third expansion unit 5 on the downstream side and the paper sheet S stacked in the stacking portion other than the evacuation destination stacking portion of the stacking portions 121 and 122 of the second expansion unit 4 on the upstream side can be regarded as finalized.

Moreover, if there is a paper sheet S that has been forgotten to be removed from the branching feed path 145 during the abnormality recovery processing by the operator, during the reset operation the paper sheet in question will be conveyed to the aforementioned evacuation destination stacking portion among the stacking portions 161 to 163 to be stacked. Therefore, it is possible to reduce the burden on the operator involved in the operation of the abnormality recovery process.

When a conveyance abnormality requiring an "emergency stop" occurs in the branching feed path 145, the paper sheets S being conveyed in the extension feed paths 64 and 104 may be conveyed to the stacking portions 121 and 122 if the conveyance destinations thereof based on the identification result of the validator 22 are the stacking portions 121 and 122, or may be conveyed to the terminal pocket 7 as an evacuation destination if the conveyance destinations based on the identification result of the validator 22 are the stacking portions 161 to 163. In this case, counting of the paper sheet S transported to the stacking portions 121 and 122 will be finalized, while the counting of the paper sheet S conveyed to the terminal pocket 7 will not be finalized.

During the counting processing in the second counting mode, the slave control portion 95 of the paper sheet processing device 1 described above continues the conveyance operation of both the extension feed path 64 and the branching feed path 65 without immediate stoppage when the first abnormality occurs, which is a paper sheet jam abnormality requiring an "emergency stop" at the identification section 22, and conveys the paper sheet S of the extension feed path 64 and the branching feed path 65 to the predetermined stacking portion of any of the stacking portions 81 to 84.

During the occurrence of the second abnormality in which an intake malfunction of the paper sheet S has occurred in the loading portion 15 that can be resolved with a "normal stop" in the counting processing of the second counting mode, the master control portion 56 and the slave control portion 95 continue the conveyance operation of all of the base machine feed path 20, the extension feed path 64 and the branching feed path 65 without immediate stoppage to stack the paper sheet S of the base machine feed path 20, the extension feed path 64 and the branching feed path 65 in the predetermined stacking portion of any of the stacking portions 81 to 84.

During the occurrence of the third abnormality in which a paper sheet jam abnormality has occurred requiring an "emergency stop" in the extension feed path 64 of the first expansion unit 3 in the counting processing of the second counting mode, the slave control portion 95 continues the conveyance operation of the branching feed path 65, which is one of the extension feed path 64 and the branching feed path 65, without immediate stoppage to convey the paper sheet S of the branching feed path 65 to the predetermined stacking portion of any of the stacking portions 81 to 84.

During the occurrence of the fourth abnormality in which an abnormality has occurred requiring a "normal stop" in the extension feed path 64 of the first expansion unit 3 in the counting processing of the second counting mode, the slave control portion 95 continues the conveyance operation of both of the extension feed path 64 and the branching feed path 65 without immediate stoppage to convey the paper sheet S of the extension feed path 64 and the branching feed path 65 to the predetermined stacking portion of any of the stacking portions 81 to 84.

During the occurrence of the first abnormality in which a paper sheet jam abnormality has occurred requiring an "emergency stop" in the extension feed path 104 of the second expansion unit 4 in the counting processing of the third counting mode, the slave control portion 95 continues the conveyance operation of both of the extension feed path 64 and the branching feed path 65 without immediate stoppage to convey the paper sheet S of the extension feed path 64 to the predetermined stacking portion of any of the stacking portions 81 to 84.

During the occurrence of the first abnormality in which a paper sheet jam abnormality has occurred requiring an "emergency stop" in the extension feed path 104 of the second expansion unit 4 in the counting processing of the third counting mode, the slave control portion 135 continues the conveyance operation of the branching feed path 105, which is one of the extension feed path 104 and the branching feed path 105, without immediate stoppage to convey the paper sheet S of the branching feed path 105 to the predetermined stacking portion of either of the stacking portions 121 and 122.

During the occurrence of the first abnormality in which a paper sheet jam abnormality has occurred requiring an "emergency stop" in the extension feed path 104 of the second expansion unit 4 in the counting processing of the third counting mode, the slave control portion 175 continues the conveyance operation of both of the extension feed path 144 and the branching feed path 145 without immediate stoppage to convey the paper sheet S of the extension feed path 144 and the branching feed path 145 to the predetermined stacking portion of any of the stacking portions 161 to 163.

During the occurrence of the second abnormality in which an abnormality has occurred requiring a "normal stop" in the extension feed path 104 of the second expansion unit 4 in the counting processing of the third counting mode, the slave control portions 95 and 135 continue the conveyance operation of all of the extension feed paths 64 and 104 and the branching feed path 105 without immediate stoppage to convey the paper sheet S of the extension feed paths 64 and 104 and the branching feed path 105 to the predetermined stacking portion of either of the stacking portions 121 and 122.

During the occurrence of the second abnormality in which an abnormality has occurred requiring a "normal stop" in the extension feed path 104 of the second expansion unit 4 in the counting processing of the third counting mode, the slave control portion 175 continues the conveyance operation of both of the extension feed path 144 and the branching feed path 145 without immediate stoppage to convey the paper sheet S of the extension feed path 144 and the branching feed path 145 to the predetermined stacking portion of any of the stacking portions 161 to 163.

During the occurrence of the third abnormality in which an abnormality has occurred requiring an "emergency stop"

in the branching feed path 105 of the second expansion unit 4 in the counting processing of the third counting mode, the slave control portion 95 continues the conveyance operation of both of the extension feed path 64 and the branching feed path 65 without immediate stoppage to convey the paper sheet S of the extension feed path 64 to the predetermined stacking portion of any of the stacking portions 81 to 84.

During the occurrence of the third abnormality in which an abnormality has occurred requiring an "emergency stop" in the branching feed path 105 of the second expansion unit 4 in the counting processing of the third counting mode, the slave control portions 135 and 175 continue the conveyance operation of all of the extension feed paths 104 and 144 and the branching feed path 145 without immediate stoppage to convey the paper sheet S of the extension feed paths 104 and 144 and the branching feed path 145 to the predetermined stacking portion of any of the stacking portions 161 to 163.

During the occurrence of the third abnormality in which an abnormality has occurred requiring an "emergency stop" in the branching feed path 105 of the second expansion unit 4 in the counting processing of the third counting mode, the slave control portion 175 continues the conveyance operation of both of the extension feed path 144 and the branching feed path 145 without immediate stoppage to convey the paper sheet S of the extension feed path 144 and the branching feed path 145 to the predetermined stacking portion of any of the stacking portions 161 to 163.

During the occurrence of the fourth abnormality in which an abnormality has occurred requiring an "emergency stop" in the branching feed path 145 of the third expansion unit 5 in the counting processing of the third counting mode, the slave control portion 95 continues the conveyance operation of both of the extension feed path 64 and the branching feed path 65 without immediate stoppage to convey the paper sheet S of the extension feed path 64 to the predetermined stacking portion of any of the stacking portions 81 to 84.

During the occurrence of the fourth abnormality in which an abnormality has occurred requiring an "emergency stop" in the branching feed path 145 of the third expansion unit 5 in the counting processing of the third counting mode, the slave control portion 135 continues the conveyance operation of both of the extension feed path 104 and the branching feed path 105 without immediate stoppage to convey the paper sheet S of the extension feed path 104 and the branching feed path 105 to the predetermined stacking portion of either of the stacking portions 121 and 122.

During the occurrence of the fourth abnormality in which an abnormality has occurred requiring an "emergency stop" in the branching feed path 145 of the third expansion unit 5 in the counting processing of the third counting mode, the slave control portions 175 and 225 continue the conveyance operation of the extension feed path 144, which is one of the extension feed path 144 and the branching feed path 145, without immediate stoppage and convey the paper sheet S of the extension feed path 144 to the terminal pocket 7 as the stacking portion via the extension feed path 184.

Therefore, during the occurrence of a conveyance abnormality, the paper sheet processing device 1 does not simply immediately stop the conveyance operations of all of the extension feed paths 64, 104, 144, 184 and the branching feed paths 65, 105, 145, 185, but rather continues as much as possible the conveyance of the paper sheet S being conveyed according to the location of the abnormality that occurred and the type of the abnormality to convey the paper sheet to the predetermined location. This allows the operator to reduce the number of target sheets and target locations of a paper sheet S to be removed from within the paper sheet processing device 1 when the conveyance operations of the extension feed paths 64, 104, 144, 184 and the branching feed paths 65, 105, 145, 185 are finally stopped. Therefore, when a conveyance abnormality occurs, the work of removing the paper sheet S can be made easier.

During the occurrence of the fourth abnormality in which an abnormality has occurred requiring a "normal stop" in the extension feed path 64 or the branching feed path 65 of the first expansion unit 3 in the counting processing of the second counting mode, the slave control portion 95 switches the conveyance destination so as to convey the paper sheet S being conveyed in the extension feed path 64 or the paper sheet S being conveyed in the branching feed path 65 to an empty stacking portion in which paper sheets S are not stacked among the stacking portions 81 to 84.

During the occurrence of the second abnormality in which an abnormality has occurred requiring a "normal stop" in the extension feed path 104 or the branching feed path 105 of the second expansion unit 4 in the counting processing of the third counting mode, the slave control portion 135 switches the conveyance destination so as to convey the paper sheet S being conveyed in the extension feed path 104 or the paper sheet S being conveyed in the branching feed path 105 to an empty stacking portion in which paper sheets S are not stacked among the stacking portions 121 and 122.

Therefore, according to the paper sheet processing unit 1, when an abnormality occurs and the paper sheet S being conveyed on the extension feed path 64, the extension feed path 104, the branching feed path 65 and the branching feed path 105 are stacked in a concentrated manner in an empty stacking portion, the number of paper sheets to be recounted will be reduced. Accordingly, it is possible to reduce the processing load.

During the occurrence of the fourth abnormality in which an abnormality has occurred requiring a "normal stop" in the extension feed path 64 or the branching feed path 65 of the first expansion unit 3 in the counting processing of the second counting mode, the slave control portion 95 switches the conveyance destination so as to convey the paper sheet S being conveyed in the extension feed path 64 or the paper sheet S being conveyed in the branching feed path 65 to the stacking portion with the lowest number of stacked sheets among the stacking portions 81 to 84 when there is no empty stacking portion in which paper sheets S are not stacked among the stacking portions 81 to 84.

During the occurrence of the fourth abnormality in which an abnormality has occurred requiring a "normal stop" in the extension feed path 104 or the branching feed path 105 of the first expansion unit 4 in the counting processing of the second counting mode, the slave control portion 135 switches the conveyance destination so as to convey the paper sheet S being conveyed in the extension feed path 104 or the paper sheet S being conveyed in the branching feed path 105 to the stacking portion with the lowest number of stacked sheets among the stacking portions 81 to 84 when there is no empty stacking portion in which paper sheets S are not stacked among the stacking portions 81 to 84.

Therefore, when an abnormality occurs and the paper sheet S being conveyed on the extension feed path 64, the extension feed path 104, the branching feed path 65 and the branching feed path 105 are conveyed to and stacked in a concentrated manner in the stacking portion with the lowest number of stacked sheets, the number of paper sheet to be recounted will be reduced. Accordingly, it is possible to reduce the processing load.

During the occurrence of the fourth abnormality in which an abnormality has occurred requiring a "normal stop" in the extension feed path 64 or the branching feed path 65 of the first expansion unit 3 in the counting processing of the second counting mode, the slave control portion 95 may switch the conveyance destination so as to convey the paper sheet S being conveyed in the extension feed path 64 or the paper sheet S being conveyed in the branching feed path 65 to a predetermined stacking portion set in advance among the stacking portions 81 to 84.

During the occurrence of the second abnormality in which an abnormality has occurred requiring a "normal stop" in the extension feed path 104 or the branching feed path 105 of the second expansion unit 4 in the counting processing of the third counting mode, the slave control portion 135 may switch the conveyance destination so as to convey the paper sheet S being conveyed in the extension feed path 104 or the paper sheet S being conveyed in the branching feed path 105 to a predetermined stacking portion set in advance among the stacking portions 121 and 122.

With this configuration, when an abnormality occurs the paper sheet S being conveyed on the extension feed path 64, the extension feed path 104, the branching feed path 65 and the branching feed path 105 are stacked in a predetermined stacking portion set in advance as a conveyance destination among the stacking portions 81 to 84, 121 and 122. Therefore, the slave control portions 95 and 135 can be easily controlled accordingly. In addition, since the stacking portion to be removed by the operator during the abnormality recovery process is set in advance, the number of places to be processed by the operator is reduced and the stacking locations to be removed are easy to understand.

During the occurrence of the first abnormality in the third counting mode, the slave control portions 95, 135, 175 will, depending on the location of the conveyance abnormality that has occurred and the type of conveyance abnormality, convey the paper sheet S being conveyed downstream from the extension feed path 104 of the second expansion unit 4, which is the location of the conveyance abnormality that has occurred, to the predetermined stacking portion among the stacking portions 121, 122, 161 to 163, and convey the paper sheet S being conveyed upstream of the extension feed path 104 of the second expansion unit 4 to the predetermined stacking portion among the separate stacking portions 81 to 84.

During the occurrence of the second abnormality in the third counting mode, the slave control portions 95, 135, 175 will, depending on the location of the conveyance abnormality that has occurred and the type of conveyance abnormality, convey the paper sheet S being conveyed downstream from the extension feed path 104 of the second expansion unit 4, which is the location of the conveyance abnormality that has occurred, to the predetermined stacking portion among the stacking portions 161 to 163, and convey the paper sheet S being conveyed upstream of the extension feed path 104 of the second expansion unit 4 to the predetermined stacking portion among the separate stacking portions 121 and 122.

Accordingly, in the configuration in which a plurality of the first expansion unit 3 to the third expansion unit 5 are provided, even if the conveyance destinations of the conveyed paper sheet S are distributed among the first expansion unit 3 to the third expansion unit 5, the number of places to be processed by the operator at the time of abnormality recovery processing is reduced. Accordingly, it is possible to reduce the processing load.

During the occurrence of the fourth abnormality in the third counting mode, if the location of the conveyance abnormality that has occurred is not in the extension feed path 144, the slave control portions 175 and 225 switch the conveyance destination so that the paper sheet S being conveyed on the extension feed path 144 is conveyed to the terminal pocket 7.

Accordingly, control of the slave control portions 175 and 225 is facilitated because the termination pocket 7 is positioned as a dedicated rejection portion after an abnormality occurs. In addition, the location of the stacking portion to be pulled out during the abnormality recovery process being the terminal pocket 7 makes it easier for the operator to find.

Even if the operator forgets to remove the paper sheet S stuck in the target extension feed path 64 during the abnormality recovery processing operation after the occurrence of the third abnormality in the second counting mode, the slave control portion 95 switches the conveyance destination of such stuck paper sheet S to the evacuation destination stacking portion among the stacking portions 81 to 84 and conveys the paper sheet S thereto during the reset operation of the target extension feed path 64.

Even if the operator forgets to remove the paper sheet S stuck in the target extension feed path 104 during the abnormality recovery processing operation after the occurrence of the first abnormality in the third counting mode, the slave control portion 135 switches the conveyance destination of such stuck paper sheet S to the evacuation destination stacking portion among the stacking portions 121 and 122 and conveys the paper sheet S thereto during the reset operation of the target extension feed path 104.

Even if the operator forgets to remove the paper sheet S stuck in the target branching feed path 105 during the abnormality recovery processing operation after the occurrence of the third abnormality in the third counting mode, the slave control portion 135 switches the conveyance destination of such stuck paper sheet S to the evacuation destination stacking portion among the stacking portions 121 and 122 and conveys the paper sheet S thereto during the reset operation of the target branching feed path 105.

Even if the operator forgets to remove the paper sheet S stuck in the target branching feed path 145 during the abnormality recovery processing operation after the occurrence of the fourth abnormality in the third counting mode, the slave control portion 175 switches the conveyance destination of such stuck paper sheet S to the evacuation destination stacking portion among the stacking portions 161 to 163 and conveys the paper sheet S thereto during the reset operation of the target branching feed path 145.

Accordingly, not only when an abnormality occurs, but also during the reset operation by the abnormality recovery processing operation after the abnormality occurs, the slave control portions 95, 135, 175 collectively convey and stack the paper sheet S stuck in the extension feed paths 64, 104, 105, 145 to a predetermined stacking portion, thus reducing the number of processing points for the operator during the abnormality recovery processing. Accordingly, it is possible to reduce the processing load.

During the occurrence of the fourth abnormality in the second counting mode, the master control portion 56, after finishing conveying the paper sheet S being conveyed in the extension feed path 64 or the paper sheet S being conveyed in the branching feed path 65 to a predetermined stacking portion as the evacuation destination among the stacking portions 81 to 84, finalizes the counting of the paper sheet S normally conveyed to the stacking portions other than the predetermined stacking portion among the stacking portions 81 to 84.

During the occurrence of the first abnormality in the third counting mode, the master control portion 56, after finishing conveying the paper sheet S being conveyed in the extension feed path 64 to a predetermined stacking portion as the evacuation destination among the stacking portions 81 to 84, finalizes the counting of the paper sheet S normally conveyed to the stacking portions 121, 122, 161 to 163 other than this predetermined stacking portion.

During the occurrence of the second abnormality in the third counting mode, the master control portion 56, after finishing conveying the paper sheet S being conveyed in the extension feed paths 64 and 104 to a predetermined stacking portion as the evacuation destination among the stacking portions 121 and 122, finalizes the counting of the paper sheet S normally conveyed to the stacking portion other this predetermined stacking among the stacking portions 121 and 122 and to the stacking portions 161 to 163.

During the occurrence of the third abnormality in the third counting mode, the master control portion 56, after finishing conveying the paper sheet S being conveyed in the extension feed path 64 to the predetermined stacking portion as the evacuation destination among the stacking portions 81 to 84 and conveying the paper sheet S being conveyed in the extension feed path 104 to the predetermined stacking portion as the evacuation destination among the stacking portions 161 to 163, finalizes the counting of the paper sheet S normally conveyed to the stacking portions 121 and 122 and the stacking portions other than the evacuation destination stacking portion among the stacking portions 161 to 163.

During the occurrence of the fourth abnormality in the third counting mode, the master control portion 56, after finishing conveying the paper sheet S being conveyed in the extension feed path 64 to the predetermined stacking portion as the evacuation destination among the stacking portions 81 to 84, conveying the paper sheet S being conveyed in the extension feed path 104 to the predetermined stacking portion as the evacuation destination among the stacking portions 121 and 122, and conveying the paper sheet S being conveyed in the extension feed path 144 to the terminal pocket 7 as an evacuation destination, finalizes the counting of the paper sheet S normally conveyed to the stacking portions 161 to 163 and to the stacking portion other than the stacking portion serving as the evacuation destination among the stacking portions 121 and 122.

Therefore, after the paper sheets S being conveyed are completely conveyed to the predetermined stacking portion serving as the evacuation destination, the counting of the paper sheet S normally conveyed to the stacking portions other than the evacuation destination stacking portions can be finalized. Therefore, the operator only needs to remove the other paper sheet S from the paper sheet processing device 1 for recounting.

In other words, complicated processing by the operator after the occurrence of an abnormality is reduced.

Modifications

During the occurrence of the fourth abnormality in the second counting mode and the occurrence of the second abnormality in the third counting mode described above, that is, when an abnormality requiring a "normal stop" occurs in the extension feed paths 64 and 104, it was explained that a predetermined conveyance destination stacking portion, such as the stacking portion 84 or the stacking portion 122, may be set in advance as a changed conveyance destination of the paper sheet S, with the paper sheet S in question being collectively conveyed to and stacked in the stacking portion 84 or stacking portion 122.

In the same way, it was explained that if there are paper sheets S stuck in the extension feed paths 64 and 104 during the reset operation in the abnormality recovery process, the paper sheets S may be conveyed to the stacking portion 84 or 122 for stacking. Alternatively, the paper sheet S may be conveyed and stacked in the terminal pocket 7 arranged at the most downstream portion as a predetermined stacking portion serving as the changed conveyance destination of the paper sheet S.

Further, when an abnormality occurs, the master control portion 56 or the slave control portions 95, 135, 175 may switch the conveyance speed of at least any one of the extension feed paths 64, 104, 144 and the branching feed paths 65, 105, 145 to a lower speed than the conveyance speed during normal counting except when a conveyance abnormality occurs, depending on the location and type of abnormality that has occurred. With such control, after an abnormality occurs, the corresponding one among the extension feed paths 64, 104, 144 and branching feed paths 65, 105, 145 is conveyed at a low speed, so the paper sheet processing device 1 can prevent detachment of the conveying belts constituting the extension feed paths 64, 104, 144 and the branching conveying paths 65, 105, 145, and damage such as tearing of the paper sheet S can be suppressed.

Further, when an abnormality requiring an "emergency stop" occurs, it was described that the slave control portion that is subject to the abnormality occurrence among the slave control portions 95, 135, 175 notifies the master control portion 56 to that effect, and stops the feed path requiring an "emergency stop" based on an instruction from the master control portion 56. However, without being limited thereto, the slave control portion that is the subject of the abnormality occurrence may stop the feed path that requires an "emergency stop" as it is, and notify the master control portion 56 to the effect that an abnormality requiring an "emergency stop" has occurred.

As for control portions, for convenience, the base machine 2 was described as being provided with the master control unit 56, and each of the first expansion portion 3 to the fourth expansion portion 6 with the slave control portion 95, 135, 175, 225, respectively, and with regard to the interface, the master control portion 56 and the slave control portions 95, 135, 175, 225 were described as performing one-to-one communication as a result of the corresponding unit station addresses #1 to #4 being set in advance for the first expansion unit 3 to the fourth expansion unit 6, respectively. However, the control is not limited thereto. The control portion may be installed only in the base machine 2 so that said control portion controls all of the base machine 2 and the first expansion units 3 to the fourth expansion unit 6.

For convenience, the description was based on the overall configuration of FIG. 1, but it is not limited thereto, such that the expansion units connected to the base machine 2 may be configured with multiple units of the same type from the first expansion unit 3 to the fourth expansion unit 6, or only one unit from the first expansion unit 3 to the fourth expansion unit 6 may be connected to the base machine 2. The paper sheet processing device 1 may be configured with the terminal pocket 7 provided at the opposite end of the base machine 2, and may be configured without the terminal pocket 7. In the configuration in which the terminal pocket 7 is provided, there will be more options for the stacking portion to which the paper sheet S being conveyed in at least one of the extension feed paths 64, 104, 144, or 184 will be switched in the event of an abnormality.

In the paper sheet processing device 1 of the present embodiment described above, banknotes are described as the medium, being referred to as paper sheets S, but the paper sheets S, which are the media, were described as being banknotes, but it can be applied to all types of paper sheets S, such as gift certificates, checks, promissory notes, securities, and other valuable securities, not limited to banknotes.

INDUSTRIAL APPLICABILITY

According to the paper sheet processing device described above, it becomes possible to easily remove a paper sheet when a conveyance abnormality occurs.

DESCRIPTION OF REFERENCE SYMBOLS

1 Paper sheet processing device
2 Base machine
3 First expansion unit (expansion unit)
4 Second expansion unit (expansion unit)
5 Third expansion unit (expansion unit)
6 Fourth expansion unit (expansion unit)
7 Terminal pocket (stacking portion, terminal stacking portion)
22 Validator
30 Base machine feed path
56 Master control portion (control portion)
64, 104, 144, 184 Extension feed path
65, 105, 145, 185 Branching feed path
95, 135, 175, 225 Slave control portion (control portion)
81 to 84, 121, 122, 161 to 163 Stacking portion
201, 202 Bonding stacker (stacking portion)
S Paper sheet

The invention claimed is:

1. A paper sheet processing device comprising:

a base machine including a base machine feed path that conveys a paper sheet, and a validator that identifies the paper sheet conveyed by the base machine feed path;

an expansion unit including an extension feed path that extends from the base machine feed path, a branching feed path that branches from the extension feed path, and a plurality of stacking portions that are connected to the branching feed path and stack the paper sheet identified by the validator; and a control portion that, when a conveyance abnormality occurs, continues conveyance operation of at least one of the extension feed path and the branching feed path without immediately stopping the conveyance operation and conveys the paper sheet to a predetermined stacking portion that is any of the plurality of stacking portions, in accordance with a location where the conveyance abnormality occurred and a type of the conveyance abnormality, wherein the control portion, when the conveyance abnormality occurs and any one of the stacking portions is not empty, switches the conveyance destination so as to convey the paper sheet being conveyed on the extension feed path or the paper sheet being conveyed on the branching feed path to the stacking portion with a lowest number of stacked sheets among the stacking portions.

2. The paper sheet processing device according to claim 1, wherein the control portion, when the conveyance abnormality occurs and a first stacking portion of the stacking portions is empty, switches a conveyance destination so as to convey the paper sheet being conveyed on the extension feed path or the paper sheet being conveyed on the branching feed path to the first stacking portion where no paper sheet is stacked.

3. The paper sheet processing device according to claim 1, wherein the predetermined stacking portion is set in advance, and the control portion, when the conveyance abnormality occurs, switches a conveyance destination so as to convey the paper sheet being conveyed on the extension feed path or the paper sheet being conveyed on the branching feed path to the predetermined stacking portion.

4. The paper sheet processing device according to claim 1, wherein the expansion unit comprises a plurality of expansion units, and the control portion, in accordance with the location where the conveyance abnormality occurred and the type of the conveyance abnormality, individually switches a conveyance destination of a paper sheet being conveyed downstream of the location where the conveyance abnormality occurred and a paper sheet being conveyed on an upstream side of the location where the conveyance abnormality occurred so that each paper sheet is conveyed to the predetermined stacking portion or to another stacking portion.

5. The paper sheet processing device according to claim 1, further comprising:

a terminal stacking portion that receives a paper sheet from an opening portion at the terminal end of the extension feed path and stacks it, wherein the control portion, when the location where the conveyance abnormality occurred is not the extension feed path, switches a conveyance destination so as to convey the paper sheet being conveyed on the extension feed path to the terminal stacking portion.

6. The paper sheet processing device according to claim 1, wherein the control portion switches a first conveyance speed of at least any one of the extension feed path and the branching feed path to a lower speed than a second conveyance speed, in accordance with the location where the conveyance abnormality occurred and the type of the conveyance abnormality, the second conveyance speed being a speed during which no conveyance abnormality occurs.

7. The paper sheet processing device according to claim 1, wherein the control portion, when an operator has forgotten to remove a paper sheet stuck in at least any one of the extension feed path and the branching feed path during an abnormality recovery processing operation after the conveyance abnormality has occurred, switches a conveyance destination of the stuck paper sheet during a reset operation of the at least one of the extension feed path and the branching feed path concerned.

8. The paper sheet processing device according to claim 1, wherein, the control portion, after having completed conveyance of the paper sheet being conveyed on the extension feed path or the paper sheet being conveyed on the branching feed path to the predetermined stacking portion, finalizes counting of a paper sheet normally conveyed to the stacking portion other than the predetermined stacking portion.

* * * * *